(12) United States Patent (10) Patent No.: US 9,652,756 B2
Knecht et al. (45) Date of Patent: May 16, 2017

(54) POINT OF SALE INTERFACE FOR AN AUTOMATIC BEVERAGE DISPENSER

(71) Applicant: Smart Bar USA, LLC, Crystal Lake, IL (US)

(72) Inventors: Fred Knecht, Woodstock, IL (US); William Metropulos, McHenry, IL (US)

(73) Assignee: SMART BAR USA LLC, Crystsal Lake, IL (US)

( * ) Notice: Subject to any disclaimer, the term of this patent is extended or adjusted under 35 U.S.C. 154(b) by 0 days.

(21) Appl. No.: 14/473,573

(22) Filed: Aug. 29, 2014

(65) Prior Publication Data

US 2014/0372233 A1 Dec. 18, 2014

Related U.S. Application Data

(63) Continuation-in-part of application No. 14/081,667, filed on Nov. 15, 2013, which is a continuation of application No. 12/842,405, filed on Jul. 23, 2010, now Pat. No. 8,584,900.

(60) Provisional application No. 61/872,447, filed on Aug. 30, 2013, provisional application No. 61/271,632, filed on Jul. 23, 2009, provisional application No. 61/356,744, filed on Jun. 21, 2010, provisional application No. 61/356,750, filed on Jun. 21, 2010.

(51) Int. Cl.
| | |
|---|---|
| *B67D 1/08* | (2006.01) |
| *G06Q 20/20* | (2012.01) |
| *G06Q 30/06* | (2012.01) |
| *G06Q 50/12* | (2012.01) |
| *B67D 1/00* | (2006.01) |

(52) U.S. Cl.
CPC ........... *G06Q 20/20* (2013.01); *B67D 1/0888* (2013.01); *G06Q 30/0635* (2013.01); *G06Q 30/0643* (2013.01); *G06Q 50/12* (2013.01); *B67D 1/0041* (2013.01); *B67D 2210/00091* (2013.01)

(58) Field of Classification Search
CPC ................ B67D 1/0041; B67D 1/0888; B67D 2210/00091; G06Q 20/20; G06Q 30/0635; G06Q 30/0643; G06Q 50/12
See application file for complete search history.

(56) References Cited

U.S. PATENT DOCUMENTS

| | | | |
|---|---|---|---|
| 2009/0259556 A1* | 10/2009 | Carroll .................. | G06Q 20/20 705/17 |
| 2010/0198643 A1* | 8/2010 | Friedman ........... | G06Q 30/0241 705/14.4 |
| 2010/0268378 A1* | 10/2010 | Sharpley ................. | A47J 31/52 700/233 |

* cited by examiner

*Primary Examiner* — Frederick C Nicolas
*Assistant Examiner* — Bob Zadeh
(74) *Attorney, Agent, or Firm* — McDermott Will & Emery LLP

(57) ABSTRACT

A point of sale (POS) interface solution is provided to interface a POS system or POS terminal to an automated bar tending system, allowing a drink order to be entered into the automated bar tending system other than by a user interface on the automated bar tending system. The POS interface provides a drink order signal to a printer for printing a drink order on a ticket for processing a drink order and/or on a bill to present to the customer. The POS interface also provides a drink order signal to the automated bar tending system for displaying the drink order on the user interface.

16 Claims, 33 Drawing Sheets

POINT OF SALE INTERFACE FOR AN AUTOMATIC BEVERAGE DISPENSER

CROSS-REFERENCE TO RELATED APPLICATIONS

This application claims priority to U.S. Provisional Patent Application No. 61/872,447, which was filed on Aug. 30, 2013, and is a continuation-in-part of U.S. patent application Ser. No. 14/081,667, filed on Nov. 15, 2013, which is a continuation of U.S. patent application Ser. No. 12/842,405, filed on Jul. 23, 2010, now U.S. Pat. No. 8,584,900, which claims priority to U.S. Provisional Patent Application No. 61/271,632, filed on Jul. 23, 2009, U.S. Provisional Patent Application No. 61/356,744, filed on Jun. 21, 2010, U.S. Provisional Patent Application No. 61/356,750, filed on Jun. 21, 2010, all of which are herein incorporated by reference and made a part hereof.

FEDERALLY SPONSORED RESEARCH OR DEVELOPMENT

Not Applicable.

TECHNICAL FIELD

The present invention relates generally to a point of sale (POS) interface for a beverage dispenser, and more specifically to a POS interface for communicating with an automated beverage dispenser for dispensing mixed beverages.

BACKGROUND OF THE INVENTION

Beverage dispensers and beverage dispensing systems that provide delivery of beverages to a customer are well known in the art. Typically, such beverage dispensing machines permit a customer to specify a beverage to be dispensed and allow the customer to dispense the specified beverage. Such beverages may be, for example, flavored carbonated beverages and coffee-based beverages.

One drawback of current beverage dispensing systems is the limited beverage options, such as a lack of the ability to provide mixed alcohol drinks. Another drawback of current beverage dispensing systems is the lack of customization which is offered in such systems. For example, current beverage dispensing systems do not permit management of various functions of the beverage dispensing system such as creating or revising beverage recipes for the beverages which are dispensed, creating or revising menus of the different beverages that may be dispensed, product management and inventory tracking, reviewing dispensing history, and financial tracking, such as tracking volume, count, and sales of beverages which are dispensed through the beverage dispensing function. In addition, current beverage dispensing systems do not provide the ability to dispense customized beverages based on ingredients that are provided by the beverage dispensing system. Rather, such systems generally include only predetermined beverages which may be dispensed.

The present system is provided to solve the problems discussed above and other problems, and to provide advantages and aspects not previously provided. A full discussion of the features and advantages of the present system is deferred to the following detailed description, which proceeds with reference to the accompanying drawings.

SUMMARY

A method, system and apparatus for managing the dispensing of beverages from an automatic beverage dispensing unit is provided herein. The beverages may be comprised of a single ingredient or multiple ingredients, including a first plurality of liquids, a second plurality of liquids, and/or a combination of one or more first and second plurality of liquids. In addition, garnishes and sides may be included in the beverage. The beverages are dispensed according to a pouring schema. The pouring schema may be a beverage recipe and may be preprogrammed by a system manager, or alternatively, be chosen by a consumer during operation of the system. In addition, it is contemplated that the pouring schema may be programmed by another individual. In one embodiment, the first plurality of liquids may include liquors and the second plurality of liquids may include mixers which are mixed with the liquors to create the beverage.

According to another embodiment, a beverage dispenser is provided for providing mixed beverages. The beverage dispenser comprises: a housing for storing a plurality of first liquids, a plurality of second liquids, and a water supply, wherein the first liquids comprise liquors, and wherein the second liquids comprise mixer syrup; a cooled compartment having a cooling member therein to store ice, the cooled compartment having an openable closure providing access to the cooled compartment; an interface on an exterior of the housing to input variable data and receive variable instructions; a beverage dispensing spout fluidly connected to the plurality of first liquids, the plurality of second liquids and the water; a carbon dioxide tank in fluid communication with the water supply; and, a server electrically connected to the interface, the server electrically operating valves to control the flow of first liquids, second liquids and water to the beverage dispenser spout based on instructions entered at the interface and a pouring schema stored in memory of the server.

According to another embodiment, the server comprises a processor and a memory retaining a program to operate the beverage dispenser. According to another embodiment, the server further comprises an I/O device to receive pouring schema for storage in the memory.

According to another embodiment, variable input data comprises data provided for one of management function data input and beverage request data input, and wherein the variable instruction data comprises instructions for receiving a beverage.

According to another embodiment, the beverage dispenser further comprises a plurality of pumps to pump liquid from a plurality of at least one of the first and second liquids to the dispensing spout.

According to another embodiment, the interface comprises a touch screen. In one embodiment the touch screen displays a graphical user interface including a first plurality of selectable categories of drinks, including alcohol drinks, non-alcohol drinks, martini's, shots, and fountain drinks. In another embodiment the interface provides instructions to the user corresponding to the size of beverage container to insert under the dispensing spout. In another embodiment the touch screen displays a graphical user interface, the graphical user interface in one embodiment includes a first plurality of selectable portions, wherein the first plurality of selectable portions corresponds to one or more dispensing functions, and a second plurality of selectable portions, wherein the second plurality of selectable portions corresponds to one or more management functions. In one embodiment, the management functions comprise one or more of obtaining reports, creating user accounts, selecting the types of liquids available for plurality of first liquids and the plurality of second liquids, priming the system, and creating a pouring schema.

According to another embodiment, the beverage dispensing spout comprises: a mounting bracket supporting a first set of dispensing fittings fluidly connected to the plurality of first liquids, a second set of dispensing fittings fluidly connected to the plurality of second liquids, and a water fitting fluidly connected to the water supply; and, a removable mixing bowl supported by the mounting bracket, the mixing bowl having a mixing portion and a dispensing stem, wherein the water and the plurality of second liquids are dispensed into the mixing bowl for premixing prior to be dispensed from the beverage dispenser through the dispensing stem.

According to another embodiment, the beverage dispenser has a garnish drawer housing a tray for supporting garnishes for the beverages, wheels connected to the housing for transportation of the beverage dispenser, and a countertop supported by a lower portion of the housing.

According to another embodiment, a beverage dispenser for providing mixed beverages is provided, comprising: a housing having a plurality of valves for receiving a plurality of first liquids, a plurality of second liquids, and a water supply, wherein the first liquids comprise liquors, wherein the second liquids comprise mixer syrup; an interface on an exterior of the housing to input variable data and receive variable instructions; a beverage dispensing spout fluidly connected to the plurality of first liquids, the plurality of second liquids and the water, the spout comprising a mixing bowl having a mixing portion and a dispensing stem, wherein the water and the plurality of second liquids are dispensed into the mixing bowl for premixing prior to be dispensed from the beverage dispenser through the dispensing stem, and wherein the first liquids are dispensed directed into a beverage container from the dispensing spout; and a controller electrically connected to the interface, the controller operating valves to control the flow of first liquids, second liquids and water to the beverage dispenser spout based on instructions entered at the interface.

According to another embodiment, the beverage dispenser comprises: a housing having a plurality of valves for receiving a plurality of first liquids, a plurality of second liquids, and a water supply, wherein the first liquids comprise liquors, wherein the second liquids comprise mixer syrup; a touch screen on an exterior of the housing displaying a graphical user interface, the graphical user interface including a first plurality of selectable portions, wherein each of the selectable portion corresponds to one or more dispensing functions, the touch screen simultaneously displaying beverage selection data and a drink ordered queue that is populated following each selection of a beverage by a user, a beverage dispensing spout fluidly connected to the plurality of first liquids, the plurality of second liquids and the water; and a controller electrically connected to the interface, the controller operating valves to control the flow of first liquids, second liquids and water to the beverage dispenser spout based on selections entered at the interface.

According to another embodiment, the touch screen further displays a second graphical user interface including a second plurality of selectable portions, wherein each of the second plurality of selectable portion corresponds to one or more management functions, and wherein the one or management functions includes at least one of a pouring schema function, a report function, a user accounts function, and a priming function.

According to another embodiment, the beverage dispenser also comprises a physical computer program product comprising a computer readable medium having executable computer readable program code embodied therein, the executable computer readable program code for implementing a method of managing dispensing functions of a beverage dispensing system, the method comprising the steps of: displaying a first graphical user interface, the first graphical user interface including a first plurality of selectable portions, wherein each of the first plurality of selectable portion corresponds to one or more management functions; receiving an input selection corresponding to the selection of one of the first plurality of selectable portions; wherein the input selection corresponds to management of a pouring schema; displaying a second graphical user interface, the second graphical user interface including a second plurality of selectable portions, wherein each of the second plurality of selectable portion corresponds to a pouring schema; and, receiving an input selection corresponding to the selection of one of the plurality of second selectable portions; wherein the input selection corresponds to components of a pouring schema, wherein the components of the pouring schema includes at least one of selecting one or more of a first plurality of liquids and selecting one or more of a second plurality of liquids.

According to another embodiment, the beverage dispenser also comprises a physical computer program product comprising a computer readable medium having executable computer readable program code embodied therein, the executable computer readable program code for implementing a method of dispensing a beverage in a beverage dispensing system, the method comprising the steps of: displaying a graphical user interface, the graphical user interface including a first plurality of selectable portions, wherein each of the selectable portion corresponds to one or more dispensing functions; receiving an input selection corresponding to corresponding to the selection of one of the plurality of dispensing functions; and, dispensing a beverage according to the received input selection and a pouring schema associated with the received input selection.

According to another embodiment, a system for processing drink orders is provided. The system includes a server computer, one or more point of sale (POS) terminals configured to generate a drink order signal based on a received input, a bar tending system configured to automatically populate a drink order queue based on receiving the drink order signal, and an order display configured to provide a visual representation of the drink order signal, the order display comprising one of a video display and a printer, wherein the system is configured to provide the drink order signal to both the bar tending system and the order display based on the received input to the one or more POS terminals.

According to another embodiment, a system for processing drink orders is provided. The system includes one or more processors and a memory containing processor-executable instructions that, when executed by the one or more processors, cause the system to: receive a drink order signal from a point of sale (POS) terminal; provide the drink order signal to both a printer and a bar tending system; print a drink order at the printer based on the drink order signal; and automatically populate and display the drink order in a drink order queue on a user interface of the bar tending system based on the received drink order signal.

According to another embodiment, a non-transitory machine-readable storage medium storing machine-executable instructions for causing a processor to perform a method for processing a drink order is provided. The method includes receiving a drink order signal generated by a point of sale (POS) terminal; providing the drink order signal to an order display; provide a drink order on the order display based on the drink order signal; providing the drink order signal to a bar tending system; and displaying the drink order automatically in a drink order queue on a user interface of the bar tending system.

Other features and advantages will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
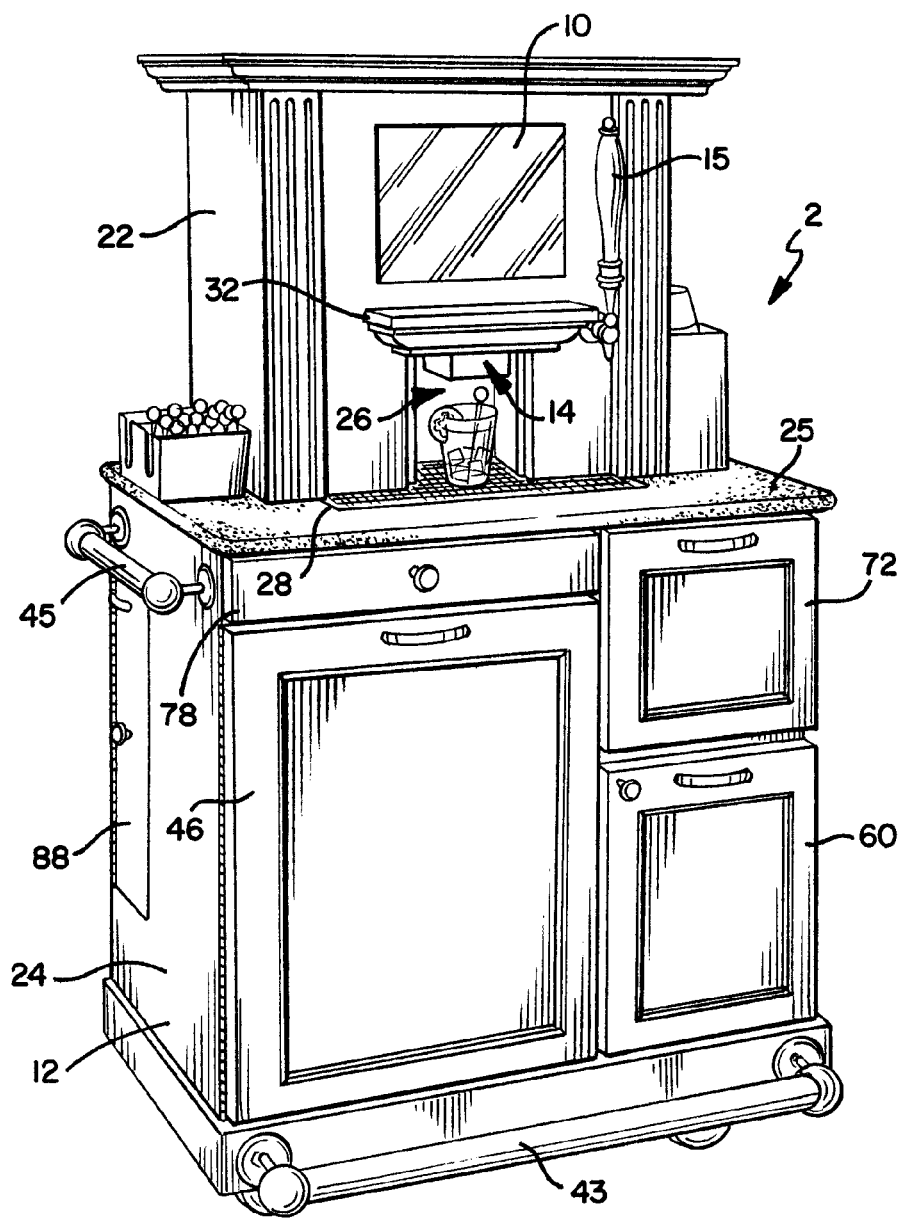
FIG. 1 is a front perspective view of one embodiment of a beverage dispenser.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
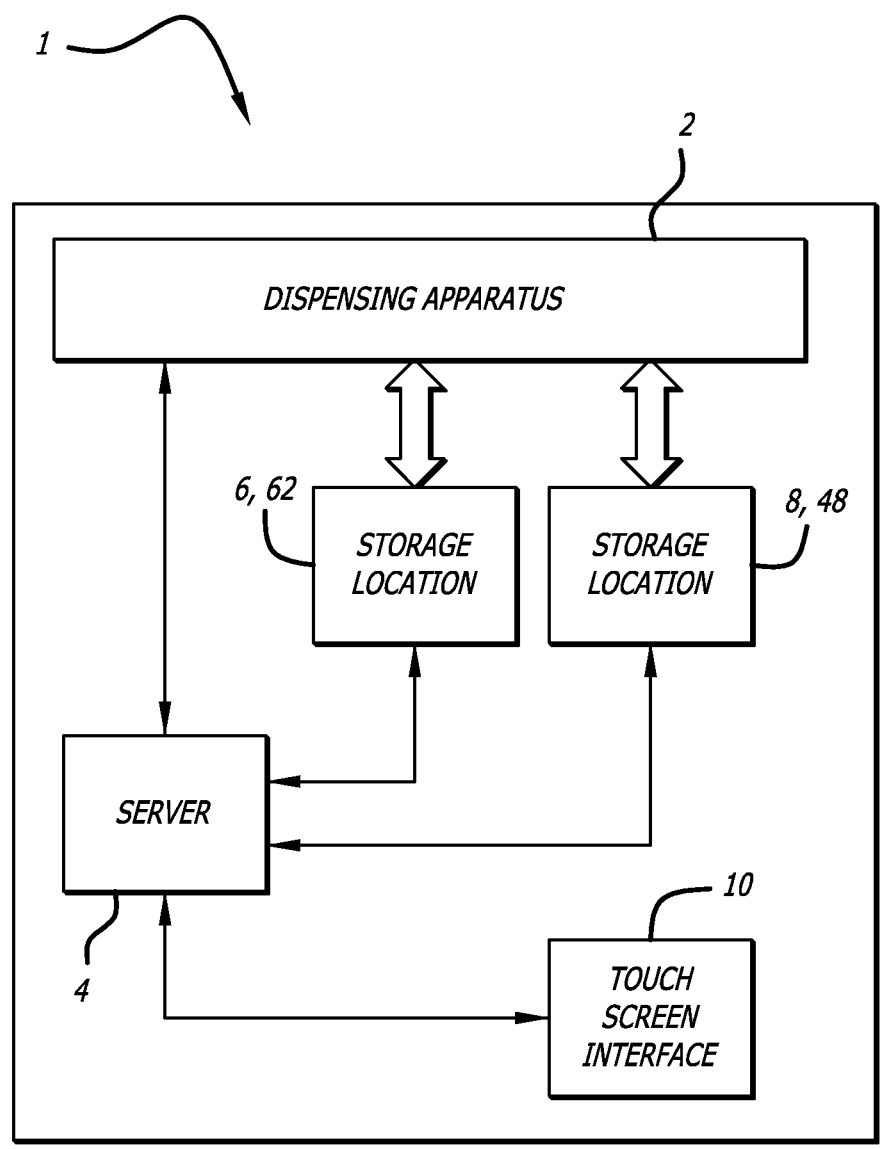
FIG. 2 is a block diagram illustrating one embodiment of a beverage dispensing system.

Referring now to the Figures, and specifically FIGS. 1 and 2, there is shown a preferred embodiment of a beverage dispensing system 1 (see FIG. 2) and a beverage dispenser 2 used in the system (see FIG. 1). The beverage dispenser 2 and beverage dispensing system 1 provide an apparatus, system and method for the automatic dispensing of beverages, including mixed drinks.

The beverages that are dispensed by the beverage dispenser 2 may be comprised of a single or multiple ingredients, including a first plurality of liquids, a second plurality of liquids, and/or a combination of one or more first and second plurality of liquids and/or additional liquids. In addition, garnishes and sides may be included in the beverage. The beverages are dispensed according to a pouring schema. The pouring schema may be a beverage recipe and may be preprogrammed by a system manager, or alternatively, be chosen by a consumer during operation of the system. In addition, it is contemplated that the pouring schema may be programmed by another individual. In one embodiment, the first plurality of liquids may include liquors or alcohols, and the second plurality of beverages may include mixers that are mixed with the liquors to create the beverage.

In one embodiment, the first plurality of beverages may include at least one of the following ingredients: amaretto, bourbon, brandy, gin, Irish crème, Jagermeister®, Kahlua®, light rum, peach schnapps, scotch, spiced rum, sweet vermouth, tequila, triple sec, vodka, and whiskey. In one embodiment, the second plurality of beverages may include one of more of the following ingredients: bloody mary, club soda, cola, cranberry juice, diet cola, energy drink, ginger ale, grapefruit juice, lemon lime soda, lemonade, lime juice, orange juice, pineapple juice, sour mix, tonic, and water. In one embodiment, the garnishes may include at least one of the following ingredients: banana, carrot, celery stick, cherry, cocktail onion, lemon peel, lemon wedge, lime wedge, olive, orange slice, orange wedge, and pineapple wedge. In one embodiment, the sides may include at least one of the following: Campari®, cream, dash of bitters, dash of celery salt, dash of salt, dash of Worcestershire®, Galliano, lemon juice, dry vermouth, grenadine, sugar syrup, half and half, sugar cube, and Tabasco®. It is understood however, that the first plurality of liquids, the second plurality of liquids, the garnishes, and the sides may include additional ingredients to the ingredients listed above.

Figure 27:
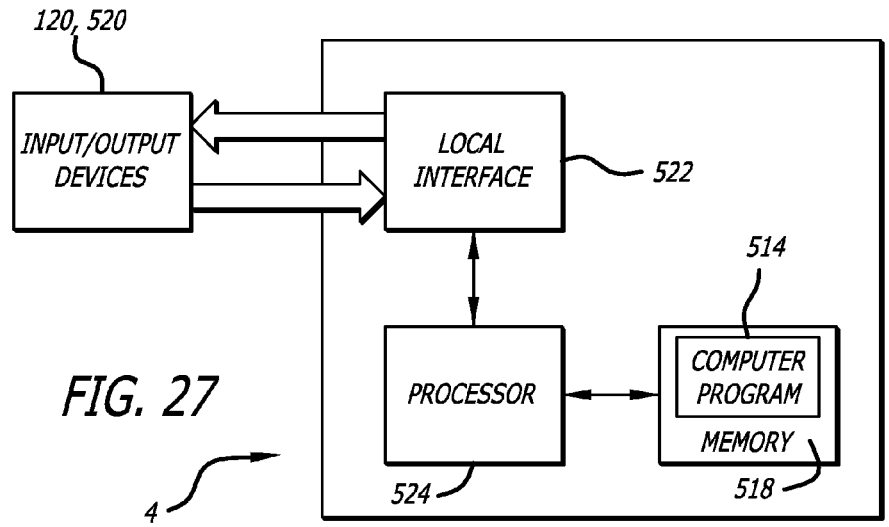
FIG. 27 is a block diagram illustrating a computer in the beverage dispensing system of FIG. 2.

FIG. 2 is a block diagram of a beverage dispensing system 1. The beverage dispensing system 1 includes a beverage dispenser 2, a server 4 (the server 4 is schematically illustrated in FIG. 27 herein), storage locations for a plurality of beverage supplies 20 (including a plurality of first liquids 6 (also referred to as liquors), a plurality of second liquids 8 (also referred to as mixers), water from a water tank 80, etc.), and an operator interface 10. In one embodiment, the operator interface comprises a touch screen 10. As will be described in greater detail herein, the beverage dispensing system 1 may be programmed to dispense various combinations of liquors and mixers in a precise amount. In addition, the beverage dispensing system 1 may include a variety of management functionality, such as creating or revising beverage recipes, creating or revising menus, creating or revising pouring schema, product management and inventory tracking, reviewing dispensing reporting history, and financial tracking, such as tracking volume, count, and sales of beverages which are dispensed by the beverage dispenser 2.

Referring again to FIG. 1, a preferred embodiment of the beverage dispenser 2 is shown. The beverage dispenser 2 generally comprises a dispenser or cabinet 12 containing a server 4, an operator interface 10, a beverage dispensing assembly or dispensing spout 14, a plurality of beverage supplies 20, and various pumps and tubing connecting the beverage supplies 20 with the dispensing spout 14. The beverage dispensing system 1 allows operators to select a variety of beverages, including, but not limited to, beer, mixed drinks with and without liquor/alcohol, soft drinks and water, which are automatically dispensed from the beverage dispensing spout 14 of the beverage dispenser 2. The beverage dispenser 2 is fully automated and is simple to use through its interface 10. In one embodiment the beverage dispenser 2 is also easily mobile and thus is perfect for casinos, banquets, weddings, conventions, meeting centers, etc.

Figure 3:
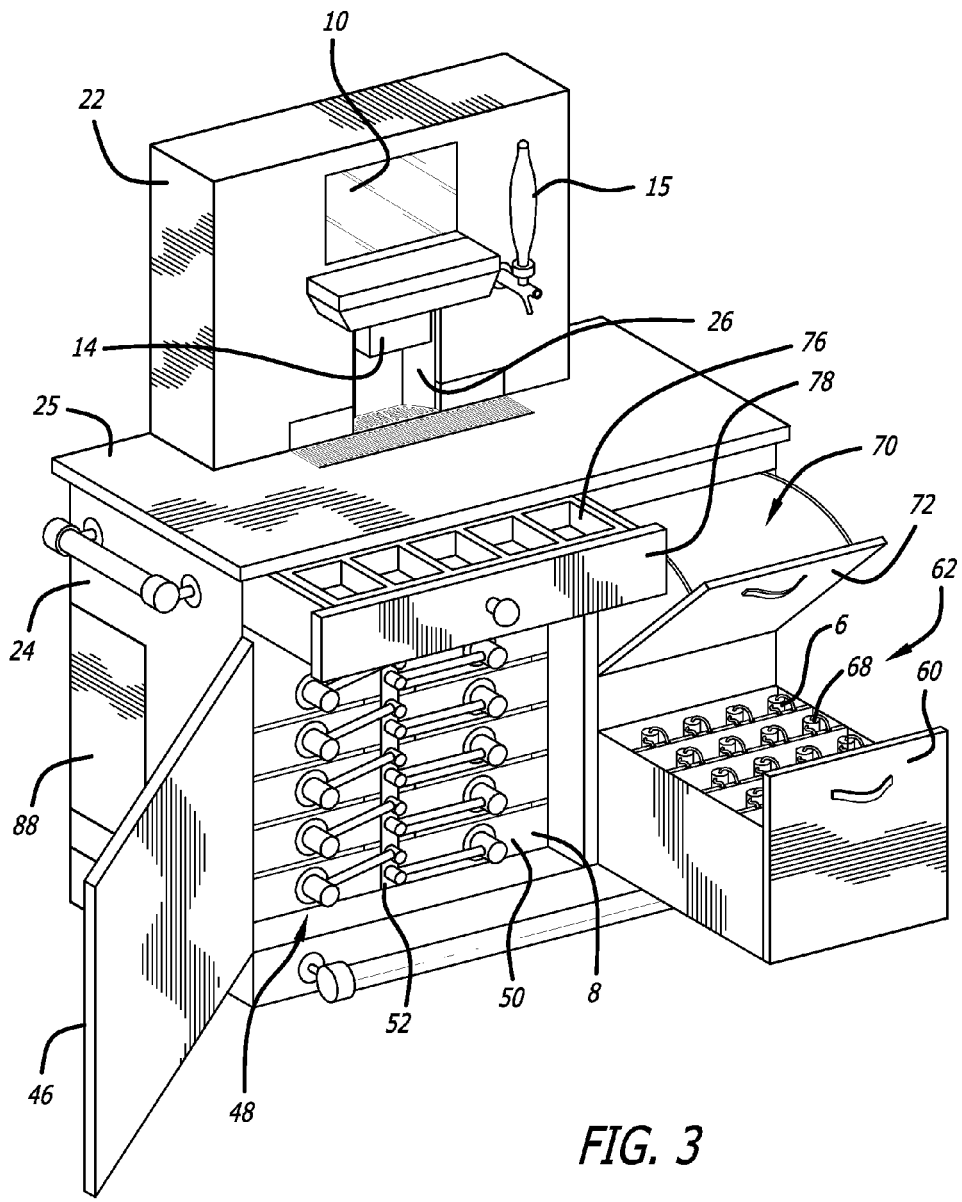
FIG. 3 is a front perspective view of the beverage dispenser of FIG. 1 with various compartments in the open position.
Figure 7:
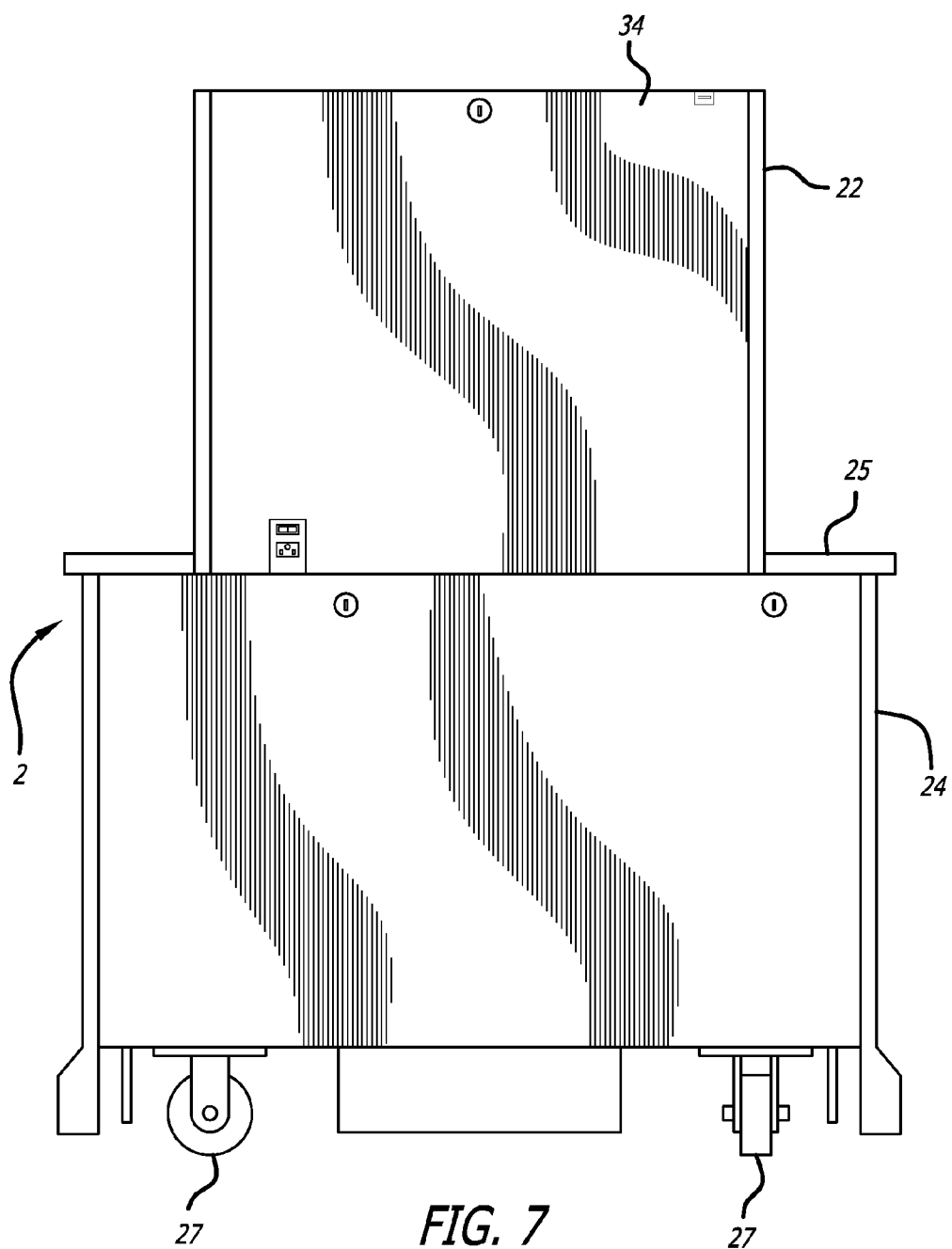
FIG. 7 is a rear perspective view of the beverage dispenser of FIG. 1.

As shown FIGS. 1 and 3, in one embodiment the beverage dispenser 2 is a freestanding independent console. The beverage dispensing housing or cabinet 12 may be constructed out of wood, metal, aluminum, or any other suitable material. In this embodiment the beverage dispenser housing 12 comprises a first or upper cabinet member 22, also referred to as the control housing 22, and a second or lower cabinet member 24, also referred to as the inventory housing 24. A countertop 25 is generally positioned on top of the lower cabinet member 24. In a preferred embodiment the beverage dispenser 2 has casters or wheels 27 as shown in FIG. 7, to allow the beverage dispenser 2 to be relocated as desired.

Figure 10:
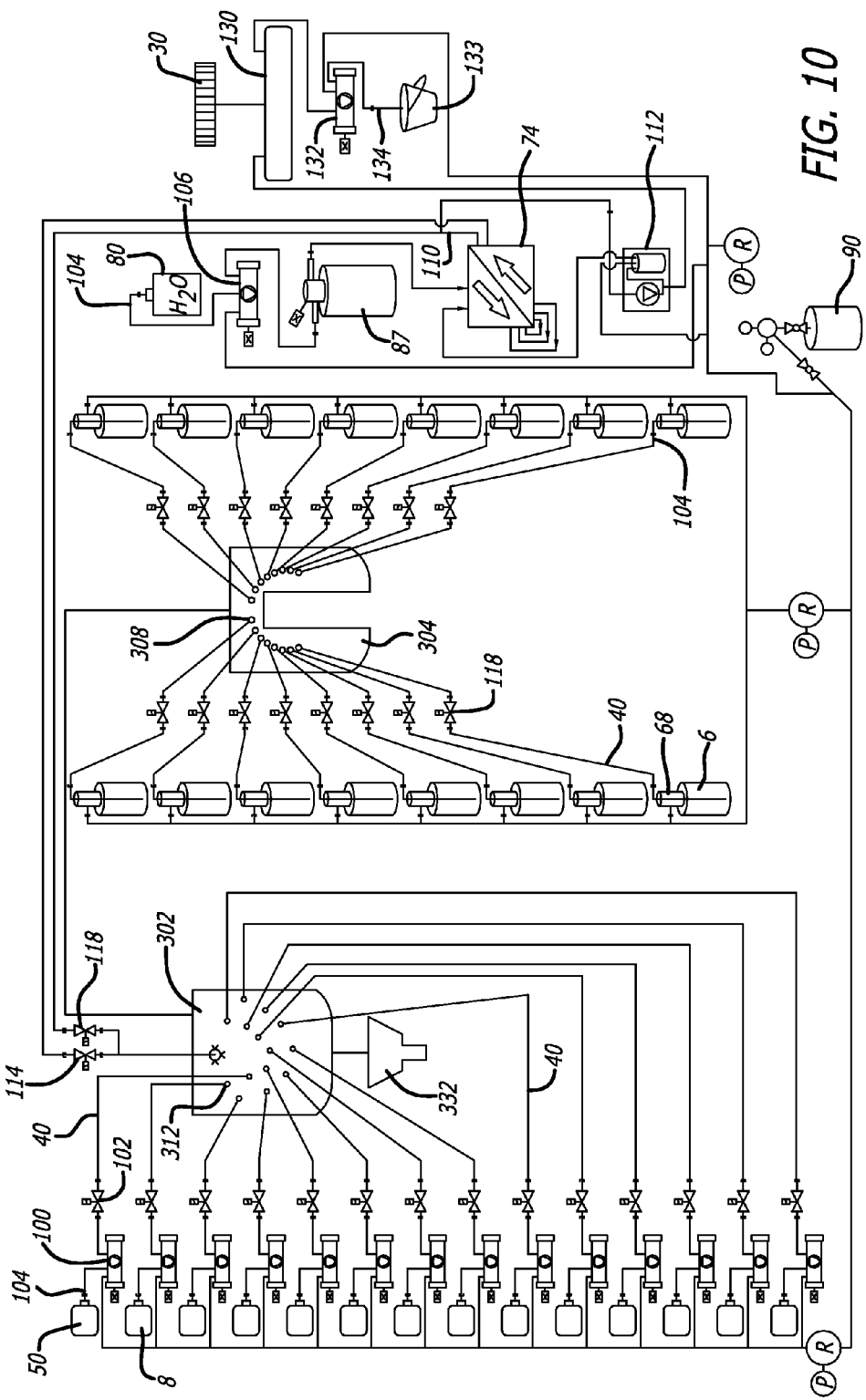
FIG. 10 is a pneumatic flow schematic for the beverage dispenser of FIG. 1.
Figure 19:
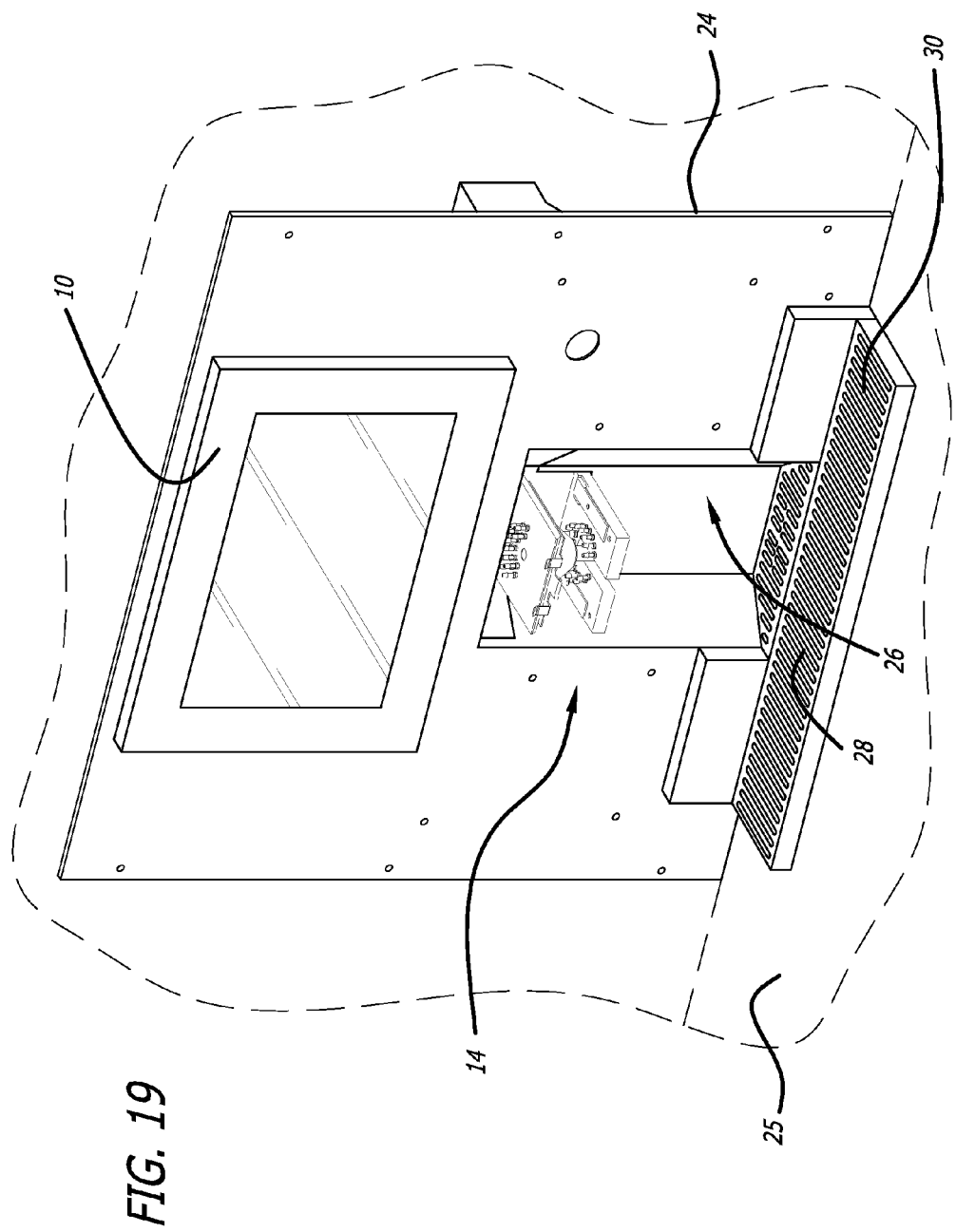
FIG. 19 is a perspective view of one embodiment of a beverage dispensing assembly as shown in use in a beverage dispenser.

In a preferred embodiment, upper or control cabinet member 22 houses the beverage dispensing spout 14. As shown in FIGS. 3 and 19, in one embodiment the beverage dispensing spout 14 is fixed above an open cavity 26 of the upper cabinet member 22 and is located above a grate 28 that covers a drip pan collector 30. In an alternate embodiment, as shown in FIG. 10, three beverage dispensing spouts 14 are provided. Additionally, as shown in FIG. 1, a beer tap 15 may be provided on the face of the upper cabinet 22 to dispense beer from a beer source, such as a keg (not shown), provided outside the beverage dispenser 2, but fluidly connected to the beer tap 15.

The upper cabinet member 22 also houses the operator interface or touch screen 10. In a preferred embodiment a shelf 32 is provided under the operator interface 10, and extending outward from the face of the upper cabinet member 22. Referring to the back of the upper cabinet member 22, as shown in FIG. 7, a lockable panel 34 is provided that secures entry to the inside components of the upper or control cabinet member 22. The rear panel 34 is removable to provide access to a rear control panel cavity 36 which houses the electrical components of the server 14, a plurality of solenoids/valves 38 for controlling the flow of liquid from the beverage supplies 20, associated tubing 40, an I/O device 120 such as a USB I/O device, among other items. The upper cabinet member 22 also houses an A/C power outlet 44. To operate the beverage dispenser 2 it must first be plugged into an outlet to provide power to the beverage dispenser 2 through the A/C power outlet 44.

The lower cabinet member 24 or inventory housing 24 has a plurality of compartments that house various supplies, such as beverage supplies 20, garnishes, ice, water, carbon dioxide, a filter, and a plurality of pumps, etc. The beverage supplies 20 may comprise beverages and beverage components in bags, boxes, bottles, bag-in-boxes, or other beverage containers that contain the beverage ingredients that the beverage dispenser 2 will draw from to make drinks. While certain compartments are shown as being part of a preferred embodiment, it is understood that other combinations of compartments/trays are also within the scope of the invention. Also connected to the lower cabinet member 24 is a foot rail 43 and a towel bar 45 as shown in FIG. 1.

Figure 4:
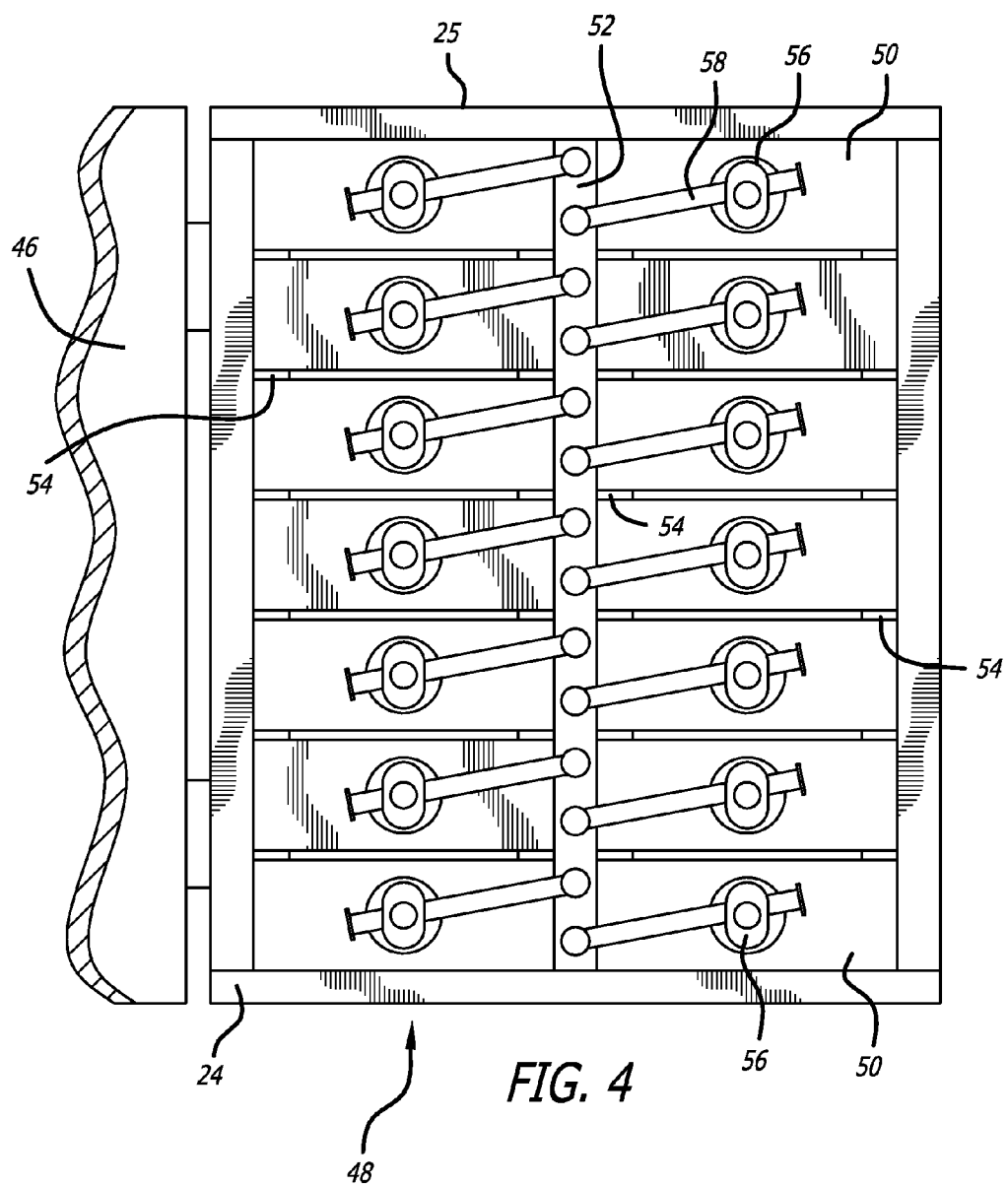
FIG. 4 is a partial front view of an open storage bay for a first plurality of liquids.

Referring to FIG. 3, in one embodiment the lower cabinet member 24 has a door 46 that provides access to a second compartment 48. In a preferred embodiment the second compartment 48 houses a plurality of second liquids 8, which are preferably mixers such as bloody mary, club soda, cola, cranberry juice, diet cola, energy drink, ginger ale, grapefruit juice, lemon lime soda, lemonade, lime juice, orange juice, pineapple juice, sour mix, tonic, and water. As shown in FIGS. 3 and 4, in a preferred embodiment the second liquids 8 are retained in bag-in-box containers 50. The second compartment 48 also has a manifold 52 that divides the second compartment 48 in half (i.e., a first side and a second side). Each side of the second compartment 48 in the present embodiment has a plurality of dividers 54 that divide each side into a plurality of insert areas. In this embodiment the dividers 54 separate each side of the second compartment 48 into seven separate cavities, thereby allowing for fourteen different possible second liquids 8. The dividers 54 allow each bag-in-box container 50 to be separately inserted and removed from the second compartment 48. Additionally, as shown in FIG. 4, each bag-in-box container 50 is fluidly connected via a connector 56 and tubing 58 to the manifold 52.

Figure 5:
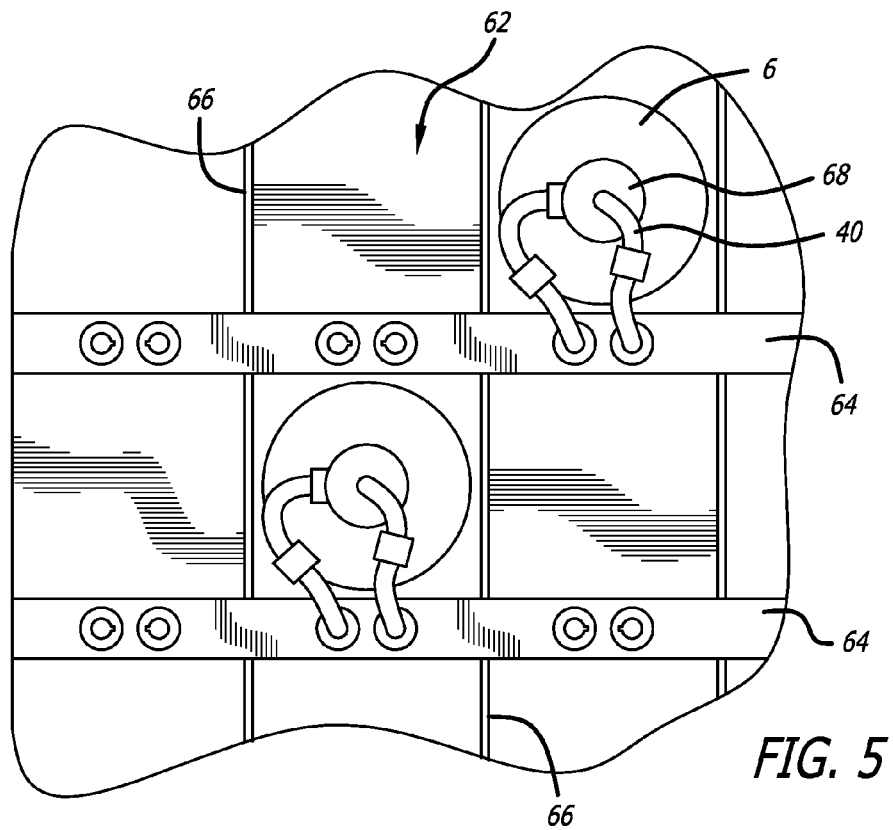
FIG. 5 is a partial top view of an open storage bay for a second plurality of liquids.

As shown in FIGS. 3 and 5, the lower cabinet member 24 of the beverage dispenser 2 also has a pull-out drawer 60 that provides access to a first compartment 62. The pull-out drawer 60 slides in and out of the lower cabinet member 24.

In a preferred embodiment the first compartment 62 houses a plurality of first liquids 6, which are preferably liquors such as amaretto, bourbon, brandy, gin, Irish crème, Jagermeister®, Kahlua®, light rum, peach schnapps, scotch, spiced rum, sweet vermouth, tequila, triple sec, vodka, and whiskey. As shown in FIG. 5, the pull-out drawer 60 is divided with manifolds 64 and dividers 66 into plurality of cavities. In the embodiment illustrated, the manifolds 64 and dividers 66 separate the pull-out drawer 60 into sixteen separate cavities, thereby allowing for sixteen different possible first liquids 6. In a preferred embodiment 750 ml. bottles of liquor are retained in each cavity. Each bottle of first liquid 6 is fluidly connected via a quick release sealed bottle-top connector 68 and tubing 40 to one of the manifolds 64.

Figure 6:
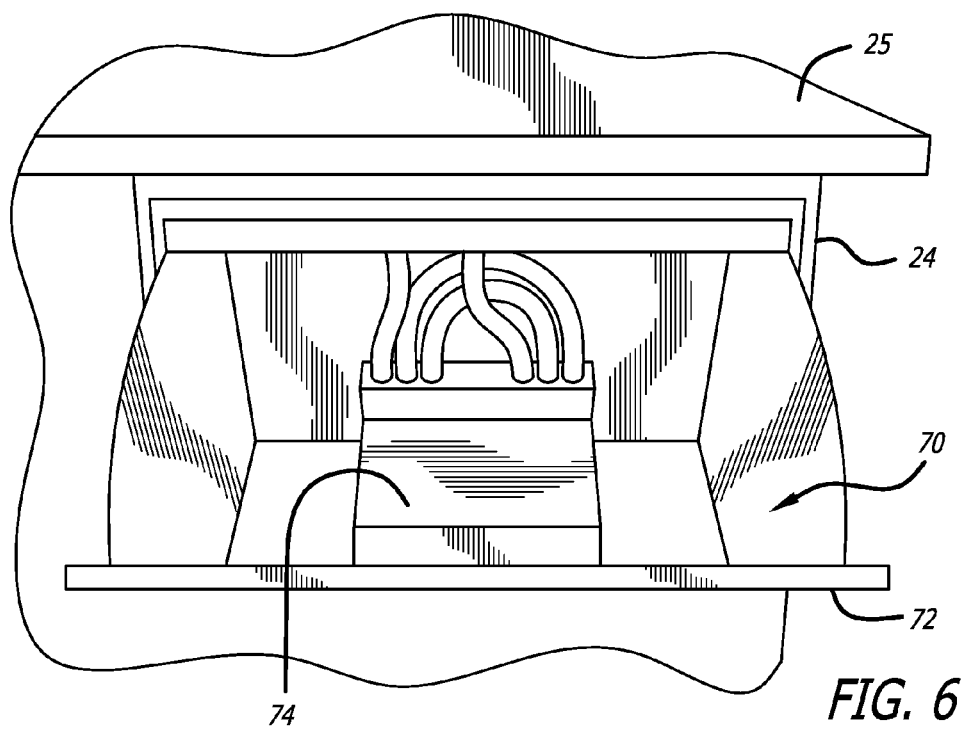
FIG. 6 is a partial perspective view of an open ice bin compartment.

Referring now to FIGS. 3 and 6, the lower cabinet member 24 of the beverage dispenser 2 also has an ice compartment 70. In a preferred embodiment the ice compartment 70 is above the pull-out drawer 60 that houses the plurality of first liquids 6. The ice compartment 70 has an openable front panel 72 that rotates outwardly to provide access to the ice compartment 70. As shown in FIG. 6, the ice compartment 70 has a cooling plate 74 located at the bottom of the ice compartment 70 to keep the ice cool.

The beverage dispenser 2 also has an internal garnish tray 76 located internal to the lower cabinet member 24. As shown in FIG. 3, a pull-out drawer 78 is positioned above the second compartment 48 and directly below the countertop 25 of the beverage dispenser 2. The pull-out drawer 78 supports the garnish tray 76 for retaining various garnishes, such as: banana, carrot, celery stick, cherry, cocktail onion, lemon peel, lemon wedge, lime wedge, olive, orange slice, orange wedge, and pineapple wedge.

Figure 8:
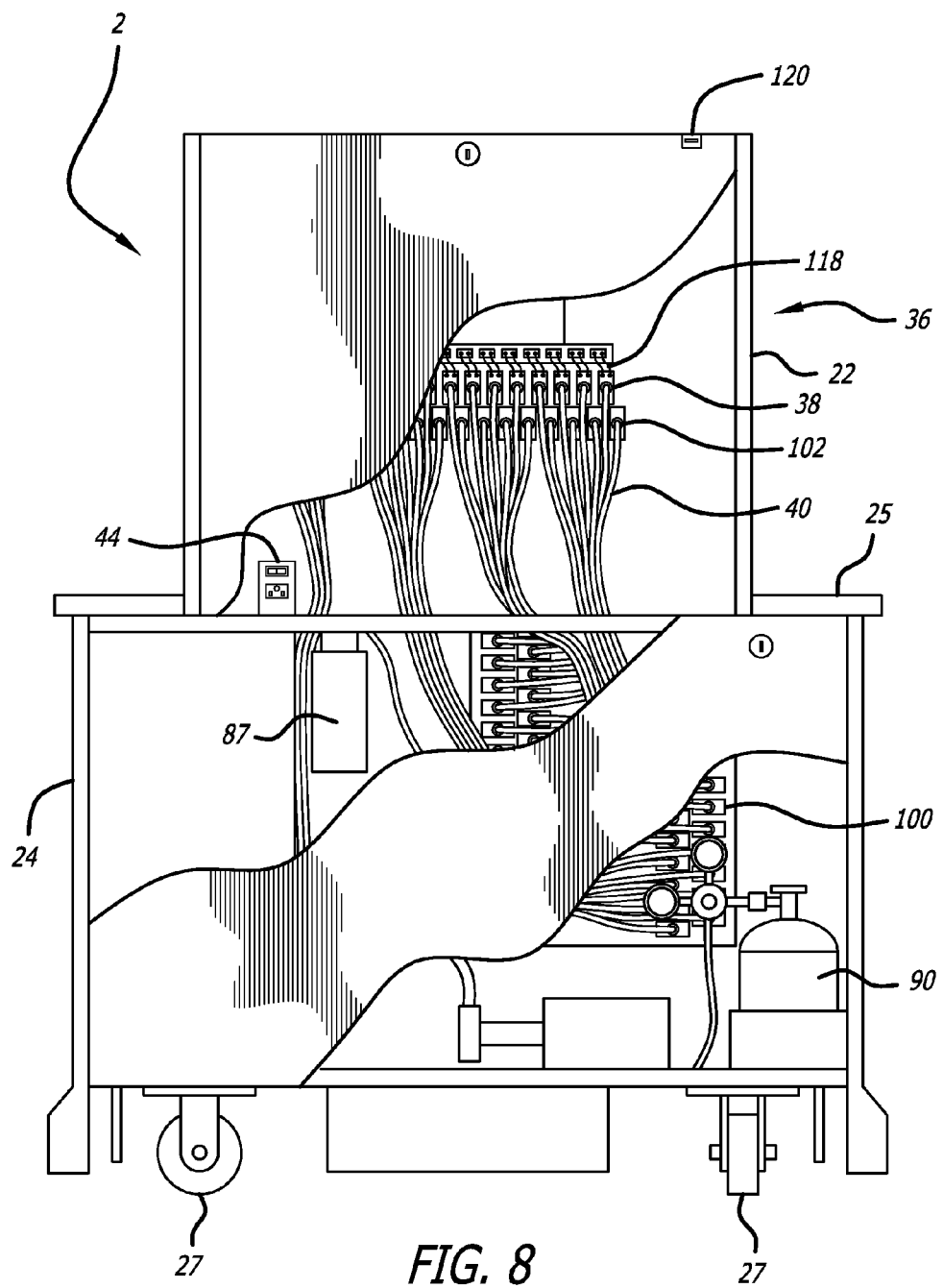
FIG. 8 is a rear perspective view of FIG. 7 with the rear panels partially removed.
Figure 9:
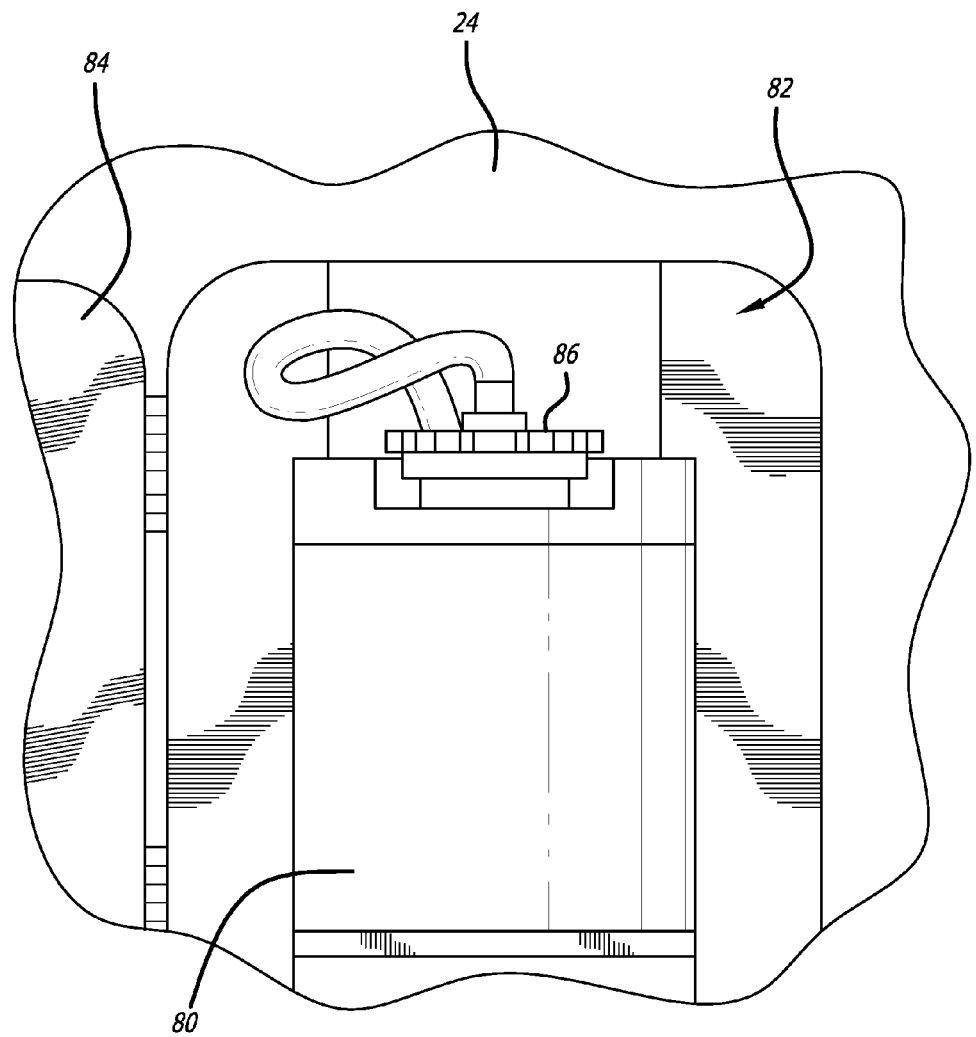
FIG. 9 is a partial side view of the water compartment of the beverage dispenser of FIG. 1.

Referring to FIG. 9, the beverage dispenser 2 also comprises a removable and refillable water tank 80. In the embodiment of FIG. 1, the water tank 80 is positioned in a separate water compartment 82 behind the ice compartment 70. The water compartment 82 has its own access door 84 on the side of the lower cabinet member 24. As shown in FIGS. 8 and 9, a water tank connector 86 is fitted on the water tank 80. The connector 86 fluidly joins the water tank 80 to the beverage dispenser 2 via tubing. Preferably, however, water that is pumped from the water tank 80 is first pumped through a filter 87, shown in FIG. 8, and then to the dispensing spout 14.

Further, the beverage dispenser 2 also contains a $CO_2$ access door 88 on the side of the lower cabinet member 24 opposing the water tank access door 84. As shown in FIG. 8, the $CO_2$ access door 88 opens to expose a $CO_2$ tank 90 and $CO_2$ pump 92. Access to the $CO_2$ tank 90 and $CO_2$ pump 92 can also be provided by removing the rear access panel 94 of the lower cabinet member 24, as shown in FIG. 7. Carbon dioxide from the $CO_2$ tank 90 is fluidly connected to filtered water from the water tank 80 to provide carbonated water at the beverage spout 14 of the beverage dispenser 2. Additional plumbing is of the $CO_2$ and all fluids is described in detail herein.

As shown in FIGS. 4, 5, 8 and 9, the beverage supplies 20 are fluidly connected to the beverage dispensing spout 14, preferably with hoses or tubing 40. As explained in connection with the beverage dispensing assembly 14 of FIGS. 19-26, which details the preferred embodiment of the beverage dispensing assembly 14 used in this embodiment of the beverage dispenser 2, the liquids in the plurality of second liquids 8 are fluidly connected to fittings 312 in the dispensing assembly 14 via tubing 40 for dispensing into a mixing bowl 332 along with water for mixing and dispensing into a waiting cup, and the liquids in the plurality of first liquids 6 are fluidly connected to fittings 308 in the dispensing assembly 14 via tubing 40 for dispensing directly into the cup. In a preferred embodiment the liquids of the second plurality of liquids 8 are mixing syrups, and in a preferred embodiment the liquids of the first plurality of liquids 6 are liquors.

Referring to the plumbing flow schematic of FIG. 10, to transfer mixer liquid from the mixing boxes 8 in the first compartment 48 to the beverage dispensing assembly 14, a pneumatically driven FloJet diaphragm pump 100 is used to pump the second liquid out of the mixing boxes 8. Preferably, the liquid of the plurality of second liquids is a concentrated syrup mixer contained in a bag-in-box container. The FloJet pump 100 is operated based on pressurized $CO_2$ from the $CO_2$ tank 90. The FloJet pump 100 pumps the second liquid through tubing 40 to an electronic solenoid/valve 102. When a drink is requested by the user, the server 4 operates electrically open the solenoid/valve 102, allowing the second liquid to flow through the tubing 40 and be dispensed out the fittings 312 of the upper dispensing plate 302 of dispensing assembly 14 and into the mixing bowl 332 as explained later herein. The amount of second liquid that is dispensed is dependent on the time that the solenoid/valve 102 is open. Typically the valve 102 will be open for the same amount of time that water is being dispensed into the mixing bowl 332 of the beverage dispensing assembly 14 so that the second liquid concentrated syrup and the water can mix in the mixing bowl 332 prior to being dispensed into the waiting cup. As shown in FIG. 10, a quick disconnect fitting 104 is provided for each second liquid container 8 to allow the containers to be removed when empty.

As shown in FIG. 10, water is provided to the beverage dispensing assembly 14 from the water container 80. To dispense water from the water container 80, a similar pneumatically driven FloJet pump 106 is utilized. The pump 106 pumps water out of the water container 80, through tubing 40, through the filter 87, and into the cold plate 74. The water circulates twice through the cold plate 74 and is then is transferred via tubing 40 to the beverage dispensing assembly 14. A solenoid/valve 108 is utilized to meter the water into the mixing bowl 332 of the beverage dispensing assembly based on signals received from the server 4. As shown in FIG. 10, a quick disconnect fitting 104 is provided for the water container 80 to allow the water to be removed when empty.

Carbonated water may also be provided to the beverage dispensing assembly 14. If carbonated water is requested, water is obtained from the tubing 40 at the exit from the cold plate 74 a "T" 110 in the tubing 40 and sent to the carbonator 112 where the $CO_2$ and the $H_2O$ mix to form carbonated water. The carbonated water exits the carbonator 112 and is sent through the cold plate 74 once again. The carbonated water exits the cold plate 74 and is carried through tubing 40 to a solenoid/valve 114 adjacent the upper dispensing plate 312 of the dispensing assembly 14 for dispensing into the mixing bowl 332 when the solenoid/valve 114 is actuated by the server 4.

Also referring to the plumbing flow schematic of FIG. 10, to transfer the alcohol from the alcohol containers 6 in the first compartment 62 to the beverage dispensing assembly 14, a pressurized displacement system is utilized. Pressurized air, approximately 10 psi, is provided from the $CO_2$ tank to each of the plurality of first alcohol containers 6. The pressurized air in the containers 6 forces the liquid out of the containers 6 and into the tubing 40. The tubing 40 provides a fluid communication line between each container 6 and a solenoid/valve 118, and between the solenoid/valve 118 and the fittings 308 in the lower dispensing plate 304 of the beverage dispensing assembly 14 for dispensing the alcohol into the waiting cup. The solenoid/valves 118 are actuated by a signal from the server 4 to allow for flow to continue through the solenoid/valve 118 and into the dispensing assembly 14. Dosing of the first liquid (i.e., the alcohol) is done by timing through maintaining the solenoid/valve 118 open for a designated period of time. Each liquid alcohol has a viscosity and will flow at a certain rate. Depending on the amount of liquor to be dispensed, the server 4 will calculate the appropriate amount of time to keep the solenoid/valve 118 open for each liquor such that the correct amount of each liquor is dispensed. Dispensing of the liquor is accurate to less than $\frac{1}{10}$ of an ounce. As shown in FIG. 10, a quick disconnect fitting 104 is provided for each first liquid container 6 to allow the containers to be removed when empty.

Also shown on FIG. 10 is the waste flow diagram. Liquid that passes into the drip pan collector 30 under the beverage dispensing assembly 14 is gravity fed through tubing 40 into a waste reservoir 130. When the reservoir 130 is full the waste can be removed with the use of a pump 132 that pumps the waste into a removable container 133. The pump 132 is actuated with a valve 134.

Use and operation of the beverage dispenser, including programming of the beverage recipes, prepare pouring schema, and ultimately dispensing of the beverages is described in detail later herein.

In an alternate embodiment of the beverage dispenser 2 that is not portable, the beverage dispenser 2 comprises the first or upper cabinet member 22, a server 4, and operator interface 10, and a dispensing spout 14, but generally does not include the second or lower cabinet member 24. Accordingly, generally no liquids are contained directly within the beverage dispenser cabinet 12. Instead, the beverage dispenser 2 is fluidly connected to beverage supplies provided by the facility in which the beverage dispenser 2 is located. The beverage supplies provided by the facility will be pressurized for dosing by the valves of the beverage dispenser 2. Additionally, all waste from the drip pan will be gravity fed into the facilities drain. This embodiment of the beverage dispenser 2 may be provided in a wall, or on an existing countertop, such as a service bar. The control cabinet 22, however, does include solenoids/valves to control the flow of the first liquids, second liquids and water to the dispensing spout 14 in combination with the server. Additionally, all control features described herein are possible with the beverage dispenser 2 of this embodiment. For example, the beverage dispenser 2 of this embodiment may be programmed to dispense various combinations of liquors and mixers in a precise amount. The beverage dispensing system 1 of this embodiment may also include management functions, such as creating or revising beverage recipes, creating or revising menus, creating or revising pouring schema, product management and inventory tracking, reviewing dispensing reporting history, and financial tracking, such as tracking volume, count, and sales of beverages which are dispensed by the system 1. As explained herein, the beverage dispensing system 1 dispenses beverages according to a session beverage menu. As will be described in greater detail below, the session beverage menu identifies the beverages that may be dispensed for a particular session. The session beverage menu is created from a global beverage menu and is based on the ingredients which are provided and the pouring schema. The session beverage menu may be electronically adjusted by a manager, either at the beverage dispenser 2 through the interface 10, or remote and downloaded to the server 4 of the beverage dispenser 2 wirelessly or through the USB port 120. The beverage dispensing system of this embodiment has all the capabilities of the other described embodiments, and is more fully described herein.

Figure 11:
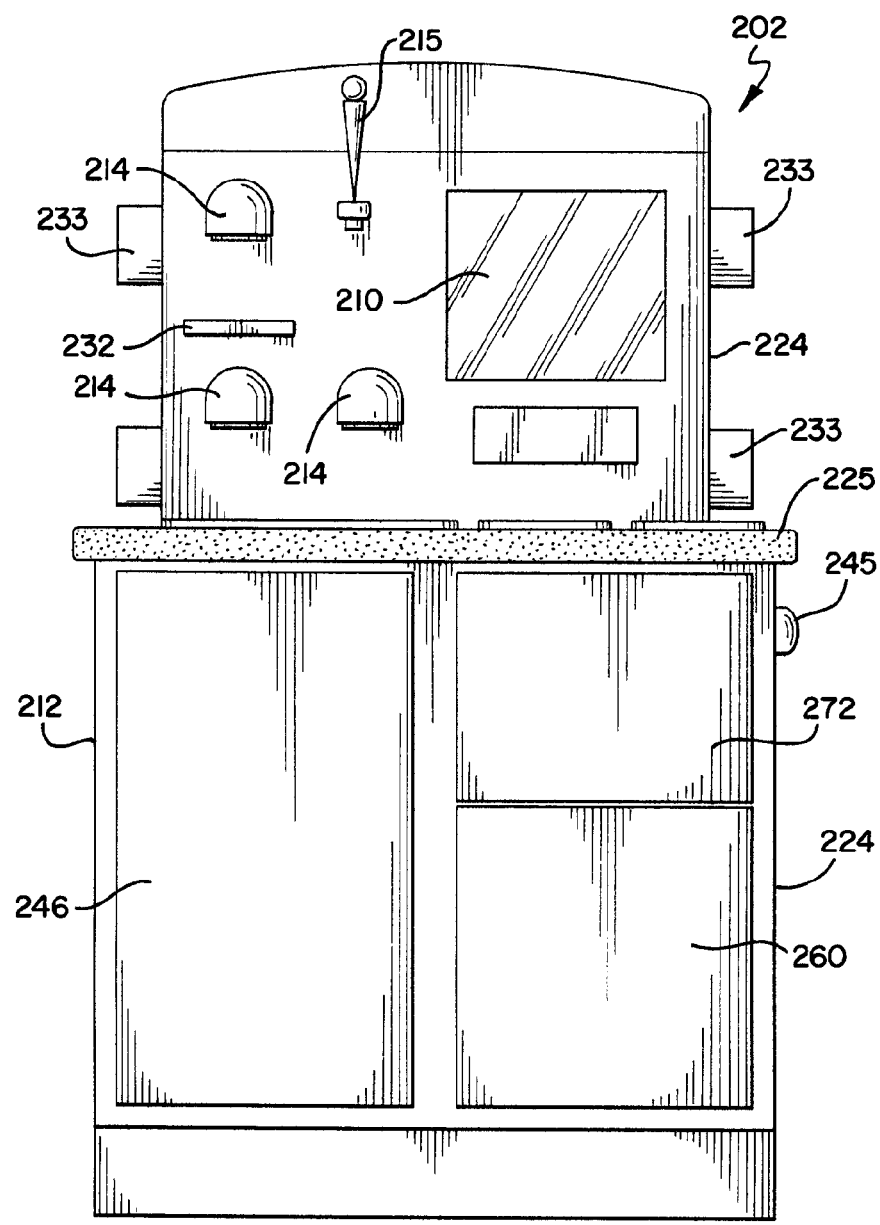
FIG. 11 is a front elevation view of another embodiment of a beverage dispenser.

Another alternate embodiment of a beverage dispenser 202 is shown in FIGS. 11-18. Turning to FIG. 11, the embodiment of the beverage dispenser 202 of FIGS. 11-18 generally comprises a cabinet 212, a plurality of spouts or dispensers 214, an operator interface 210, a server 4, and a plurality of beverage supplies 220. The beverage dispenser 202 allows operators to select a variety of beverages, including, but not limited to, beer, mixed drinks with and without alcohol, soft drinks and water, to be automatically dispensed from the beverage dispenser 202. The beverage dispenser 202 is fully automated and is simple to use through its interface 210. The beverage dispenser also has wheels 227 and is therefore transportable.

As shown in FIGS. 11-18, in this embodiment the beverage dispenser 202 is a freestanding console. The beverage dispenser 202 contains a cabinet 212 comprising an upper cabinet member 222 and a lower cabinet member 224. The cabinet 212 may be constructed out of wood, metal, aluminum, or any other suitable material. The cabinet member 212 may contain a plurality of dispensing spouts 214, and a cavity 219 for housing beverage supplies 220 (see FIG. 14). In one embodiment, the dispensers 214 are provided as part of the upper cabinet member 222, and the cavity 219 is provided in the lower cabinet member 224. The lower cabinet member 224 may contain a plurality of compartments within the cavity 219 that can house the beverage supplies 220. The beverage supplies 220 may comprise beverages and beverage components in various containers as explained herein that the beverage dispenser 202 will draw from to make drinks. The lower cabinet member 224 may also contain a pressurized carbon dioxide tank 252 and a carbon dioxide pump 250 as is commonly used to make carbonated beverages. The compartments may contain drawers and/or baskets that hold the beverage supplies. The compartments may also contain trays that can slide in and out for easier access to the beverage supplies 220.

In the embodiment shown in FIG. 11, the upper cabinet member 222 contains three dispenser spouts 214 and one beer tap 215. In one embodiment, the dispenser spouts 214 dispense mixed drinks, soft drinks, water, or other beverages, and the beer tap 215 dispenses beer from an independent beer source such as a keg. The upper cabinet member 222 may also contain a shelf or shelves 232 and a plurality of containers 233 to hold napkins, stir sticks, straws and other similar items.

In a preferred version of this embodiment, the upper cabinet member 222 is approximately 24 inches wide, 20 inches tall, and 12 inches long. Similarly, in a preferred version of this embodiment, the lower cabinet member 224 is approximately 24 inches wide, 24 inches long, and 35 inches tall. In another version of this embodiment, the lower cabinet member 224 is approximately 30 inches wide, 24 inches long, and 34 inches tall, and the upper cabinet member is 30 inches in wide, 12 inches long, and 24 inches tall. Alternate sizes of any component of the beverage dispenser 202 are allowable and within the scope of the invention. An I/O device 120, such as a USB port 120, is accessible from the upper cabinet member 222.

The upper cabinet member 222 may be attached to the lower cabinet member 224. The upper cabinet member 222 may have a smaller depth than the lower cabinet member 224 such that the upper cabinet member 222 covers the rear section of the lower cabinet member 224, leaving the front section of the lower cabinet member 224 as a work surface 225. In one embodiment, the work surface comprises a counter top 225. The countertop 225 may be made of granite or any other suitable material and may fit around or under the upper cabinet member 222 as shown in FIG. 17.

Figure 17:
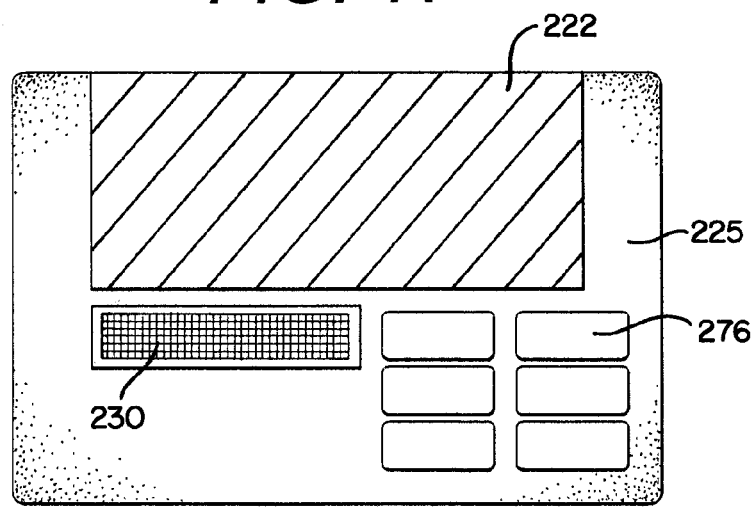
FIG. 17 is a top view of the lower cabinet of the beverage dispenser of FIG. 11.

As shown in FIG. 17, in one embodiment the work surface 225 may contain, either on top or embedded within, a plurality of garnish trays 276. For example, in the embodiment shown in FIG. 17, there are six different garnish trays 276 located on the work surface 225. There may also be a drip tray 230 located on the work surface 225. The drip tray 230 may be located such that it catches excess liquid flowing from the dispensers 214. In the embodiment shown in FIG. 17, there is a stainless steel drip tray 230 located on the work surface 225 next to the garnish trays 276. As is shown in FIG. 11, the drip tray 230 may be located directly underneath the dispensers 214 such that it can collect excess liquid. A tube will be connected to the drip tray 230 such that the excess liquid may flow from the drip tray into a reservoir (not shown) in the lower cabinet member 224.

The lower cabinet 224 may have a plurality of doors and/or drawers. These doors and drawers may open out or slide open to provide access to the cavity 219 and to expose the beverage supplies 220. In the embodiment of FIGS. 11-14, door 246 opens to expose compartment 262 in cavity 219, which contains some of the beverage supplies 220. Additionally, in this embodiment, the drawer 272 opens at an angle and contains ice. In that same embodiment, a pull-out drawer 260 opens to expose another compartment 248 in cavity 219 that contains additional of the beverage supplies 220. There may also be a bottle opener 245 located on the lower cabinet member 224, as is shown in FIG. 11.

Figure 12:
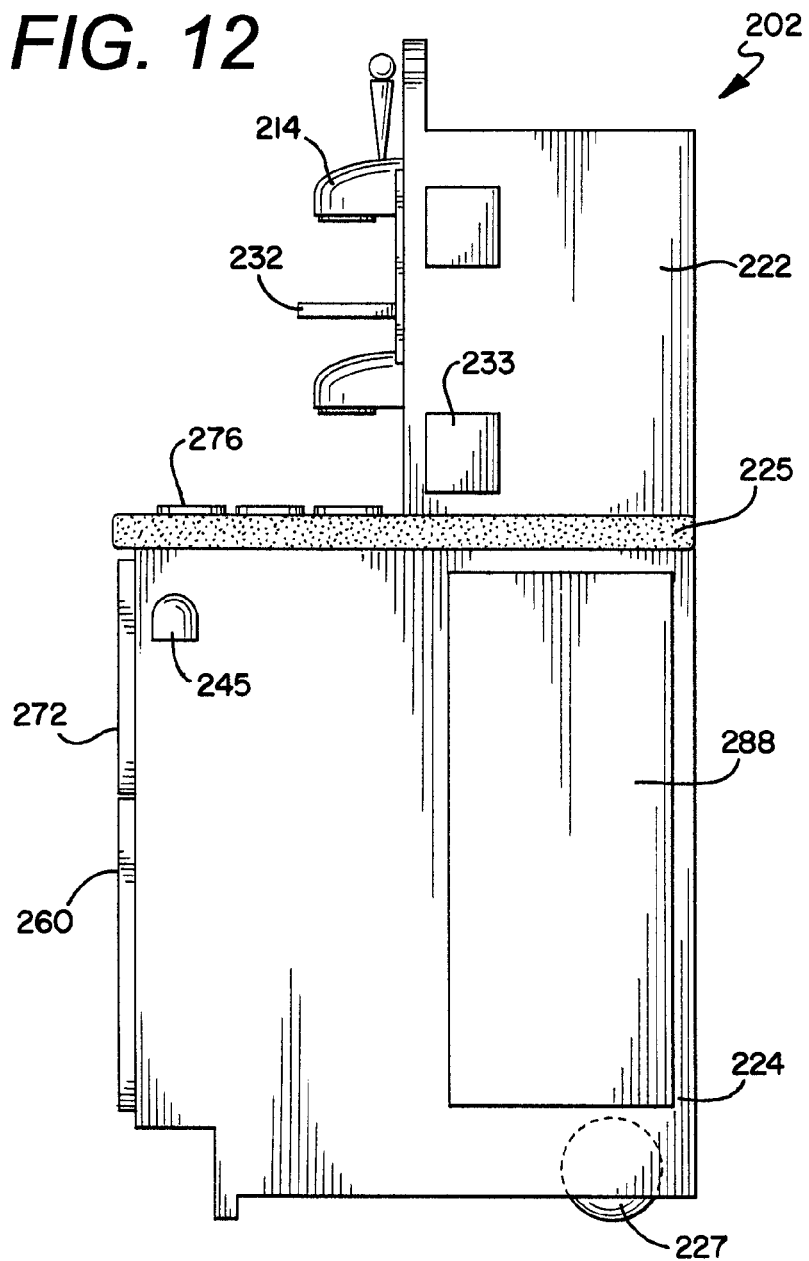
FIG. 12 is a right side elevation view of the beverage dispenser of FIG. 11.
Figure 13:
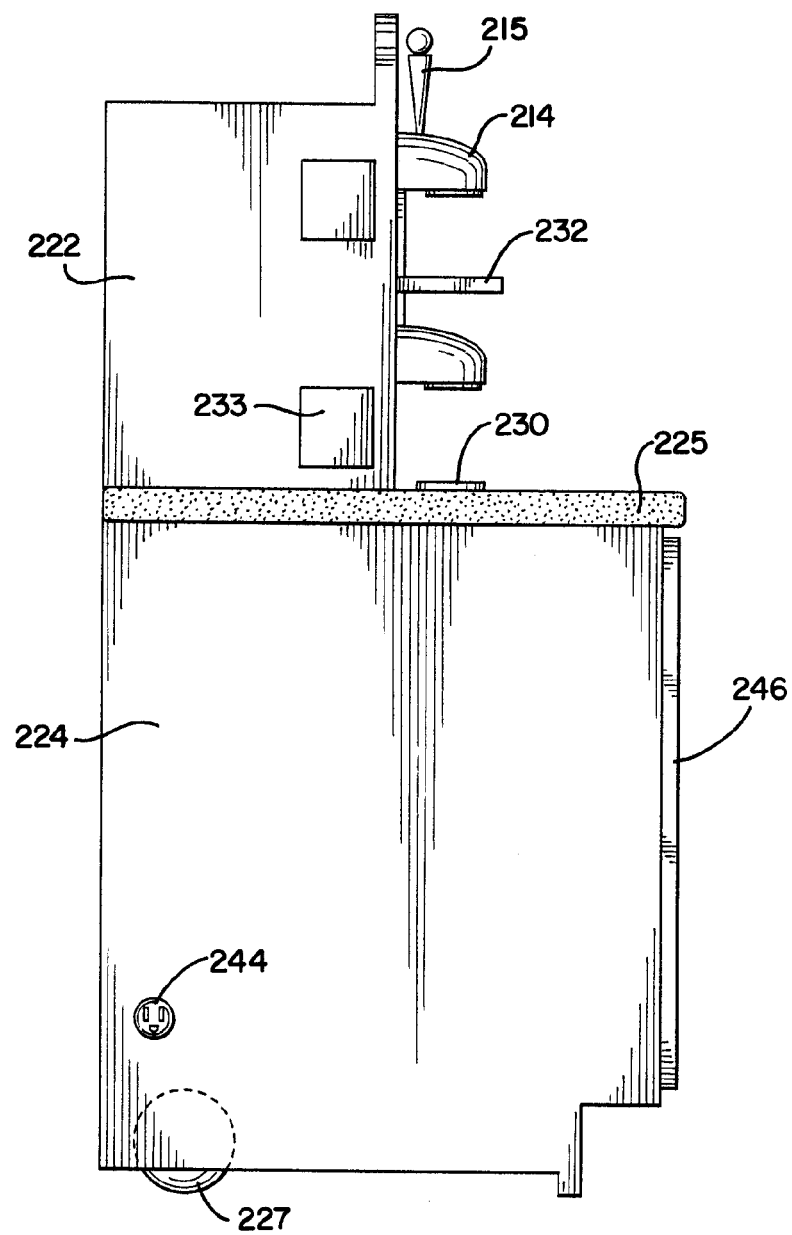
FIG. 13 is a left side elevation view of the beverage dispenser of FIG. 11.

FIG. 12 depicts the right side view of one embodiment of the beverage dispenser 202. As is shown in FIG. 12, there may be a $CO_2$ access door 288 that opens to expose a $CO_2$ pump 292 and a $CO_2$ tank 290. FIG. 13 depicts the left side view of this embodiment of the beverage dispenser 202. In this embodiment, there is an A/C power outlet 244 located on the cabinet 212.

Figure 14:
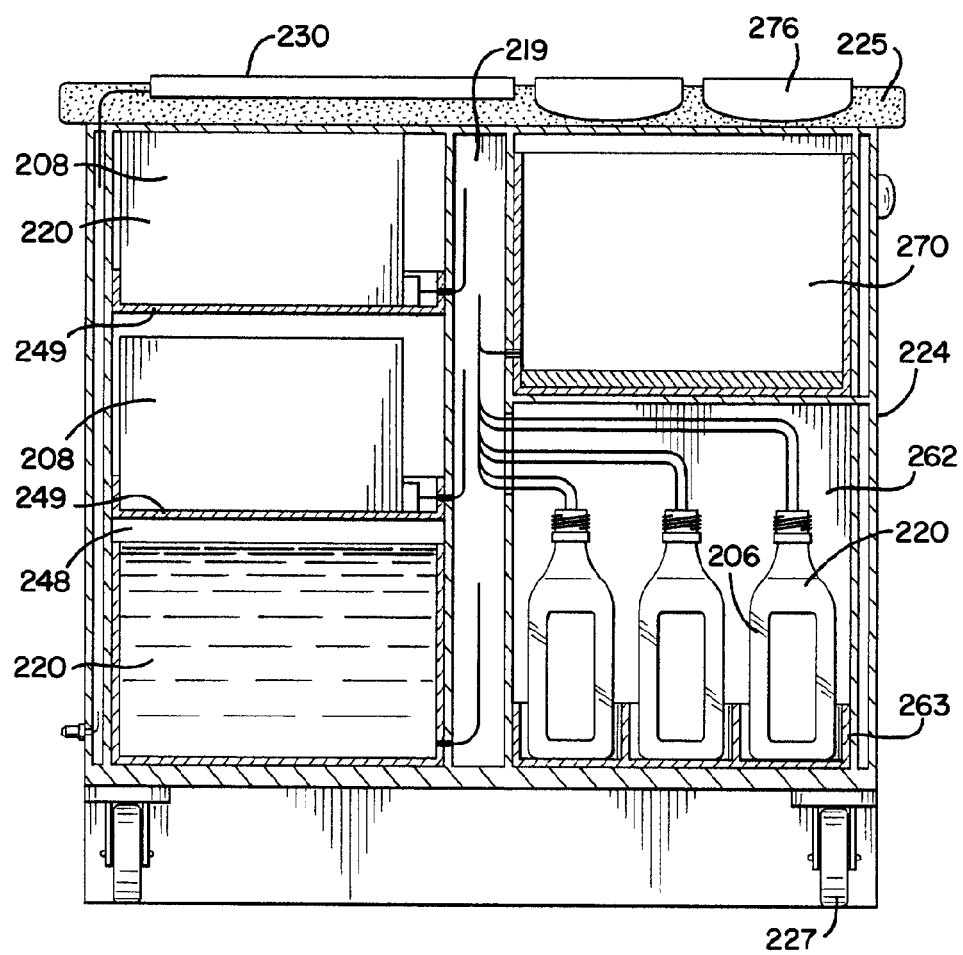
FIG. 14 is a partial internal front view of the interior of the beverage dispenser of FIG. 11.

FIG. 14 depicts a partial internal front view of one embodiment of the lower cabinet member 224. In that embodiment, there are three compartments shown: a first compartment 262, a second compartment 248, and a third compartment 270.

Figure 16:
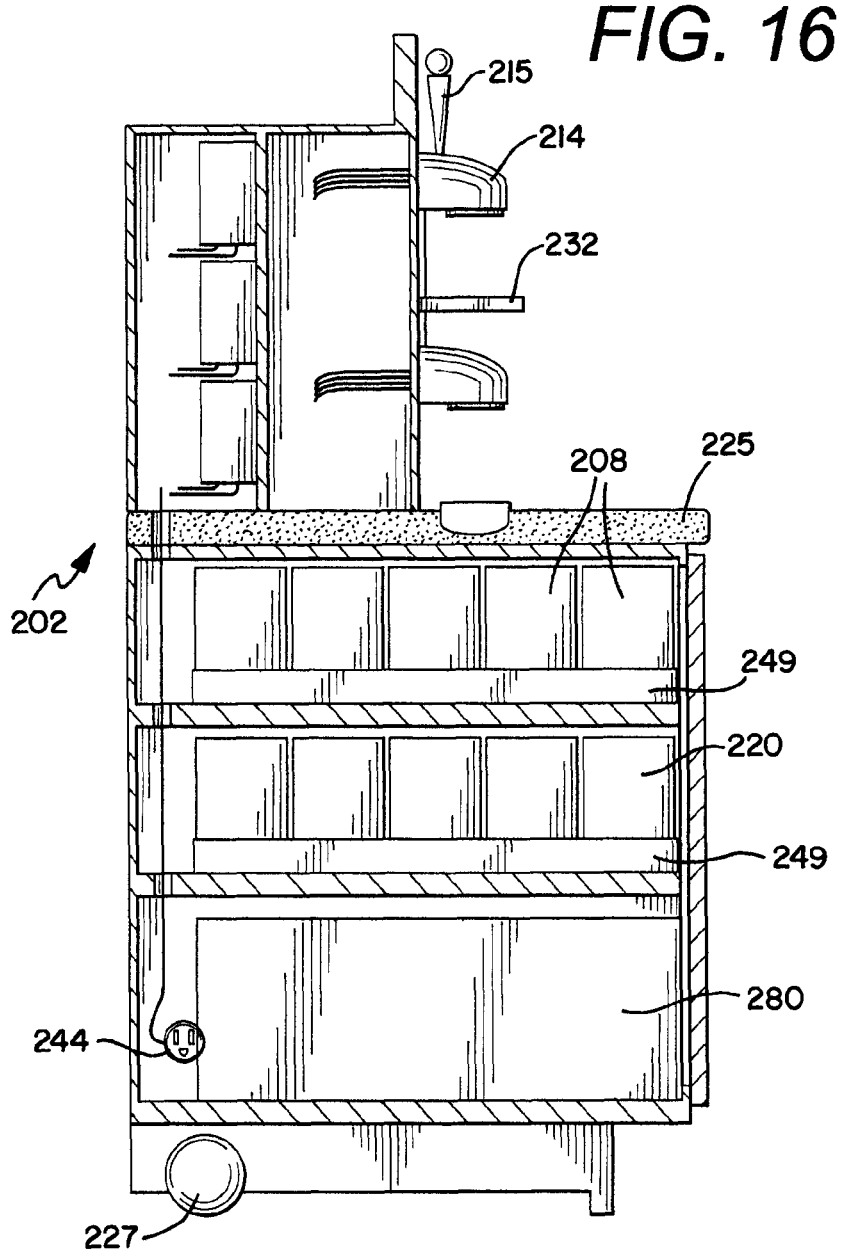
FIG. 16 is a partial internal left side view of the interior of the beverage dispenser of FIG. 11.
Figure 18:
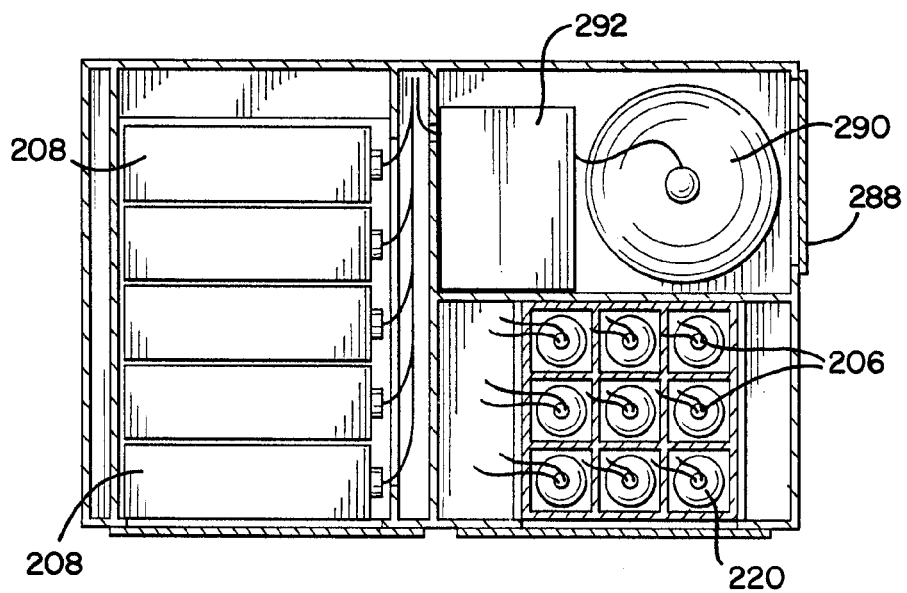
FIG. 18 is a partial internal top view of the lower cabinet of the beverage dispenser of FIG. 11.

As shown in FIG. 14, second compartment 248 contains two sliding trays 249 and a removable water reservoir 280. The sliding trays 249 can slide in and out of the second compartment 248 to provide access to the various beverage supplies 20 on the tray 249. As is shown in FIG. 16, in one embodiment, each tray 249 can hold 5 small standard mixer boxes. Preferably, two trays 249 are located in second compartment 248 and each tray 249 can hold five boxes of mixer. Other combinations of compartments and trays are also within the scope of the invention. FIG. 18 depicts the partial interior top view of the lower cabinet member 224. As shown in FIG. 18, in one embodiment the tray may hold up to five boxes of mixers. FIG. 18 further depicts the hoses 240 that connect the beverage supplies 220 and the carbon dioxide tank 290 and carbon dioxide pump 292 with the devices in the upper cabinet member 222.

Figure 15:
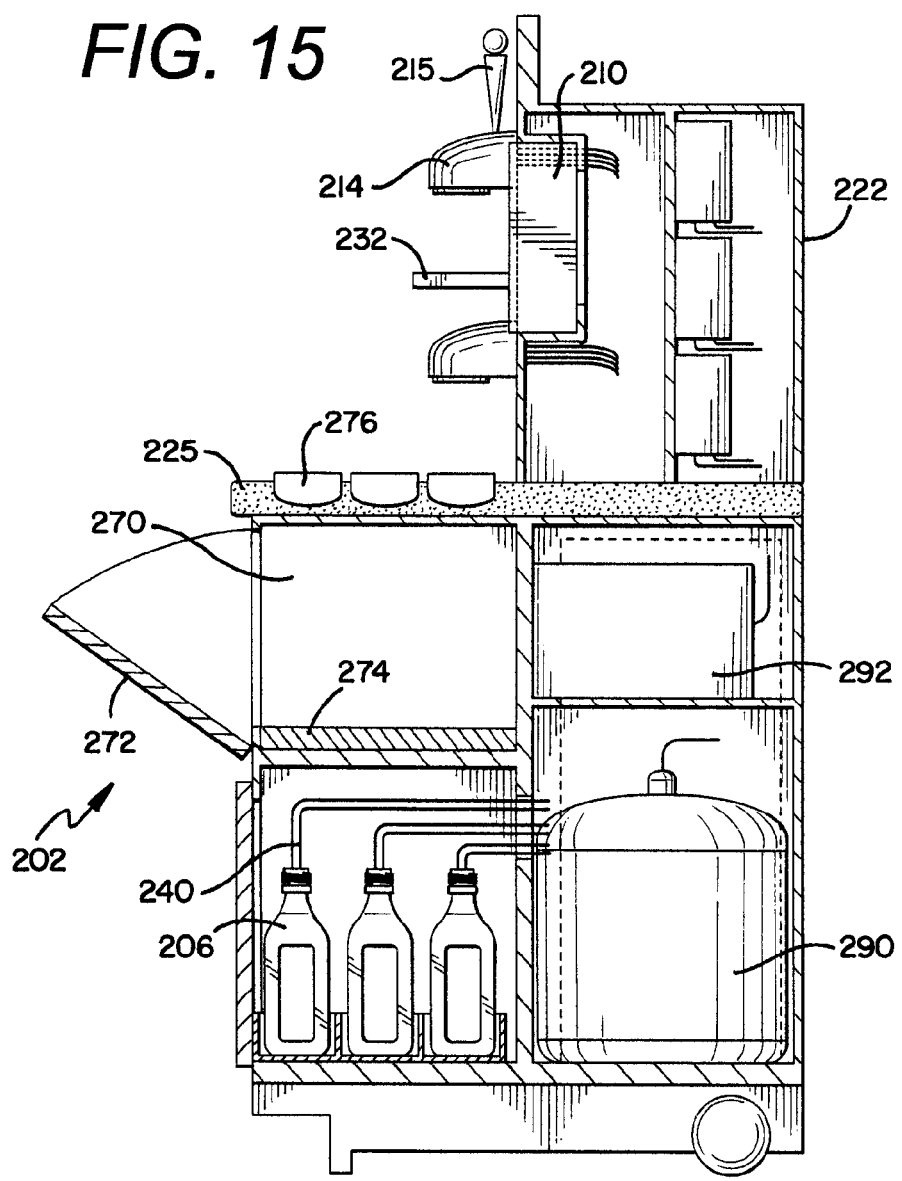
FIG. 15 is a partial internal right side view of the interior of the beverage dispenser of FIG. 11.

In the embodiment shown in FIG. 14, the third compartment 270 contains an ice drawer 272, which opens outward at an angle to expose the ice, as shown in FIG. 15. There may also be a cooling plate 274 located in or under the ice compartment 270, as is depicted in FIG. 13, to keep the ice cool.

In the embodiment shown in FIG. 14, the first compartment 262 contains a sliding drip drawer 263 that can hold a plurality of beverage containers 206. In one embodiment, as shown in FIG. 15, the drip drawer 263 is 3 inches tall, 11 inches long, and retains nine bottles of alcohol 206.

In the embodiment shown in FIG. 15, the $CO_2$ tank 290 and the $CO_2$ pump 292 are located in the rear portion of the lower cabinet member 224 behind $CO_2$ access door 288.

As shown in FIGS. 15 and 16, in this embodiment the beverage supplies 220 are fluidly connected to the dispenser spouts 214, preferably with hoses or tubing 240. Further, in this embodiment if any of the beverage supplies 220 contain syrup, the syrup containers may be connected to a mixing box 221 with hoses 240. The $CO_2$ tank 290 may also be connected to the mixing box 221 with hoses 240, such that the $CO_2$ may be pumped into the mixing box 221 via the $CO_2$ pump 292. The $CO_2$ tank will release $CO_2$ that will be pumped through the hoses 240 into the mixing box 221, and the beverage supplies 220 will release syrup that will be pumped through the hoses 240 into the mixing box 221. In the mixing box 221, the released $CO_2$ will generally mix with the syrup and water (also pumped into the mixing box 221) to produce carbonated beverages. The mixing box 221 may then be connected to the dispenser spouts 214 with hoses 240 such that the mixed and carbonated liquid may flow through hoses 240 to reach the dispenser spouts 214. Alternatively, the syrup may be mixed with carbonated water at the dispenser spout 214. In a preferred embodiment, a regulator (not shown) is attached to the carbon dioxide tank or located within the beverage dispenser 202 such that the pressure of the carbon dioxide may be adjusted. There may also be a pressure sensor connected to the carbon dioxide line and to the sensor system (not shown) for control and sensing functions.

For other beverages, the liquid may flow from the beverage supplies 220 through the hoses 240 directly to the dispenser spouts 214. There may also be fittings connected to the beverage containers such that each fitting has an associated shut-off valve that can be closed while the operator changes the containers. In another embodiment, the beverage dispenser 202 may dispense beer from a keg placed next to the beverage dispenser 202. The keg may be fluidly connected to the beer tap 215 with hoses 240 such that the beer flows from the keg to the tap 215.

Generally, users operate the beverage dispenser 202 of this embodiment through the interface 210. In one embodiment, the interface 210 is a touch screen.

In a preferred embodiment, the beverage dispenser 202 also comprises a server 4, as explained in connection with FIGS. 2 and 27-30. Components of the server 4 generally control the operation of all of the pumps, valves, and all other electrical and mechanical components of the beverage dispenser system 1. In one embodiment, components of the server 4 contain software that will allow it to direct the production of beverages that the operator selects through the interface 210. Components of the server 4 may contain a memory board. The server 4 may be separate from the interface 210, or the server 4 may be integral with the interface 210. Components of the server 4 can be programmed to display the types of drinks that the beverage dispenser can make onto the display screen 210, and they may be programmed to contain recipes for most bar-ready mixed drinks. In one embodiment, software in components of the server 4 may also include a measuring system such that the correct amount of each drink ingredient is added to the beverage, either sequentially simultaneously. Components in the server 4 may also be programmed to record the ingredients used and drinks made for an accounting of usage. There may also be an open recipe option included in the controller software. A detailed explanation of the server 4 system is described herein.

Additionally, in one embodiment, a speaker (not shown) is attached to the beverage dispenser 202 that relays directions to the operator. The speaker may operate along with the menu on the display screen 210, or the speaker might operate separately from the menu on the display screen 210. For example, the speaker may give the operator additional instructions.

In this embodiment, an operator may use the invention by first placing a glass on the work surface 225 under a dispenser 214. The operator may view a menu of possible drinks on the display screen 210. As explained in detail herein, the operator will then use the interface 210 to select the drink that he or she would like, and the server 4 will control delivery of the appropriate types and quantities of beverage supplies 220 to the dispenser spout 214. The selected drink will then be delivered into the operator's glass. A detailed method of operation and explanation of the system 1 is described herein.

Reference will now be made to FIGS. 19-26, which illustrate a preferred embodiment of the dispensing assembly or dispensing spout assembly 14, which is preferably utilized in the embodiment of the beverage dispenser 2 of FIGS. 1-10. Referring now to FIG. 19, as explained above, the dispensing assembly 14 is fixed above an open cavity 26 of the upper cabinet 22 of the beverage dispensing machine 2, and is located above a grate 28 covering drip pan collector 30. The distance between the dispensing assembly 14 and the grate 28 is sufficiently large to allow a beverage container, such as a cup, to be placed upon the grate 28 and underneath the dispensing assembly 14 for dispensing a beverage from the dispensing assembly 14 into the beverage container. The dispensing assembly 14 is connected to a plurality of beverage ingredients 20 through a plurality of tubes 40 as described in detail herein. In a preferred embodiment the dispensing assembly 14 generally comprises a dispensing mechanism for dispensing a mixers, a mixing bowl for mixing the mixers (typically with carbonated water) prior to the mixers being dispensed into the waiting beverage container; and a dispensing mechanism for dispensing an alcohol into the waiting beverage container.

Figure 20:
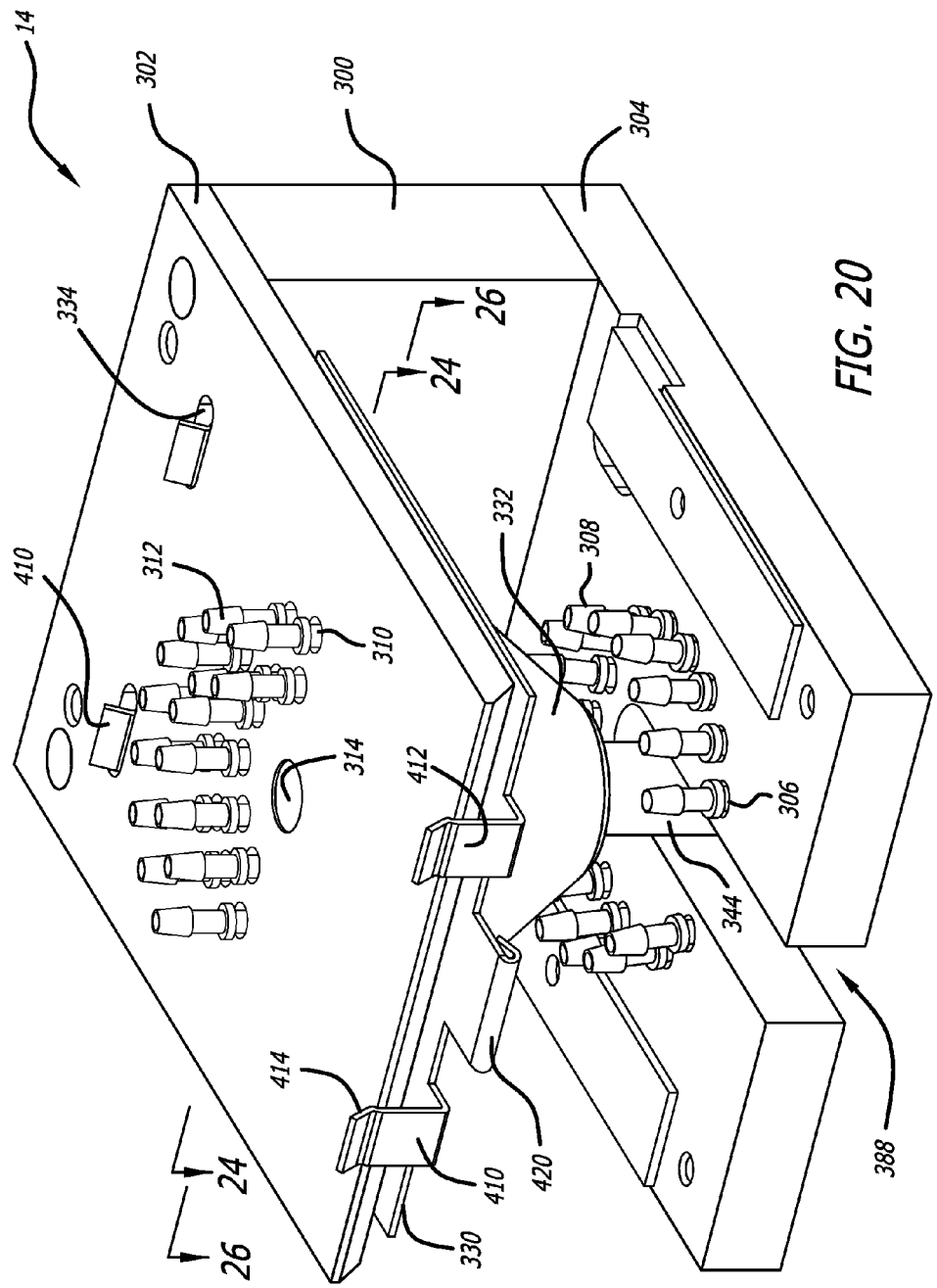
FIG. 20 is an enlarged perspective view of the beverage dispensing assembly shown in FIG. 19.

As shown in FIG. 20, in one embodiment the dispensing assembly 14 has a mounting bracket comprised of a mounting plate 300, an upper dispensing plate 302 and lower dispensing plate 304. In one embodiment, the upper dispensing plate 302 and the lower dispensing plate 304 are mounted perpendicularly to the mounting plate 300 and parallel to each other. Mounting plate 300 fixedly connects upper dispensing plate 302 and lower dispensing plate 304 in spaced relation.

As shown in FIG. 20, the lower dispensing plate 304 has a plurality of fitting apertures 306 for holding a first set of fittings 308, and the upper dispensing plate 302 has another plurality of fitting apertures 310 for holding second set of fittings 312. The fittings 312 and 308 are preferably connected to tubing (not shown in FIGS. 20, 25 and 26) which is connected to a variety of beverage supplies 20. As explained herein, the beverage supplies may comprise beverages and beverage components in bags, boxes, bottles, bag-in-boxes, or other beverage containers that contain the beverage ingredients that the beverage dispenser 2 will utilize to make mixed beverages. In some examples, the beverage ingredients connected to the second fittings 312 are provided from a second set of ingredients 8, such as mixing ingredients, that may include juice, soft drink syrup, tonic, cocktail mixers, or other types of non-alcoholic ingredients, while the beverage ingredients connected to the first set of fittings 308 are provided from a first set of ingredients 6 that may include a variety of alcoholic ingredients, such as rum, gin, vodka, whiskey, tequila, etc. The upper dispensing plate 302 also has a larger dispensing aperture 314 used to connect a water supply 80 to the dispensing assembly 14 for mixing water, including carbonated water, with the mixing ingredients 8. In a preferred embodiment, there are fifteen fitting apertures 312 in the upper dispensing plate 302 arranged in an arcuate configuration, and sixteen fitting apertures 308 in the lower dispensing plate 304 arranged in an arcuate configuration.

The mounting plate 300, upper dispensing plate 302, and lower dispensing plate 304 of the mounting bracket may be constructed out of plastic, metal, aluminum, or any other suitable material. In one embodiment the upper dispensing plate 302 and lower dispensing plate 304 are attached to the mounting plate 300 via fasteners, such as nails, screws, or bolts. The fasteners extend through mounting apertures 320 in the upper dispensing plate 302 and lower dispensing plate 304, respectively, and are secured to the mounting plate 300. Alternately, the mounting plate 300, upper dispensing plate 302 and lower dispensing plate 304 of the mounting bracket may be connected via welding or with the use of an adhesive. Further yet, in another alternate embodiment the mounting plate 300, upper dispensing plate 302, and lower dispensing 304 may be constructed or molded from a single piece of material.

Figure 21:
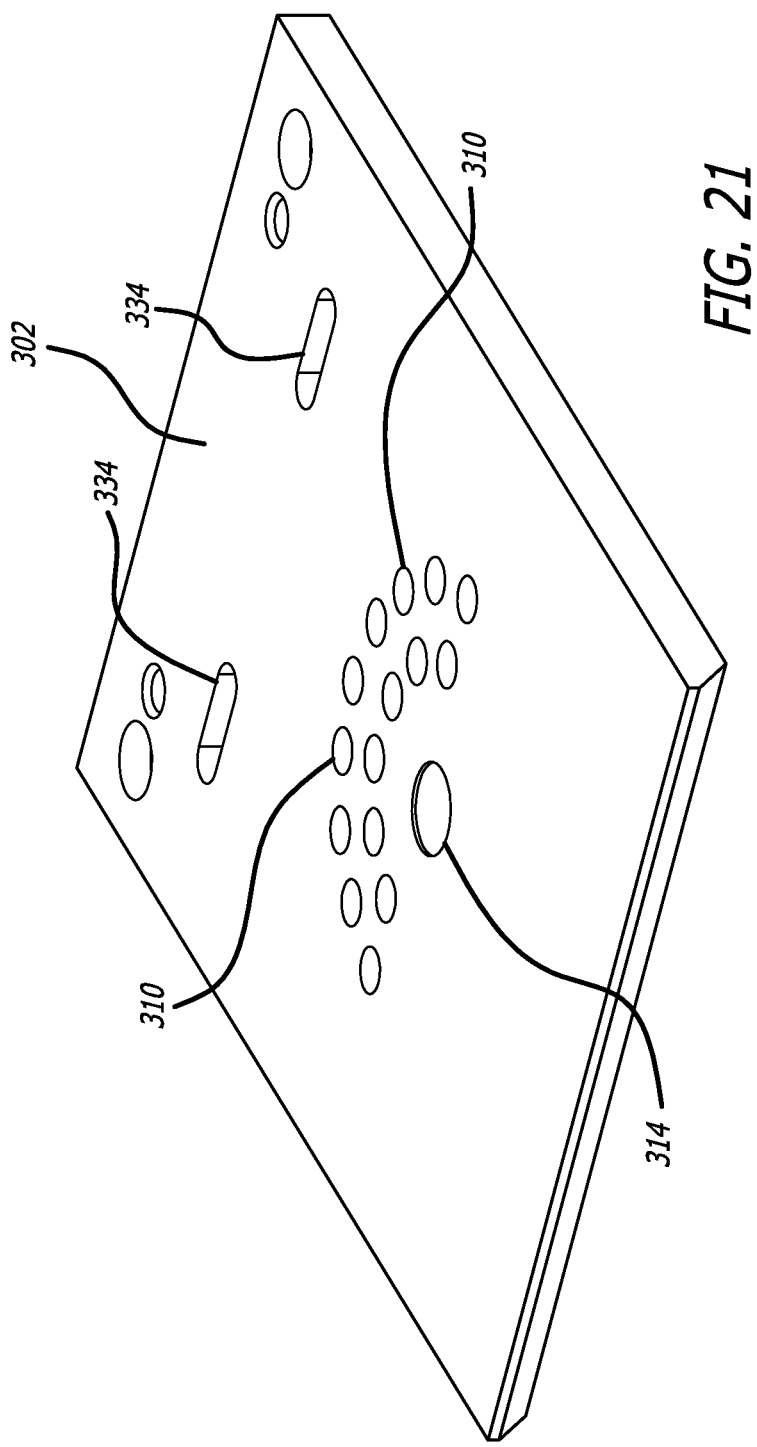
FIG. 21 is a perspective view of the top of the upper dispensing plate of the beverage dispensing assembly of FIG. 20, showing the upper dispensing plate without fittings and without the attachments to other portions of the beverage dispenser.
Figure 22:
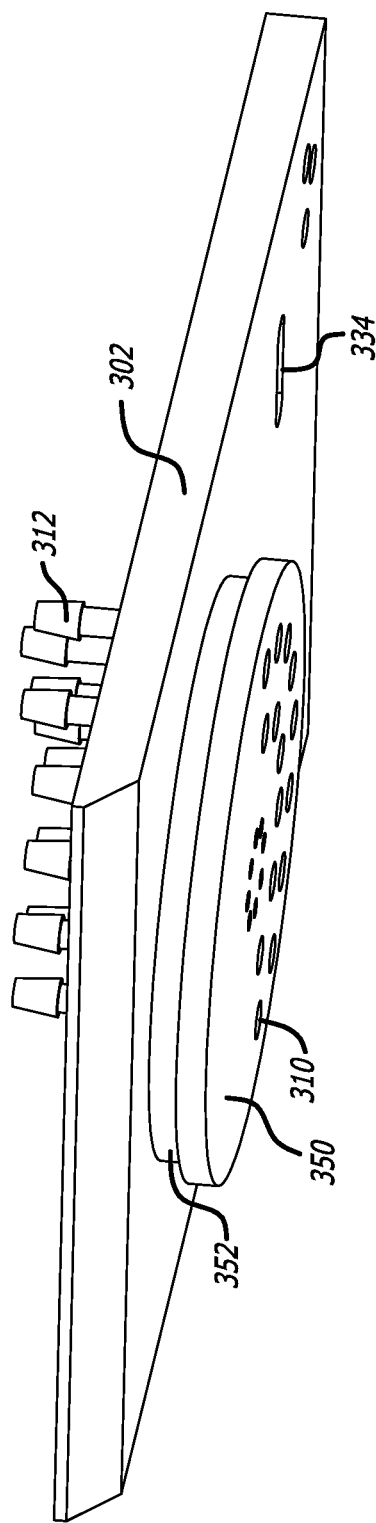
FIG. 22 is a perspective view of the bottom of the upper dispensing plate of the beverage dispensing assembly of FIG. 20, showing the condition where fittings are attached to the upper dispensing plate.
Figure 23:
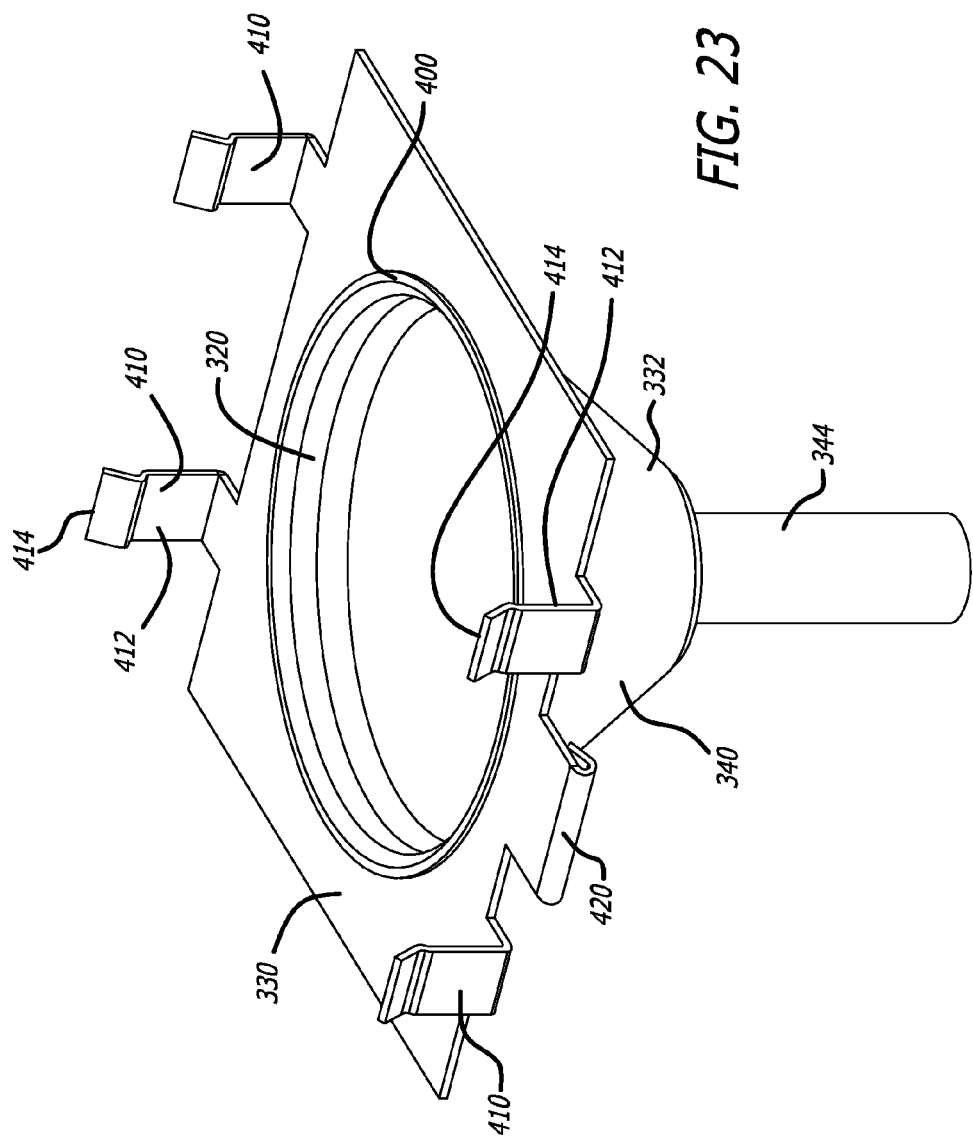
FIG. 23 is a perspective view of the carrier and mixing bowl of the beverage dispensing assembly of FIG. 20.

Referring to FIGS. 20 and 23, one embodiment of the dispensing assembly 14 also comprises a carrier 330 that supports a mixing bowl 332 for mixing some of the beverage ingredients. In one embodiment the carrier 330 is attached to the upper dispensing plate 302. In such an embodiment, a portion of the mixing bowl 332 may extend below the lower dispensing plate 304 as shown in FIG. 20. As shown in FIGS. 21 and 22, in one embodiment the upper dispensing plate 302 also has clipping apertures 334 that are used to allow the carrier 330 to be connected to the upper dispensing plate 302, as further discussed herein.

Figure 24:
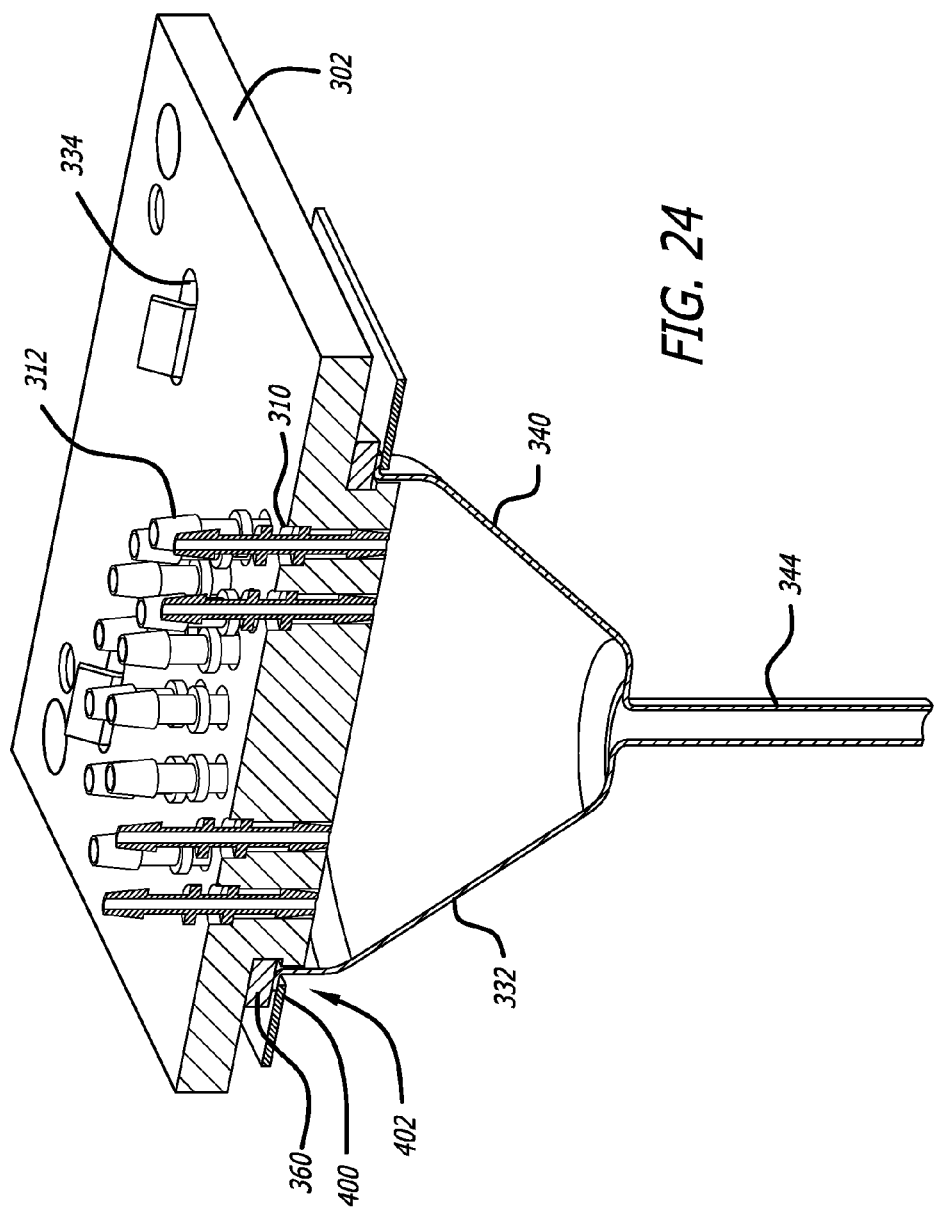
FIG. 24 is a cross-sectional view of the upper dispensing plate, carrier, and mixing bowl taken through line 24-24 of the beverage dispensing assembly of FIG. 20.

As best shown in FIG. 24, in one embodiment each second fitting aperture 310 extends through the upper dispensing plate 302 perpendicularly such that the fittings 312 may direct beverage ingredients into the mixing bowl 332. Accordingly, as shown in FIG. 20, the beverage ingredients are mixed in the bowl portion 340 of mixing bowl 332. The particular relational configuration of the fitting apertures 310 and mixing bowl 332, shown in FIGS. 20 and 21, ensures that each beverage ingredient dispensed through the second fitting apertures 310 will make contact with the bowl portion 340 of mixing bowl 332 for proper mixing before traveling through a stem portion 344 of the mixing bowl 332 and being dispensed into a waiting beverage container. The number of apertures 310 and the configuration thereof may vary depending on variety of factors. These factors may include the number of beverage ingredients used to create the mixed beverages, the size of the fittings, the shape of the fittings, and or the size and shape of the mixing bowl 332.

Figure 26:
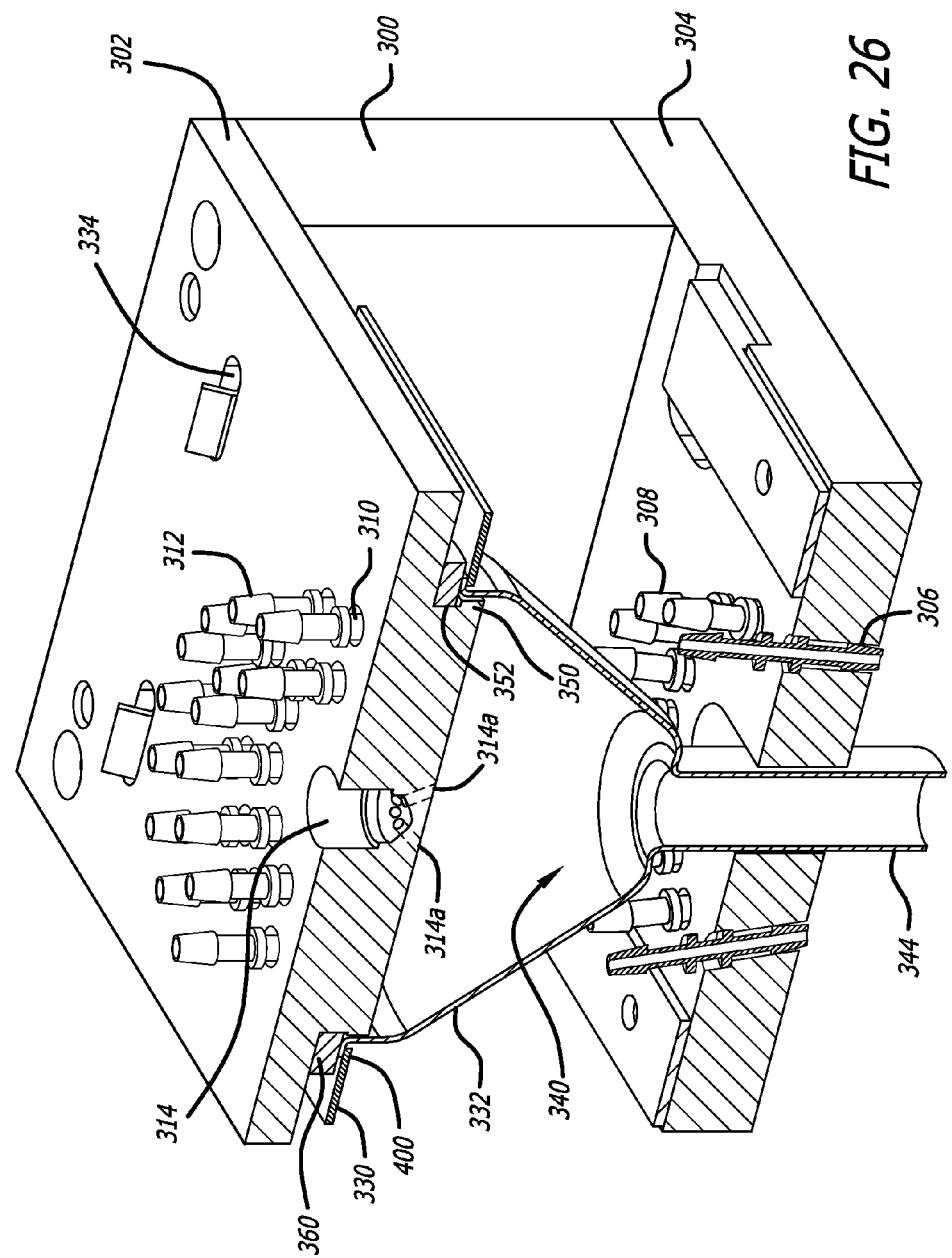
FIG. 26 is a cross-sectional view taken through line 26-26 of the beverage dispensing assembly of FIG. 20.

Returning to FIG. 21, the upper dispensing plate 302 also contains a dispensing aperture 314 for connecting the dispensing assembly 14 to a water supply. In one embodiment, the opening to the dispensing aperture 314 has a diameter greater than the diameter of fitting apertures 310. In such an embodiment it is centered over the mixing bowl and partially bordered by the plurality of fitting apertures 310. The water supplied through dispensing aperture 314 may be tap, filtered, carbonated, or any combination thereof. As shown in FIG. 22, illustrating the bottom surface of the upper dispensing plate 302, and as shown in FIG. 26, illustrating a cross-section of the upper dispensing plate 302, the exit to the dispensing aperture 314 comprises a plurality of separate angularly disposed ports 314a. Referring to FIG. 26, in a preferred embodiment the separate ports 314a may be directed at an outward angle to a centerline of the dispensing assembly 14 such that the water is directed outwardly toward the bowl portion 340 of mixing bowl 332. The outwardly directed angle of the plurality of dispensing aperture ports 314a ensures that the water is dispersed throughout the mixing bowl 332. This configuration also ensures that the water, dispensed through the dispensing aperture ports 314a, mixes with the other beverage ingredients, dispensed through the fitting apertures 310, in the mixing bowl prior to the water and beverage ingredients being dispensed into the waiting beverage container. Additionally, the separate dispensing of water through the plurality of outwardly angled ports 314a following the dispensing of the requested beverage may also provide to clean the inner surface of the mixing bowl 332 between beverage dispenses. In such a manner residual amounts of a dispensed beverage ingredient are removed from the inner surface of the mixing bowl 332 to prevent unwanted cross-mixing of beverage ingredients 20.

Also shown in FIG. 22, the bottom surface of upper dispensing plate 302 has a projection 350 extending therefrom. Preferably, the geometrical configuration of the projection 350 is designed to mate with the geometrical configuration of the opening to the mixing bowl 332. Accordingly, in a preferred embodiment illustrated in FIG. 25, the projection 350 is cylindrically shaped to mate with the cylindrical opening to the funnel of the mixing bowl 332. In such an embodiment the diameter of projection 350 is smaller than the inner diameter of the mixing bowl 332 such that projection 350 extends into the interior region of the opening to bowl portion 340 of mixing bowl 332. This ensures that all beverage ingredients dispensed from the second fittings 312 are dispensed into the interior of the mixing bowl 332. Projection 350 also comprises an undercut 352. Undercut 352 of the projection 350 is provided to allow for placement and retention of a gasket 360 (shown in FIG. 24). As shown in FIG. 24, the gasket 360 is thus located between the upper dispensing plate 302 and the mixing bowl 332 in order to form a substantially fluid tight seal. The gasket 360 may be made out of any rubber, plastic or other sealant type material such that the it creates a substantially fluid tight seal between the upper dispensing plate 302 and mixing bowl 332.

Figure 25:
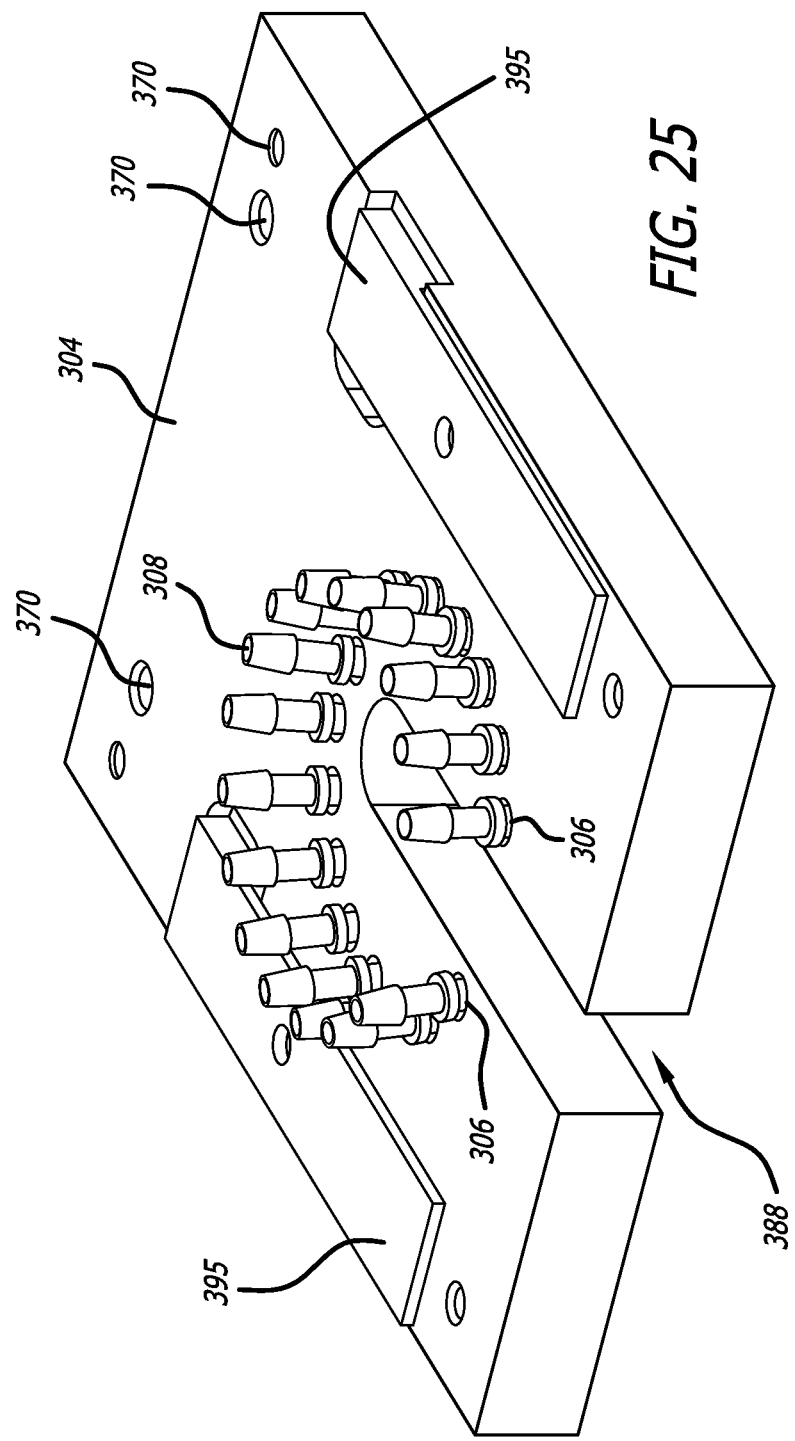
FIG. 25 is a perspective view of the top of the lower dispensing plate of the beverage dispensing assembly of FIG. 20.

Referring now to FIG. 25, there is shown a top perspective view of one embodiment of the lower dispensing plate 304. The lower dispensing plate 304 has apertures 370 for holding fasteners to attach the lower dispensing plate 304 to the mounting plate 300. Lower dispensing plate 304 also has a plurality of apertures 306 for the placing of fittings 308 and an open region 388 sufficiently large to allow the stem 344 of the mixing bowl 332 to extend through lower dispensing plate 304. In the current embodiment, the apertures 306 are configured in an arcuate design and pass through the lower dispensing plate 304 at an angle toward the center of the lower dispensing plate 304. This angled design allows the fittings 308 to dispense the beverage ingredients into the center of a beverage container positioned below the beverage dispensing assembly 14. Such an arrangement increases the chances that the liquid dispensed through the apertures 306 is placed within the beverage container and is not dispensed outside the beverage container. This configuration also allows for better mixing with the beverage ingredients dispensed from stem 344 of the mixing bowl 332. The fittings 308 are generally connected to tubes (not shown in this figure) that are fluidly connected to a plurality of beverage supplies 20. In the current embodiment, the fittings 308 are connected to a supply of alcoholic beverages ingredients but it should be apparent to one of ordinary skill that any beverage ingredient may suffice. In one embodiment the lower dispensing plate 304 has sixteen apertures 306/fitting 308 combinations, however, it is understood that a greater or lesser number of aperture/fitting combinations may be present. For example, in an alternate embodiment the dispensing plate has thirty-two apertures/fittings for dispensing alcoholic beverages. In such an alternate embodiment a first arcuate arrangement of apertures/fittings is provided, and a second arcuate arrangement of apertures/fittings is also provided and located concentric to the first arcuate arrangement.

The lower dispensing plate 304 also contains plates 395 which cover a variety of electronic components and circuitry, and protect these components from liquids used in the beverage dispensing assembly. In one embodiment, the plates cover LED lights that emit light downwardly from the dispensing assembly 14 toward the open cavity 26 of the upper cabinet member 22 of the beverage dispensing machine 2 so that when a beverage container is place in position to receive a beverage the area is lit.

As shown in FIG. 20, the lower dispensing plate 304 also has an opening 388 through which the stem 344 of the mixing bowl 332 extends to allow the liquid to be dispensed from the mixing bowl 332 into a beverage container. In a preferred embodiment, the opening 388 comprises a recess extending from the front edge of the lower dispensing plate 304. This preferred structure also allows the carrier 330 and mixing bowl 332 to be more easily removed from the dispensing assembly 14 for cleaning and the like.

As shown in FIG. 23, in one embodiment the carrier 330 retains the mixing bowl 332. In a preferred embodiment the mixing bowl 332 has a funnel-like shape with a bowl portion 340 and stem portion 344. Mixing bowl 332 also has a flange 400 that extends from a circumference of the opening to the bowl portion 340 of the mixing bowl 332. Additionally, in one embodiment the carrier 330 has an opening 402 which is designed to allow the mixing bowl 332 to pass through a portion of the carrier 330. In a preferred embodiment, the opening 402 in the carrier 330 is circular to match with the circular geometry of the mixing bowl 332. In such embodiment, as shown in FIG. 24, the opening 402 has a diameter which is larger than the outer diameter of the bowl portion 340 of the mixing bowl 332, but which is also smaller than the circumference of the outer edge of the flange 400 of the mixing bowl 332, such that the flange 400 rests on the upper surface of the carrier 330, suspending the bowl portion 340 and stem portion 344 of the mixing bowl 332 below the carrier 330.

Also shown in FIG. 23, the carrier 330 also has a plurality of clip members 410 extending therefrom. The clip members 410 are used for removably retaining the carrier 330 and mixing bowl 332 to the upper dispensing plate 302. In one embodiment the clip members 410 are spring members that have a leg 412 and a transition 414 at the end of the leg 412. As shown in FIG. 20, the rear clip members 410 extend through the clip apertures 334 in the upper dispensing plate 302 and the transition 414 rests on the upper surface of the upper dispensing plate 302. Similarly, the transitions 414 on the front clip members 410 of the carrier 330 rest on the upper surface of the upper dispensing plate 302, thereby fixedly, but removably, securing the carrier 330 and mixing bowl 332 to the upper dispensing plate 302. In a preferred embodiment, the carrier 330 is removable from the upper dispensing plate 302 to allow for the removal of mixing bowl 332 for cleaning, replacing, or other purposes. To release carrier 330 from the upper dispensing plate 302, one would apply a release force to the front clip members 410 to release the transitions 414 from engagement with the upper dispensing plate 302 such that the front clip members 410 will unclip from the upper dispensing plate 302. Although in the current example the carrier 330 includes flexible clip members 410 to attach and retain the carrier 330 to the upper dispensing plate 302, one of ordinary skill will recognize that the carrier 330 may be removably fixed to upper dispensing tray 302 using a variety of fasteners and materials without straying from the scope of the current design. Such carriers may use such fasteners as snaps, hinges, or latches and be made out of metal or other plastic material or any combination thereof.

The carrier 330 also has a tab 420 which the user can retain to further manipulate the carrier 330 once the front clip members 410 are released from the upper dispensing plate 302 and to assist the user in removing the rear clip members 410 from the clip apertures 334. In one embodiment the carrier 330 is made out of stainless steal, including a stainless spring steel, however, in alternate embodiments the mixing bowl 332 may be made out of other suitable materials such as other metals, plastic, etc. and any combination thereof. Similarly, in one embodiment, the mixing bowl 332 is made from stainless steel, however, alternate materials, such as other metals, plastic, glass, etc., and any combination thereof, may be utilized.

In order to fully understand the arrangement of the components described above, FIG. 24 is provided and illustrates a cross-sectional view, taken through line 24-24 of FIG. 20, of the upper dispensing plate 302 (including the apertures 310 and fittings 312), carrier 330, mixing bowl 332 and gasket 360. The mixing bowl 332 extends through the opening 402 in the carrier 330, and the flange 400 extending from the circumference of the opening to the mixing bowl 332 engages the carrier 330. Additionally, the gasket 360 that surrounds the undercut portion 352 of projection 350. When the carrier 330 and mixing bowl 332 are connected to the upper dispensing plate 302, the projection 334 of upper dispensing plate 302 enters the inner cavity of the bowl portion 340 of mixing bowl 332. Additionally, when the projection 350 is seated within the inner cavity of the mixing bowl 332 the gasket 360 connected to the periphery of the projection 350 engages the flange 400 of the mixing bowl 332 to form a substantially fluid tight seal between the upper dispensing plate 302 and the mixing bowl 332. In this orientation the apertures 310 and fittings 312 are configured to ensure that all beverage ingredients dispensed from fittings 312 are directed into the mixing bowl 332 and mixed therein as they travel through the bowl portion 340 prior to exiting the mixing bowl 332 through stem 344.

Referring now to FIG. 26, there is shown an embodiment of the dispensing assembly 14 in cross section. In this embodiment, the second set of beverage ingredients 8 is drawn via tubes connected to the beverage ingredient storage containers. The tubes are connected to fittings 312 and the mixer beverage ingredient is dispensed therethrough into the bowl portion 340 of mixing bowl 332.

Upon entering the bowl portion 340 of mixing bowl 332, the beverage ingredients are mixed together. Generally, syrup-type ingredients are fed through the fittings 312 and apertures 310, and mixed with carbonated water that is fed through the water aperture 314. The beverage ingredients mix as they travel through mixing bowl 332, and ultimately exit through the stem 344 where they are provided to a beverage container placed below the stem 344. The specific beverage ingredient from the second plurality of beverage ingredients 8 that is dispensed is dependent upon user input.

A beverage ingredient from the first set of ingredients 6, typically a beverage containing alcohol, is dispensed into the beverage container via fittings 308 and apertures 306. The fittings 308 are connected to the second set of beverage ingredients via a set of tubes. The specific beverage ingredient from the first set of beverage ingredients 6 that is dispensed is dependent upon user input. As shown in FIG. 26, the apertures 306 that hold the fittings 308 are angled inward such that the beverage ingredient from the first set of beverage ingredients 6 is dispensed into the cup at an angle toward the center of the cup. Since the second set of ingredients 8 are dispensed into the mixing bowl 332 while the first set of ingredients 6 is dispensed directly into the cup, the first set of ingredients and second set of ingredients are not mixed until they are combined in the cup. This configuration is allows for the creation of non-alcoholic mixed drinks. Further the possibility of unintentionally providing an alcoholic beverage is reduced since the only way for alcohol to get into the cup is by being dispensed directly in the cup. Additionally, the likelihood of contamination of a nonalcoholic drink is reduced as the interior of the mixing bowl 332 never has residual alcohol left in it from making a previous alcoholic beverage.

One of ordinary skill will recognize that the order in which the beverage ingredients are dispensed is of no consequence to the current designs. A beverage ingredient may be dispensed from the second set of beverage ingredients prior to being dispensed from the first set of ingredients, during dispensing of the first ingredient or following dispensing of the first ingredient.

In some examples, to further avoid contamination of a mixed beverage by residual amounts of the previously dispensed mixed beverage, the mixing bowl 332 may be cleaned using water dispensed from the water supply via the dispensing aperture 314. The water is dispensed after each mixed beverage is created, and after the beverage container has been removed, so that the mixing bowl 332 may be washed of any residual ingredients left in the mixing bowl 332. The dispensing aperture 314 has dispensing aperture ports 314a that are angled through the upper dispensing plate 302 at outward angles. This allows for the water to make contact with all portions of the mixing bowl 332. The water as well as any residual ingredients are dispensed out of stem portion 344 of mixing bowl 332.

Referring now to FIGS. 2 and 27-30D, a method and system for managing and dispensing beverages from an automatic beverage dispenser 2 is provided. The beverages may be comprised of a single or multiple ingredients, including a first plurality of liquids 6, a second plurality of liquids 8, and/or a combination of one or more first and second plurality of liquids. In addition, garnishes and sides may be included in the beverage. The beverages are dispensed according to a pouring schema. The pouring schema may be a beverage recipe and may be preprogrammed by a system manager, or alternatively, be chosen by a consumer during operation of the system. In addition, it is contemplated that the pouring schema may be programmed by another individual. In one embodiment, the first plurality of liquids may include liquors and the second plurality of beverages may include mixers which are mixed with the liquors to create the beverage.

FIG. 2 is a block diagram of a beverage dispensing system 1. The beverage dispensing system 1 includes a server 4, a beverage dispenser 2, a storage location 48 for a plurality of first liquids 6, a storage location 62 for a plurality of second liquids 8, and an operator interface 10. In one embodiment, the operator interface comprises a touch screen 10. As will be described in greater detail herein, the beverage dispensing system 1 may be programmed to dispense various combinations of liquors and mixers in a precise amount. The beverage dispensing system 1 may also include management functions, such as creating or revising beverage recipes, creating or revising menus, creating or revising pouring schema, product management and inventory tracking, reviewing dispensing reporting history, and financial tracking, such as tracking volume, count, and sales of beverages which are dispensed by the system 1. The beverage dispenser 2 of the beverage dispensing system 1 is more fully described above.

The beverage dispensing system 1 dispenses beverages according to a session beverage menu. As will be described in greater detail below, the session beverage menu identifies the beverages that may be dispensed for a particular session. The session beverage menu is created from a global beverage menu and is based on the ingredients which are provided and the pouring schema. The session beverage menu may be electronically adjusted by a manager, either at the beverage dispenser 2 through the interface 10, or remote and downloaded to the server 4 of the beverage dispenser 2 wirelessly or through the USB port 120.

FIG. 27 is a schematic diagram of one embodiment of the server 4, which includes use of an executable computer program. Generally, the computer program is executed by one or more special or general purpose digital computer(s), such as a personal computer (PC; IBM-compatible, or otherwise), personal digital assistant, workstation, minicomputer, or mainframe computer.

Generally, in terms of hardware architecture, the server 4 includes a processor 524, memory 518, and one or more input and/or output (I/O) devices 520 (or peripherals) that are communicatively coupled via a local interface 22. The local interface 522 can be, for example, but not limited to, one or more buses or other wired or wireless connections, as is known in the art. The local interface 522 may have additional elements, which are omitted for simplicity, such as controllers, buffers (caches), drivers, repeaters, and receivers, to enable communications. Further, the local interface may include address, control, and/or data connections to enable appropriate communications among the other computer components.

The processor 524 is a hardware device for executing software, particularly software 514 stored in memory 518. The processor 524 can be any custom made or commercially available processor, a central processing unit (CPU), an auxiliary processor among several processors associated with the server 4, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., or a 68xxx series microprocessor from Motorola Corporation.

The memory 518 can include any one or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 518 may incorporate electronic, magnetic, optical, and/or other types of storage media. The memory 518 can have a distributed architecture where various components are situated remote from one another, but can be accessed by the processor.

The software 514 in memory 518 may include one or more separate programs, each of which comprises an ordered listing of executable instructions for implementing logical functions. The software 514 in the memory 518 of the server 4 includes a beverage dispensing computer program with support capabilities and a suitable operating system (O/S). An example of suitable commercially available operating systems is the Windows operating system available from Microsoft Corporation. The operating system controls the execution of the present computer program.

If the server 4 is a PC or workstation, the software 514 in the memory 518 may further include a basic input output system (BIOS). The BIOS is a set of essential software routines that initialize and test hardware at startup, start the O/S, and support the transfer of data among the hardware devices. The BIOS is stored in ROM so that the BIOS can be executed when the server 4 is activated.

When the server 4 is in operation, the processor 524 is configured to execute software 514 stored within the memory 518, to communicate data to and from the memory 518, and to generally control operations of the server 4 pursuant to the software 514.

The beverage dispensing computer program may reside in, or have portions residing in, any computer such as, but not limited to, the server 4. The beverage dispensing computer program may be a source program, executable program (object code), script, or any other entity comprising a set of instructions to be performed. When a source program, the program needs to be translated via a compiler, assembler, interpreter, or the like, which may or may not be included within the memory 518, so as to operate properly in connection with the O/S. Furthermore, the beverage dispensing computer program can be written as (a) an object oriented programming language, which has classes of data and methods, or (b) a procedure programming language, which has routines, subroutines, and/or functions, for example, but not limited to. Visual Basic C, C++, Pascal, Basic, Fortran, Cobol, Perl, Java, and Ada. In one embodiment, the beverage dispensing computer program capabilities is written in Visual Basic.Net.

The I/O devices 520 may include input devices, for example, but not limited to, a keyboard, mouse, scanner, microphone, touch screens, user interfaces, bar code readers, stylus, laser readers, radio-frequency device readers, etc. Furthermore, the I/O devices 520 may also include output devices, for example, but not limited to, a printer, bar code printers, displays, etc. Finally, the I/O devices may further include devices that communicate both inputs and outputs, for instance, but not limited to, universal serial bus ("USB") connections, a modulator/demodulator (modem; for accessing another device, system, or network), a radio frequency (RF) or other transceiver, a telephonic interface, a bridge, a router, etc. As noted above, two types of I/O device 520 used in the beverage dispensing system 1 are a touch screen user interface 10 and a USB connection 520.

It should be noted that executable computer programs, such as the beverage dispensing computer program 514 can be stored on any computer readable medium for use by or in connection with any computer related system or method. In the context of the invention, a computer-readable medium can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

As described above, the dispensed beverage may be created from a first plurality of liquids 6, a second plurality of liquids 8, or a combination of one or more first and second plurality of liquids. Referring to FIGS. 2 and 27, resident in the memory 518 may include pouring schema data, such as beverage recipes, which are used by the beverage dispensing system 1 to dispense the desired beverage. Each beverage is dispensed according to a pouring schema (i.e., a beverage recipe that includes beverage types, amounts, ratios, garnishes, etc.) which is stored in the memory 518. The pouring schema may be preprogrammed by a system manager, or alternatively, be chosen by an operator during operation of the system. In addition, it is contemplated that the pouring schema may be programmed by another individual. In one embodiment, the first plurality of liquids 6 may include liquors, and the second plurality of liquids 8 may include mixers, which are mixed with the liquors to create the beverage, such as a beverage containing alcohol.

Figure 28:
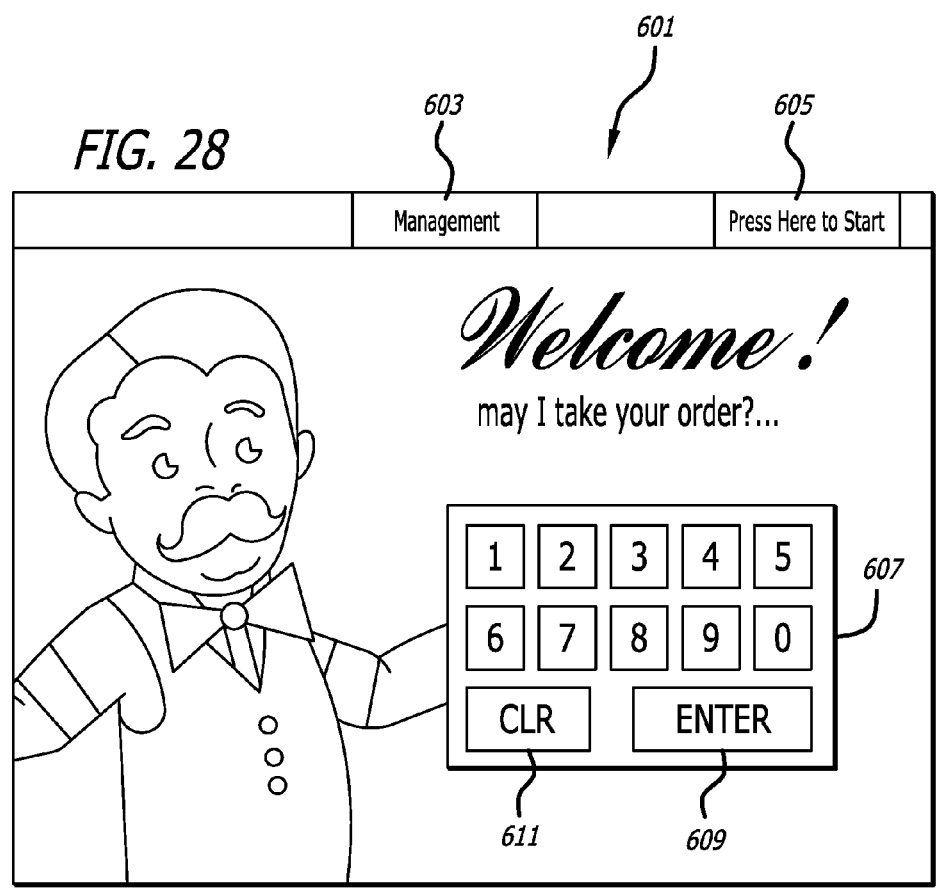
FIG. 28 is a screenshot of the entry screen that may be displayed on a display of the beverage dispensing system of FIG. 2.

As indicated above, the beverage dispensing system 1 may include management functions and dispensing functions. The management and dispensing functions may be accessed, programmed and/or controlled via the touch screen interface 10 for the beverage dispensing system 1. FIG. 28 illustrates a screenshot of the entry screen 601 that may be displayed on the touch screen interface 10. The entry screen 601 may include a management function button 603 and a dispensing function button 605. If the user selects the management function button 603, the system permits the user to access interfaces to control, program, or access various management functions. If the user selects that dispensing function button 605, the system permits the user to access interfaces for dispensing selected beverages. It is contemplated that the beverage dispensing computer program may be programmed to require the user to enter an authorization code to have access to the management functions and/or dispensing functions. The authorization code may be a password which is composed of a numeric, alpha-numeric, or other characters which are entered via the user interface. Alternatively, the authorization code may be a fingerprint scan, retinal scan, or other types of biometric indicators. If a password is required, the entry screen 601 may also include a numeric or alpha-numeric keypad 607 for entry of the password. It is understood that access to interfaces for the management functions and access to interfaces for the dispensing functions may utilize the same password, or may require different passwords.

During operation, the operator may select the management function button 603. Preferably, the operator is a system manager. Upon selection of the management function button 603, a keypad 607 (of the type illustrated in FIG. 28) may be displayed on the interface 10. The operator may begin the password entry process by entering a password by depressing numbers on the keypad 607 and selecting the enter button 609. If the operator incorrectly selects an entry prior to selecting the enter button 609, the operator may select the clear button 611 to restart the password entry process. If the operator enters the correct password, operator may be provided with access to the management function of the system 1. If the operator enters an incorrect password, the operator will not be provided access to the management function of the system 1.

If the operator enters the correct password, operator is provided with access to the management function of the system 1. FIGS. 29A-29G illustrate a screenshots of the management function interfaces that may be displayed on the touch screen interface 10 when the operator is provided access to the management function of the system 1. The management function screen may include buttons that correspond to different management functions that may be implemented in the system 1. The management function screen may include a Reports button 615, a User Accounts button 617, a Bar Setup button 619, a Priming button 621, a Create a Drink button 623, and a Drink Glass Size button 625. An operator may select any of the tabs to access appropriate management functions, as will be described herein. Each management function is a separate component of the management capabilities.

Figure 29A:
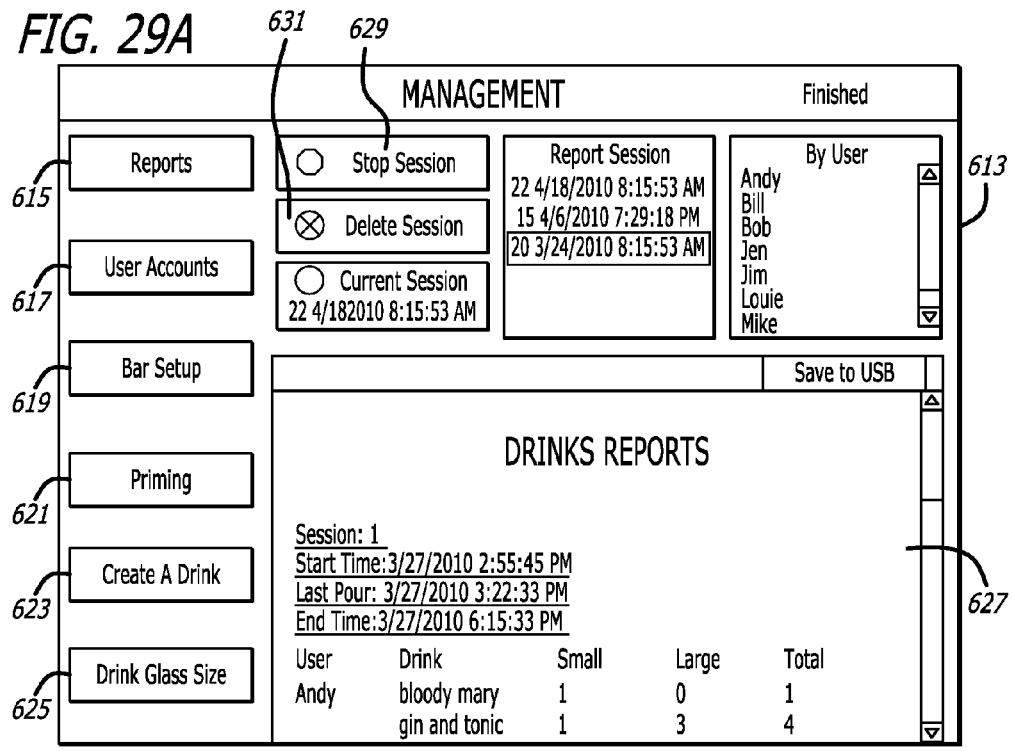
FIGS. 29A-29G are screenshots of the management function of the beverage dispensing system described herein.
Figure 29B:
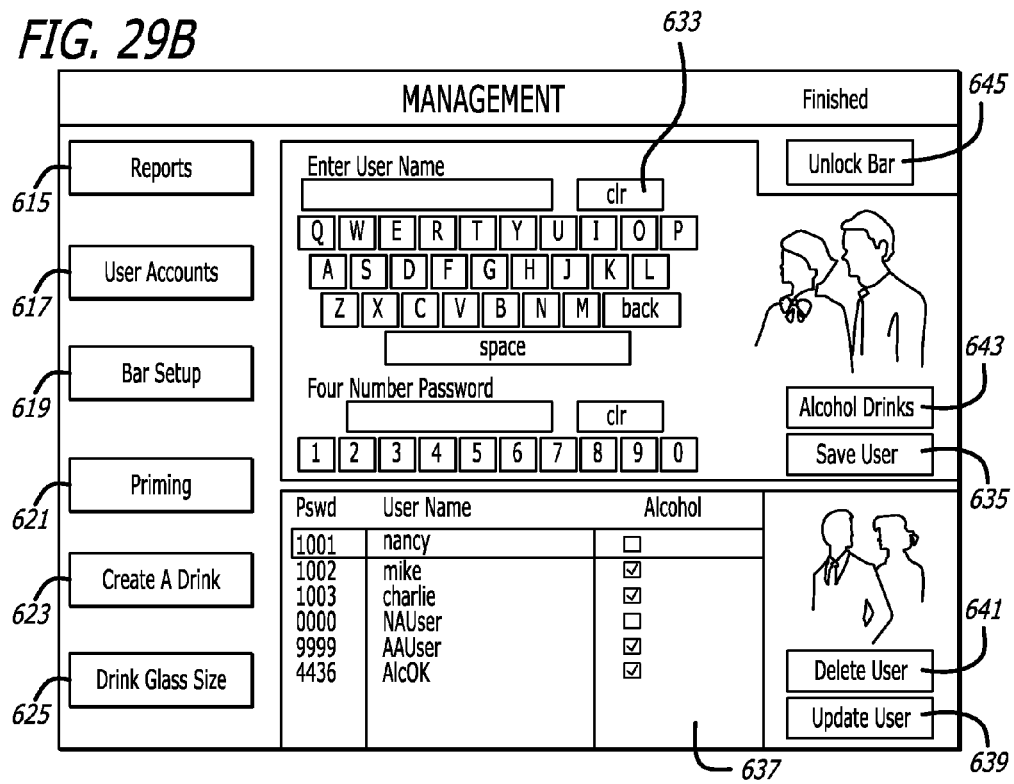

An operator may select the Reports button 615 to access reporting functions of the system 1. FIG. 29A illustrates a screenshot of the display under the Reports button 615. The system 1 may be programmed to track all beverages dispensed over a time period, referred to as a report session. Alternatively, the system 1 may also be programmed to provide a reporting session for particular user accounts, which may be selected in a By User selection box 633. The user may start the report session for a particular user by selecting the user's name from the By User selection box 633 and by selecting a start button (not shown). The operator may stop the report session for the selected consumer by selecting the stop button 629. The operator may also select a delete button 631 to delete the reporting session for the selected consumer.

A report 627 may be displayed on the display. The report may provide information regarding the reporting session, including the start time for the reporting session, the time the first and/or last beverage was dispensed, the end time for the reporting session, the consumer, the types of beverages consumed, and the total amount or volume of each different types and sizes of the beverages consumed. It is understood that other types of information may also be collected by the system 1 and displayed on the display. The report 627 may be saved to memory 518 for transfer to a financial, accounting, billing, or printing system. In one embodiment, the report 627 may be electronically transferred to a USB device using a USB connection 520 in the automatic beverage dispenser 2 (see FIG. 8).

An operator may select the User Accounts button 617 to access user account functions of the system 1. FIG. 28B illustrates a screenshot of the display under the User Accounts button 617. The system 1 may be programmed to track all beverages dispensed over a time period for a particular user account. Typically, the user account identifies a particular consumer or group. Using the display for the User Accounts button 617, the operator may create, edit, and delete user accounts. The operator may create a new user account by entering a user's name using an alpha-numeric keypad 633 located on the display. Upon entering the user's information, the user account may be saved by selecting the Save User button 635. The operator may also be able to edit a user account by selecting a user account from the user account list 637 and revising information which requires revisions. Upon updating the user account with the appropriate information, the operating may save the user account by selecting the Update User button 639. The operator may also delete a user account by selecting a user account from the user account list 637 and selecting the Delete User button 641.

In addition, using this display for the User Accounts button 617 function, the user may set permissions to permit or prevent a particular user from having access to certain liquids, such as any type of liquid containing alcohol. When the operator is creating a new user account, the operator may select the Alcohol Drink check box 643 to indicate when the particular user account is selected for the dispensing function, the user may have access to beverages containing alcohol. If the operator does not select the Alcohol Drink check box 643 for a particular user account, when that selected user account is selected for the dispensing function, the user will not have access to beverages containing alcohol. As a result, the session menu for that particular user account will not contain any beverages containing alcohol. Alternatively, the operator may edit a user account to indicate whether the user may have access to beverages containing alcohol when the particular user account is selected for the dispensing function. In such situations, the session menu for that particular user account will contain beverages containing alcohol.

The operator may also use the display for the User Accounts button 617 to indicate that a password is not required. When the operator is creating a new user account, the operator may select the Unlock Bar check box 645 to indicate when the particular user account is selected for the dispensing function, the user may access the dispensing function without having to enter an authorization, such as a password. If the operator does not select the Unlock Bar check box 645 for a particular user account, when that selected user account is selected for the dispensing function, the user will have to enter a password to access the dispensing function. Alternatively, the operator may edit a user account to indicate that whether the user must enter an authorization before accessing the dispensing function.

Figure 29C:
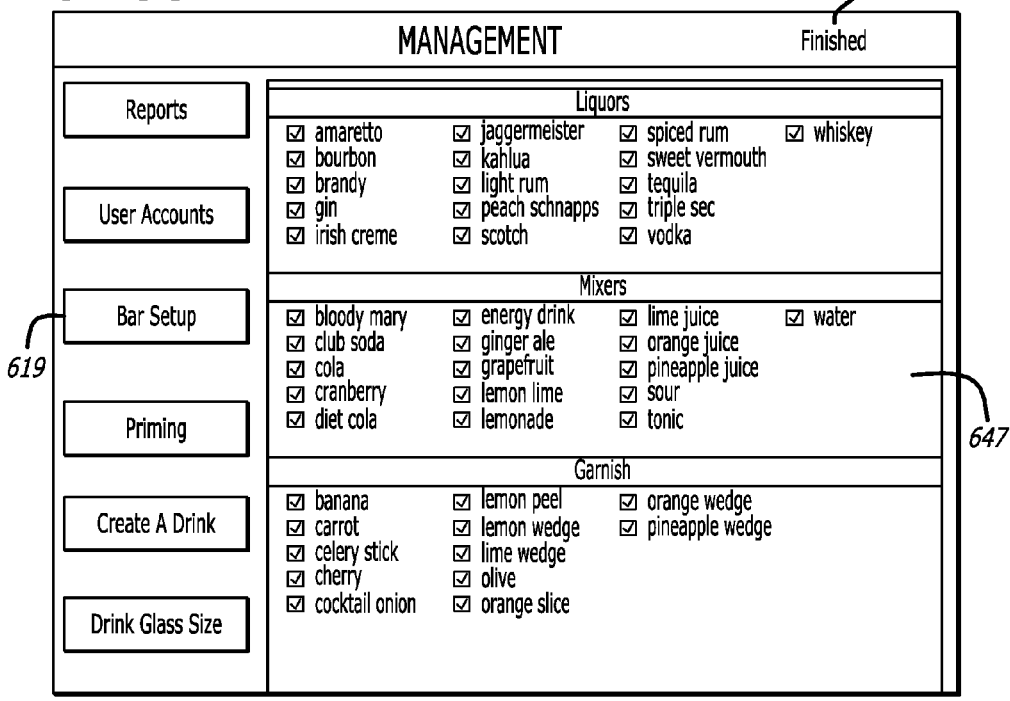

An operator may select the Bar Setup button 619 to access bar setup functions of the system 1. FIG. 29C illustrates a screenshot of the display under the Bar Setup button 619. Using the display for the Bar Setup button 619, the operator may identify the ingredients which are available to create beverages. A list of potential ingredients that may be available is provided in a table 647 on the display. The operator may check a check box next to a particular ingredient to indicate that the ingredient is available to create a beverage. Alternatively, the operator may uncheck a check box next to a particular ingredient to indicate that the ingredient is unavailable to create a beverage. Un-checking a check box next to a particular ingredient will remove from the session beverage menu any beverages containing that ingredient.

Figure 29D:
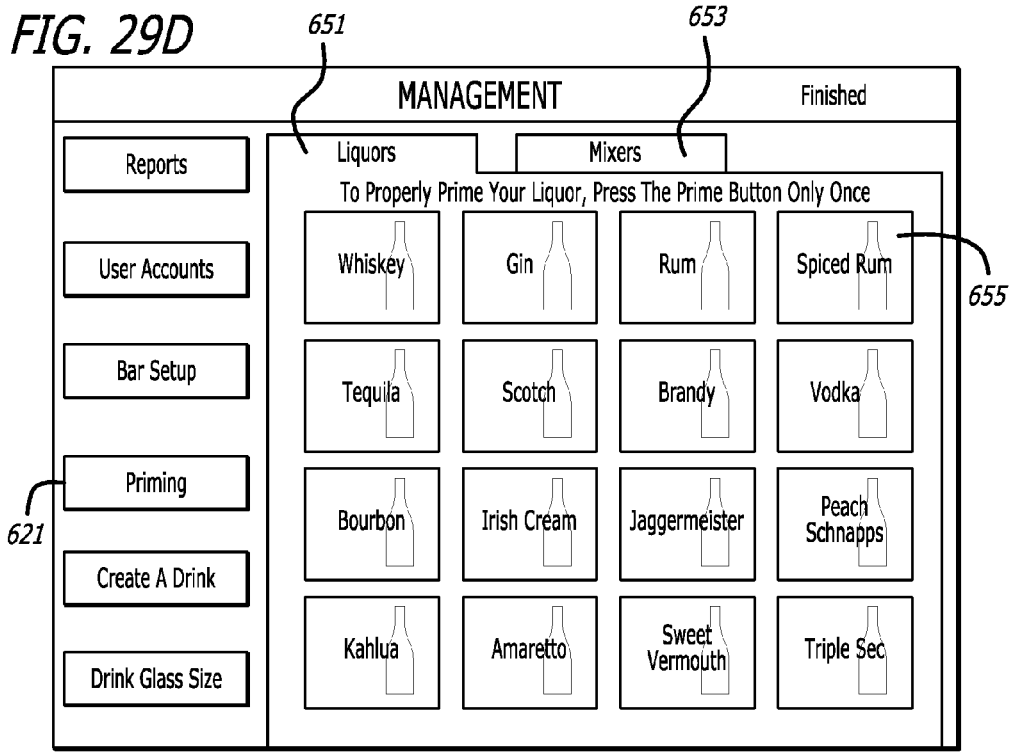
Figure 29E:
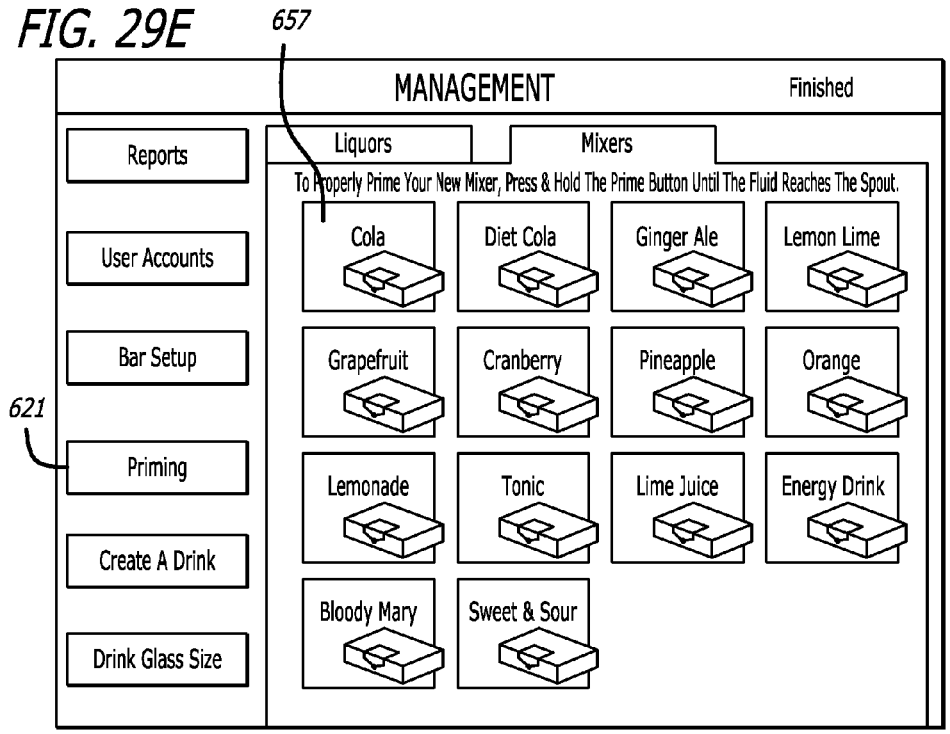

An operator may select the Priming button 621 to access the priming function of the system 1. One type of priming function is to energize the mechanisms which are required to prime the supply packs when a container for an ingredient, such as one of the first or second plurality of liquids, is emptied and replaced by another container containing the same ingredient. The containers for each of the first plurality of liquids 6 is stored in the first storage location 62 and the containers for each of the second plurality of liquids 8 is stored in the second storage location 48. FIGS. 29D-E illustrate screenshots of the display under the Priming button 621. When the Priming button is pressed, the display may include a first tab 651 for a first plurality of liquids 6, such as liquors, and a second tab 653 for a second plurality tab for a second plurality of liquids 8.

The operator may press the first tab 651 to access the priming function for the first plurality of liquids 6. As illustrated in FIG. 29D, under the first tab 651, the display may include a plurality of buttons 655. Preferably, each of the buttons 655 correspond to a particular liquid of the first plurality of liquids 6, such as, for example, whiskey, gin, rum, spiced rum, tequila, scotch, brandy, vodka, bourbon, Irish crème, Jagermeister®, peach schnapps, Kahlua®, amaretto, sweet vermouth, and triple sec. The operator may prime the supply path for a particular liquid by pressing the button 655 corresponding to the particular liquid and holding the button 655 corresponding to the particular liquid until the particular liquid appears at the dispense head.

The operator may press the second tab 653 to access the priming function for the second plurality of liquids. As illustrated in FIG. 29E, under the second tab 653, the display many include a plurality of buttons 657. Preferably, each of the buttons 657 corresponds to a particular liquid of the second plurality of liquids 8, such as, for example, cola, diet cola, ginger ale, lemon lime soda, grapefruit juice, cranberry juice, pineapple juice, orange juice, lemonade, tonic, lime juice, energy drink, bloody mary, and sweet & sour. The operator may prime the supply path for a particular liquid by pressing the button 657 corresponding to the particular liquid and holding the button 657 corresponding to the particular liquid until the particular liquid appears at the dispense head.

Figure 29F:
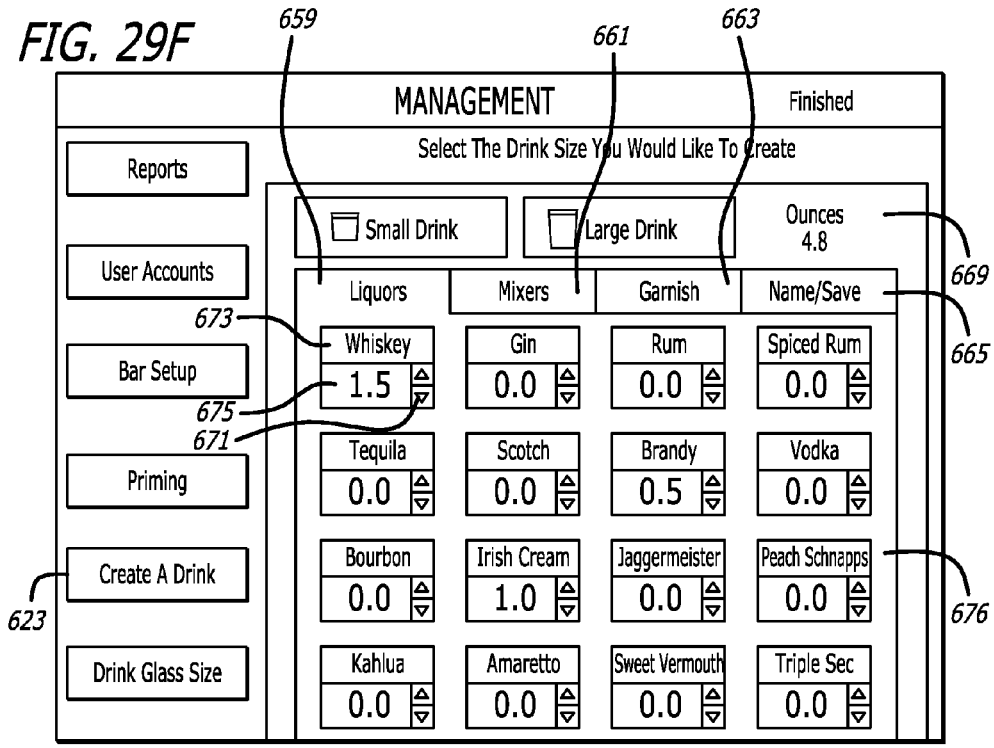

An operator may select the Creating a Drink button 623 to access recipe-related functions of the system 1. FIG. 29F illustrates a screenshot of the display when the Creating a Drink button 623 is pressed. Recipe-related functions may include creating or editing beverage pouring schemas, such as beverage recipes, and the various components of each recipe. This may include selecting or editing the size of a beverage, selecting or editing ingredients for a beverage, selecting or editing amounts of each ingredient for each beverage, and saving a beverage recipe to the beverage menu. The display for the recipe-related functions may include a first tab 659, a second tab 661, a third tab 663, and a fourth tab 665. The first tab 659, second tab 661, and third tab 663 may each correspond to different class of ingredients which may be used to create the pouring schema for the beverage that is dispensed. The class of ingredients may be, for example, the first plurality of liquids, the second plurality of liquids, and garnishes. As illustrated in the display shown in FIG. 29F, the first tab 659 may display a list of one or more of the first plurality of liquids. The second tab 661 may display a list of one or more of the second plurality of liquids and the third tab 663 may display a list of garnishes. When the Creating a Drink button 623 is pressed, information corresponding to the first tab 659 may be displayed. Alternatively, when the Creating a Drink button 623 is pressed, information corresponding to the second tab, 661, third tab 663, or fourth tab 665 may be displayed if one of the second, third, or fourth tabs is depressed. The display may also include a register 669 which includes a numerical value to indicate the amount of liquid that may added to the beverage recipe. As will be described below, as identified amounts of liquids are added to the beverage recipe, the value of the register may be decreased by the identified amount.

Upon selection of the first tab 659, a first plurality of liquids 6 that may be used for creating a beverage may be displayed. The first plurality of liquids 6 that are displayed may be based on the first plurality of liquids 6 that were selected during Bar Setup as shown in FIG. 29C. Each of the first plurality of liquids 6 may include identifying indicia 667 that displays the identity of the first liquid 673 and the amount of the first identified liquid in the beverage recipe for the beverage that is to be dispensed. A spin-selector 671 may be provided to increase or decrease the amount of the identified liquid that should be included in the beverage. The operator may create or modify a beverage recipe by adding fractional doses of one of the first plurality of liquids 6 using the spin-selector 673 located next to the identifying indicia 667 of a particular liquid 673 to be added or removed from the beverage. The fractional dosage may represent a fractional percentage of the selected liquid in the beverage. An amount representing the fractional percentage of the selected liquid that is added by the operator is deducted from the value shown in the register 669. When the value in the register 669 is zero, the system 1 prevents the operator from adding additional amounts of any liquid to the particular beverage recipe.

Upon selection of the second tab 661, a screen similar to the first tab 659 may be displayed. The second plurality of liquids 8 that are displayed may be based on the second plurality of liquids that were selected during Bar Setup as shown in FIG. 29C. The second tab 661 may include a list of the second plurality of liquids that may be used for creating a beverage. Each of the second plurality of liquids may include identifying indicia that displays the identity of the liquid and the amount of the identified liquid in the beverage. A spin-selector may be provided to increase or decrease the fractional amount of the second identified liquid that should be included in the beverage. The operator may create or modify a beverage recipe by adding fractional doses of one of the second plurality of liquids using the spin-selector located next to the identifying indicia of a particular liquid to be added or removed from the beverage. The fractional dosage may represent a fractional percentage of the selected liquid in the beverage. An amount representing the fractional percentage of the selected liquid that is added by the operator is deducted from the value shown in the register 669. When the value in the register 669 is zero, the system 1 prevents the operator from adding additional amounts of any liquid to a particular beverage recipe.

Upon selection of the third tab 663, a garnish selection screen similar to the first tab 659 and second tab 661 may be displayed. The garnishes that are displayed may be based on the garnishes that were selected during Bar Setup as shown in FIG. 29C. The third tab 663 may include a list of garnishes that may be used for creating a beverage. Each of the garnishes may include identifying indicia that displays the identity of the garnish and the amount of the garnish in the beverage. A spin-selector may be provided to increase or decrease the amount of the garnish that should be included in the beverage. The operator may create or modify a beverage recipe by adding garnishes using the spin-selector located next to the identifying indicia of a particular liquid to be added or removed from the beverage.

Upon selection of the fourth tab 665, an alpha-numeric keypad (of the type illustrated in FIG. 29B) may be displayed. The operator may enter a name for the beverage and save the ingredients and amounts of each ingredient used to create the beverage. The beverage recipe may be stored in memory 518, or in another external memory location. Accordingly, at each screen the operator enters data which may be different for each drink, thus the data is variable data. For example, the amount of the first liquid and the amount of the second liquid entered by the operated is selected by the operator and considered variable data.

Figure 29G:
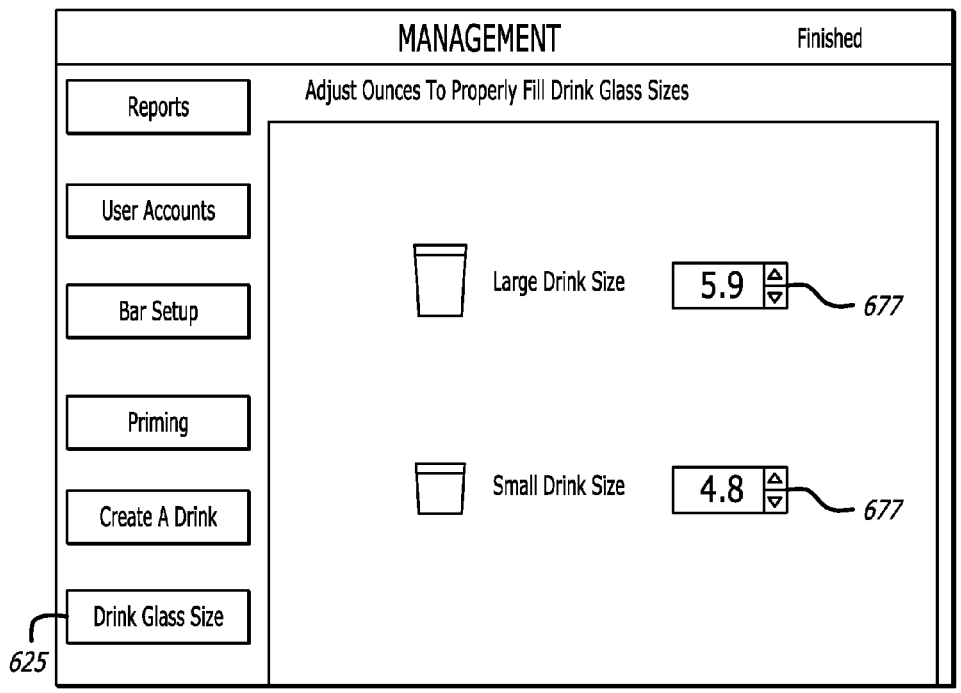

An operator may select the Drink Glass Size button 625 to access drink-size functions of the system 1. FIG. 29G illustrates a screenshot of the display when the Drink Glass Size button 625 is pressed. Drink-size functions may include adjusting the nominal liquid allowed according to the size of the container for the beverage. It is understood that one or more container sizes may be provided. For example, the interface may display a large drink size and a small drink size. A spin selector 677 may be provided to increase or decrease the nominal liquid allowed of each of the displayed drink sizes. Although only two drink sizes are displayed in FIG. 29G, it is understood that any number of drink sizes may be provided.

As discussed above, the nominal liquid allowed is displayed in the register 669, as shown in FIG. 29F. As selected amounts of liquid are added or removed from a beverage recipe, a corresponding selected amount is added or removed from the value displayed in the register 669.

As indicated above, the beverage dispensing system 1 may also include dispensing functions. The dispensing functions may be accessed via the touch screen interface 10 for the beverage dispensing system 1. Referring again to FIG. 28, the entry screen 601 may include a dispensing function button 605 which allows a user to access interfaces for dispensing selected beverages. It is contemplated that the beverage dispensing computer program may be programmed to require the user to enter an authorization to access the dispensing functions for a particular User Account. The authorization may be a password which is composed of a numeric, alpha-numeric, or other characters which are entered via the user interface. Alternatively, the authorization may be a fingerprint scan, retinal scan, or other types of biometric indicators. If a password is required, the entry screen 601 may also include a numeric or alpha-numeric keypad 607 for entry of the password. It is understood that access to interfaces for the dispensing functions may utilize the same password as that which is used to access the management functions. Further, it is contemplated that no password may be required to access the interfaces for the dispensing functions.

During operation, a user may select the dispensing function button 605. If a password is required for access to the interfaces for the dispensing function for the selected User Account, a keypad (of the type illustrated in FIG. 28) may be displayed. The user may begin the password entry process by entering a password by depressing numbers on the keypad and selecting an enter button. If the user incorrectly selects a number prior to selecting the enter button, the user may select a clear button to restart the password entry process. If the user enters the correct password, operator may be provided with access to the dispensing function of the system 1. If the operator enters an incorrect password, the operator will not be provided access to the dispensing functions of the system 1.

If the user enters the correct password, the user is provided with access to the dispensing function of the system 1. Alternatively, if no password is required, the user is provided access to the dispensing function of the system upon selection of the dispensing function button 605. FIGS. 30A-30D illustrate a screenshots of the dispensing function interfaces that may be displayed on the touch screen interface 10 when a user is provided access to the dispensing function of the system 1.

Figure 30A:
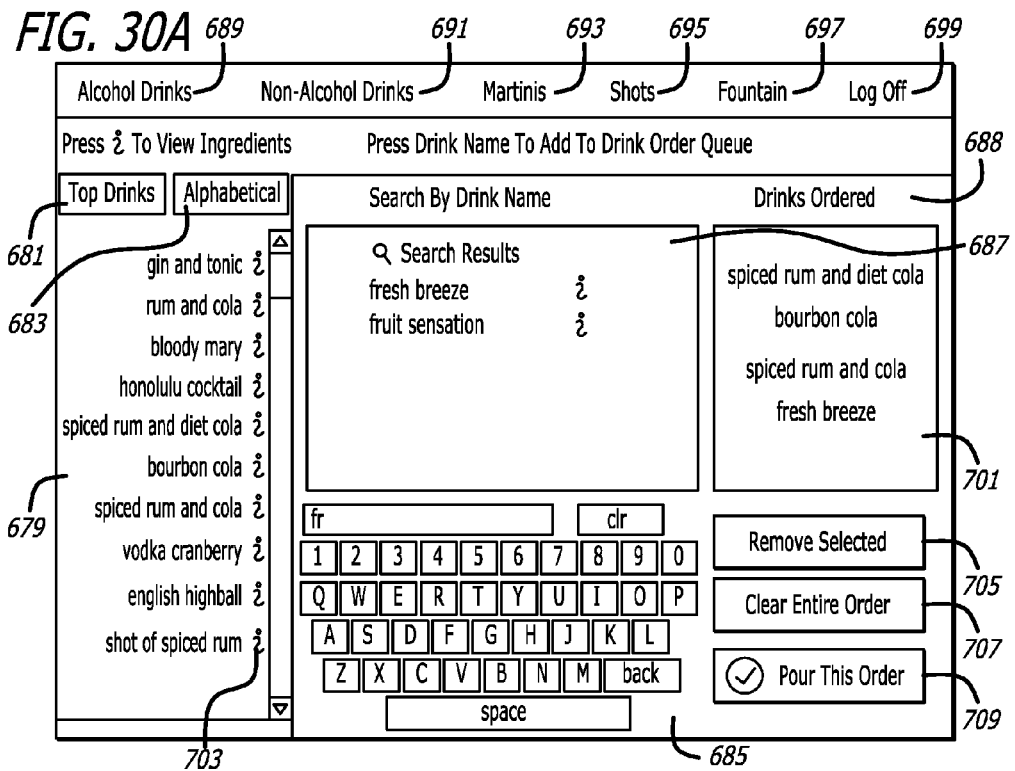
FIGS. 30A-30D are screenshots of the dispensing function of the beverage dispensing system described herein.

FIG. 30A illustrates a screenshot of the main dispensing function screen 688 from which a user may begin the process of dispensing a selected beverage. The main dispensing function screen 688 may include buttons which correspond to different categories of beverages which may be dispensed by the system 1. The dispensing function screen may include an Alcohol Drinks button 689, a Non-Alcoholic Drinks button 691, a Martinis button 693, a Shots button 695, and a Fountain button 697. A user may select any of the buttons to display beverages that match the category to which the selected button relates, as will be described herein.

A user may select the Alcohol Drinks button 689, to display and order alcohol beverages. The display may include a list of beverages 679 which may be dispensed by the system 1. Each of the alcoholic beverages in the list of alcoholic beverages 679 is dispensed according to a pouring schema for that alcoholic beverage. The alcoholic beverages in the list of alcoholic beverages 679 may be arranged by popularity according to the number of times the alcoholic beverage has been order in a selected session or over multiple sessions. Alternatively, the alcoholic beverages in the list of alcoholic beverages may be arranged alphabetically. A Top Drinks button 681 and an Alphabetical button 683 may be provided on the interface. A user may select the Top Drinks button 681 to display the alcoholic beverages in the list of alcoholic beverages 679 by popularity. Alternatively, a user may select the Alphabetical button 683 to display the alcoholic beverages in the list of alcoholic beverages in alphabetical order. Each of the alcoholic beverages in the list of alcoholic beverages 679 may include a corresponding information button 703. A user may select the information button 703 corresponding to an alcoholic beverage to display information regarding the beverage. Such information may include the ingredients in the beverage recipe or the amount of each of the ingredients in the beverage recipe for the alcoholic beverage. Accordingly, at each screen the operator enters data which may be different for each drink request, thus the data is considered variable data.

The user may select an alcoholic beverage to dispense by selecting an alcoholic beverage from the list of alcoholic beverages 679. Upon selection of the alcoholic beverage from the list of alcoholic beverages 679, the name of the selected alcoholic beverage to be dispensed is displayed in a Drinks Ordered list 701.

The beverage dispensing system 1 may also include a search function which allows a user to search for alcoholic beverages based on search criteria. The search criteria may be, for example, the name of an alcoholic beverage, portions of the name of the alcoholic beverage, or ingredients that are used to create an alcoholic beverage. The display (illustrated in FIG. 30A) may include an alpha-numeric keyboard 685 for entry of search criteria to search for alcoholic beverages that satisfy the search criteria. The results of the search may be displayed in a Search Results list 687. The user may select an alcoholic beverage to dispense by selecting the alcoholic beverage from the Search Results list 687. Upon selection of the alcoholic beverage from the Search Results list 687, the name of the selected alcoholic beverage to be dispensed is displayed in the Drinks Ordered list 701.

A user may select the Non-Alcohol Drinks button 691, to display and order non-alcohol beverages. Similar to the display when the Alcohol Drinks button 689 is selected, the display when the Non-Alcohol Drinks button 691 is selected may include a list of non-alcoholic beverages which may be dispensed by the system 1. Each of the non-alcoholic beverages in the list of non-alcoholic beverages is dispensed according to a pouring schema for that non-alcoholic beverage. The non-alcoholic beverages in the list of non-alcoholic beverages may be arranged by popularity according to the number of times the non-alcoholic beverage has been order in a selected session or over multiple sessions. Alternatively, the non-alcoholic beverages in the list of non-alcoholic beverages may be arranged alphabetically. A Top Drinks button and an Alphabetical button may be provided on the interface. A user may select the Top Drinks button to display the non-alcoholic beverages in the list of non-alcoholic beverages by popularity. Alternatively, a user may select the Alphabetical button to display the non-alcoholic beverages in the list of non-alcoholic beverages in alphabetical order. Each of the non-alcoholic beverages in the list of non-alcoholic beverages may include a corresponding information button. A user may select the information button corresponding to a non-alcoholic beverage to display information regarding the non-alcoholic beverage. Such information may include the ingredients in the beverage recipe or the amount of each of the ingredients in the beverage recipe of the non-alcoholic beverage.

The user may select a non-alcoholic beverage to dispense by selecting a non-alcoholic beverage from the list of non-alcoholic beverages. Upon selection of the non-alcoholic beverage from the list of non-alcoholic beverages, the name of the selected non-alcoholic beverage to be dispensed is displayed in a Drinks Ordered list 701.

The beverage dispensing system 1 may also include a search function which allows a user to search for non-alcoholic beverages based on search criteria. The search criteria may be, for example, the name of a beverage, portions of the name of the non-alcoholic beverage, or ingredients that are used to create a non-alcoholic beverage. The display may include an alpha-numeric keyboard for entry of search criteria to search for non-alcoholic beverages that satisfy the search criteria. The results of the search may be displayed in a Search Results list. The user may select a non-alcoholic beverage to dispense by selecting a non-alcoholic beverage from the Search Results list. Upon selection of the non-alcoholic beverage from the Search Results list, the name of the selected beverage to be dispensed is displayed in the Drinks Ordered list 701.

A user may select the Martinis button 693, to display and order Martini beverages. Similar to the display when the Alcohol Drinks button 689 is selected, the display when the Martini button 693 is selected may include a list of Martini beverages which may be dispensed by the system 1. Each of the Martini beverages in the list of Martini beverages is dispensed according to a pouring schema for that Martini beverage. The Martini beverages in the list of Martini beverages may be arranged by popularity according to the number of times the Martini beverage has been order in a selected session or over multiple sessions. Alternatively, the Martini beverages in the list of Martini beverages may be arranged alphabetically. A Top Drinks button and an Alphabetical button may be provided on the interface. A user may select the Top Drinks button to display the Martini beverages in the list of Martini beverages by popularity. Alternatively, a user may select the Alphabetical button to display the Martini beverages in the list of Martini beverages in alphabetical order. Each of the Martini beverages in the list of Martini beverages may include a corresponding information button. A user may select the information button corresponding to a Martini beverage to display information regarding the Martini beverage. Such information may include the ingredients in the beverage recipe or the amount of each of the ingredients in the beverage recipe of the Martini beverage.

The user may select a Martini beverage to dispense by selecting a Martini beverage from the list of Martini beverages. Upon selection of the Martini beverage from the list of Martini beverages, the name of the selected Martini beverage to be dispensed is displayed in a Drinks Ordered list 701.

The beverage dispensing system 1 may also include a search function which allows a user to search for Martini beverages based on search criteria. The search criteria may be, for example, the name of a beverage, portions of the name of a Martini beverage, or ingredients that are used to create a Martini beverage. The display may include an alpha-numeric keyboard for entry of search criteria to search for Martini beverages that satisfy the search criteria. The results of the search may be displayed in a Search Results list. The user may select a Martini beverage to dispense by selecting a Martini beverage from the Search Results list. Upon selection of the Martini beverage from the Search Results list, the name of the selected beverage to be dispensed is displayed in the Drinks Ordered list 701.

Beverages may be individually or collectively removed from the Drink Order list 701 using a Remove Selected button 705 and/or a Clear Entire Order button 707. The user may select a beverage from the Drinks Order list 701 and select the Remove Selected button 705 to individually remove the selected beverage from the Drinks Order list 701. The user may select the Clear Entire Order button 707 to collectively remove each of the beverages listed in the Drinks Order list 701.

Figure 30B:
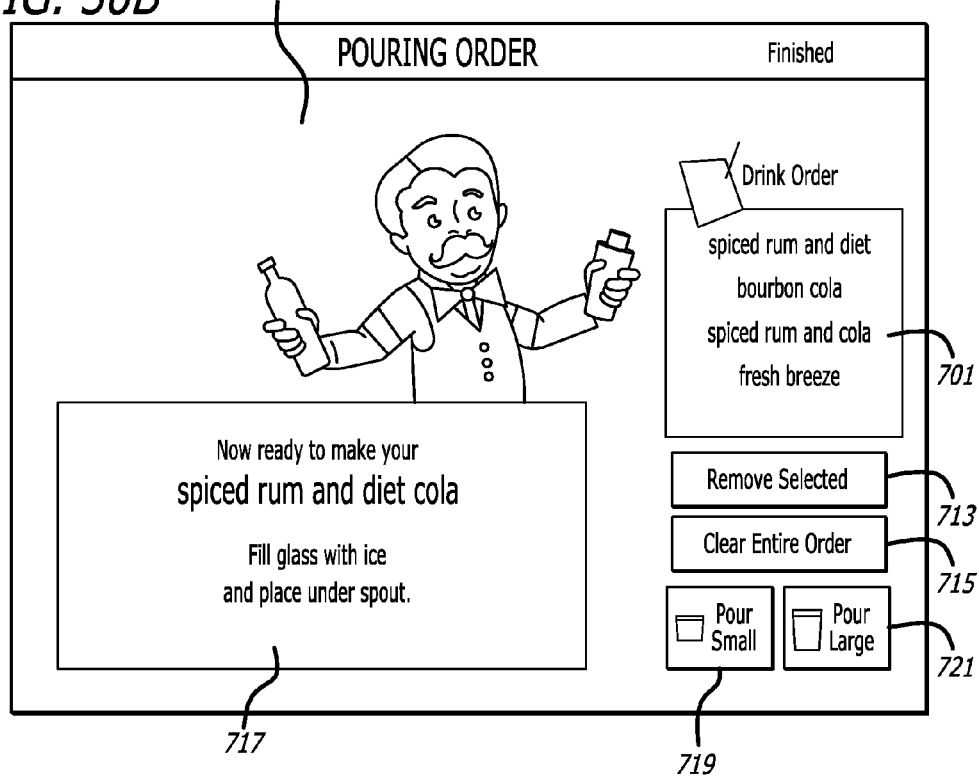

When the entire order has been entered into the system 1, the user may select the Pour This Order button 709 to dispense beverages listed in the Drinks Order list 701. Upon selection of the Pour This Order button 709, a Pouring Order screen 711 may be displayed. FIG. 30B illustrates a screenshot of the Pouring Order screen 711. The Drinks Order list 701 is duplicated on the Pouring Order screen 711. Beverages may be individually or collecting removed from the Drink Order list 701 using a Remove Selected button 713 and/or a Clear Entire Order button 7155. The user may select a beverage from the Drinks Order list 701 and select the Remove Selected button 713 to individually remove the selected beverage from the Drinks Order list 701. The user may select the Clear Entire Order button 715 to collectively remove each of the beverages listed in the Drinks Order list 701.

The Pouring Order screen 711 may include a text box 717. The text box 717 may include text with instructions for the user. For example, the text box 717 may include text prompting the user to fill a container with ice and place it under the beverage dispensing apparatus 15 from which the beverage will be dispensed. The Pouring Order screen 711 may include a Pour Small button 719 and a Pour Large button 710. The user may select the Pour Small button 719 to dispense a small beverage according to the beverage recipe and pouring schema for the selected beverage. Alternatively, the user may select the Pour Large button 710 to dispense a large beverage according to the beverage recipe and pouring schema for the selected beverage.

Figure 30C:
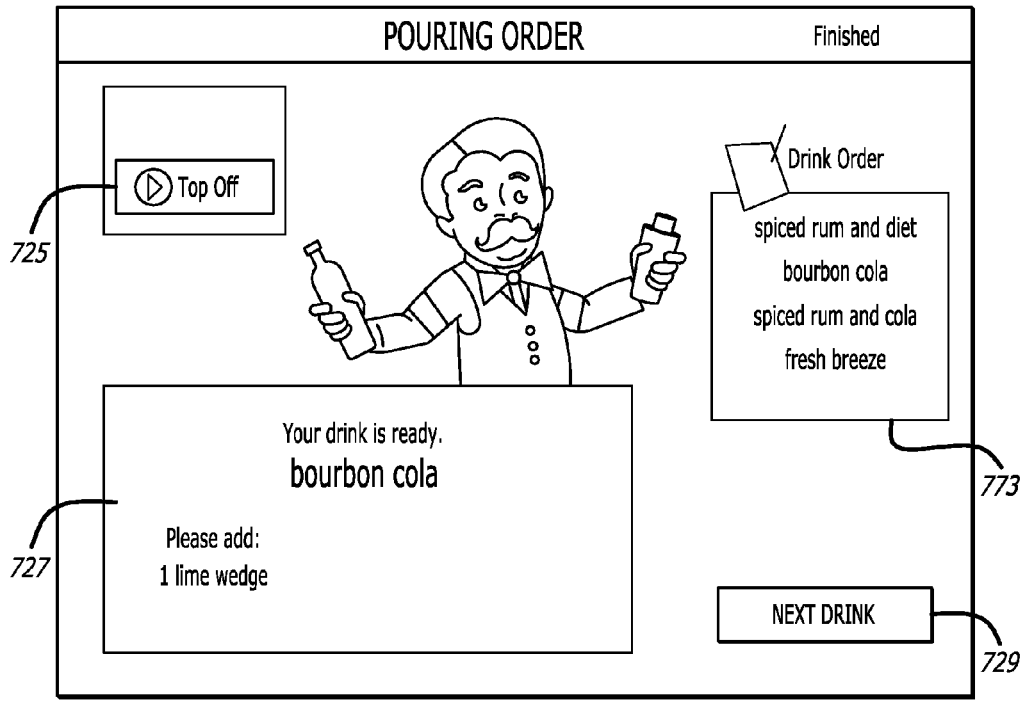
Figure 30D:
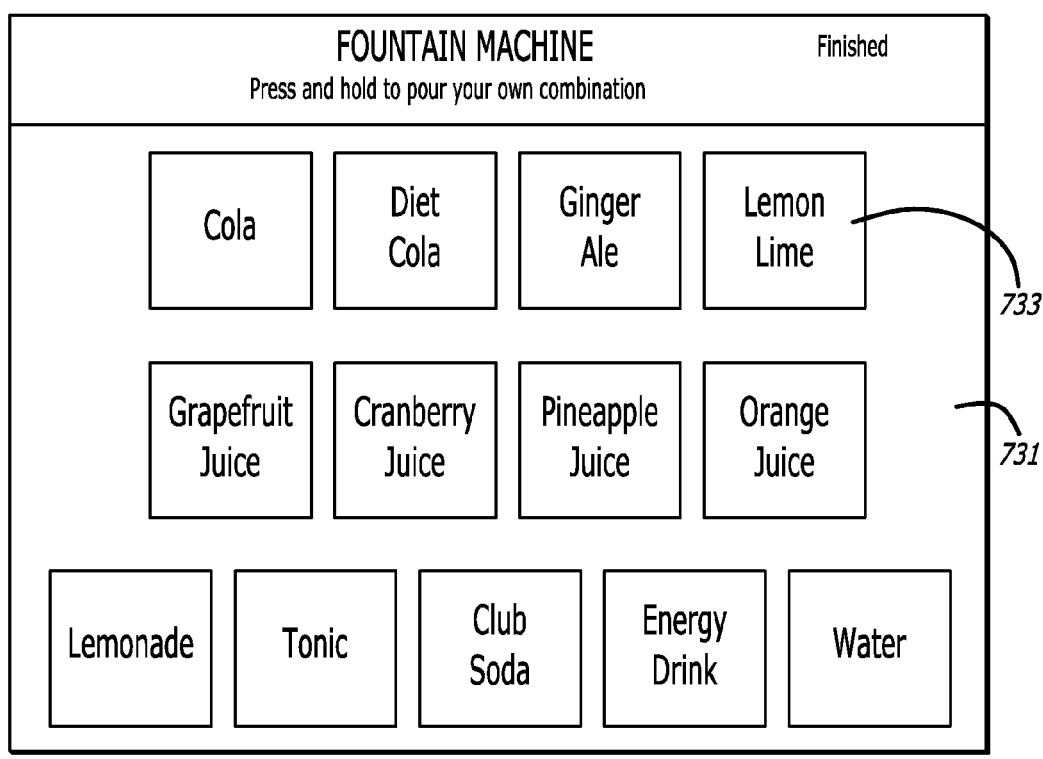

Upon selection of the Pour Small button 719 and a Pour Large button 710, the selected beverage is dispensed according to the beverage recipe and pouring schema for the selected beverage. Based on the beverage recipe and pouring schema, the server 4 dispenses the requisite amount the requisite liquids from the necessary containers of the first plurality of liquids stored 6 in the first storage location 62, and dispenses the requisite amount of liquids from the necessary containers of the second plurality of liquids 8 stored in the second storage location 48. After the beverage is dispensed, a beverage dispensed screen 723 may be displayed. FIG. 30C illustrates a screenshot of the beverage dispensed screen 723 that may be displayed on the touch screen interface 10. The beverage dispensed screen 723 may include a Top Off button 725. The user may select the Top Off button 725 to add more of the last one of the second plurality of liquids which was dispensed to create the beverage. The beverage dispensed screen 723 may also include a text box 727. The text box 727 may include text indicating that the selected beverage has been fully dispensed and may also prompt the user to add a garnish.

The user may select the Next Drink button 729 to repeat the beverage dispensing procedure for other beverages listed in the Drinks Order list 701. The process described above repeats until all beverages listed in the Drinks Order list 701 have been dispensed or removed from the Drinks Order list 701. After all beverages listed in the Drinks Order list 701 have been dispensed or removed from the Drinks Order list 701, the main dispensing function screen 688 (as illustrated in FIG. 30A) is displayed.

As noted above, the main dispensing function screen 688 includes a Fountain button 697. A user may select the Fountain button 697 to begin the process of dispensing a fountain beverage. Upon selection of the Fountain button 697, a fountain machine screen 731 may be displayed. FIG. 30C illustrates a screenshot of the fountain machine screen 731 that may be displayed on the touch screen interface 10. The fountain machine screen 731 includes a plurality of fountain beverage buttons 733 wherein each fountain beverage button 733 corresponds to a fountain beverage. In order to dispense a fountain beverage, the user may place a container under the beverage dispensing apparatus 14 from which the beverage will be dispensed. The user may dispense a desired fountain beverage by selecting the fountain beverage button 733 and holding the button until the desired amount of the fountain beverage is dispensed. Alternatively, the system 1 may be programmed so that the user selects the fountain beverage button 733 and the system automatically dispenses a predetermined amount of the fountain beverage.

In a typical restaurant or bar where a POS system is installed, food and drink orders are keyed into a POS terminal. Once entered, food orders are sent to the kitchen printer and drink orders are sent to the bar printer. The kitchen staff create food orders (printed at the kitchen printer) and the bar staff create drink orders (printed at the bar printer). Specifics such as table number, server name, check number, time, and date may be printed on these orders.

The POS interface solution can be used to interface a POS system or POS terminal to an automated bar tending system. For example, an automated bar tending system may provide for a bartender or server to enter drink orders on a user interface, after which the bar tending system automatically measures and pours the appropriate ingredients into a drink glass. The bar tending system may allow for multiple drinks to be entered and queued up in as a listing of drinks to be prepared. It is desirable, however, to allow drink orders to be directly entered that are input on a POS terminal that is not part of the bar tending system.

The POS interface solution allows drink orders to be directly entered into the bar tending system from a POS terminal that is not the user interface of the bar tending system. For example, a server on a restaurant floor may enter a complete food and drink order on a POS terminal in a server station. The food order goes to the kitchen and the drink order goes directly to the POS interface. The POS interface solution allows the drink order to be electronically entered into the bar tending system, thereby eliminating the need for the bartender or server to have to hand enter each drink order into the user interface of the bar tending system. The POS interface solution can also send the same electronic drink order to a printer for producing a paper copy of the drink order or to a video display for visually providing the drink order to any worker (e.g., bartender, server, and the like). The POS interface solution may be any combination of hardware, firmware and software.

Figure 31:
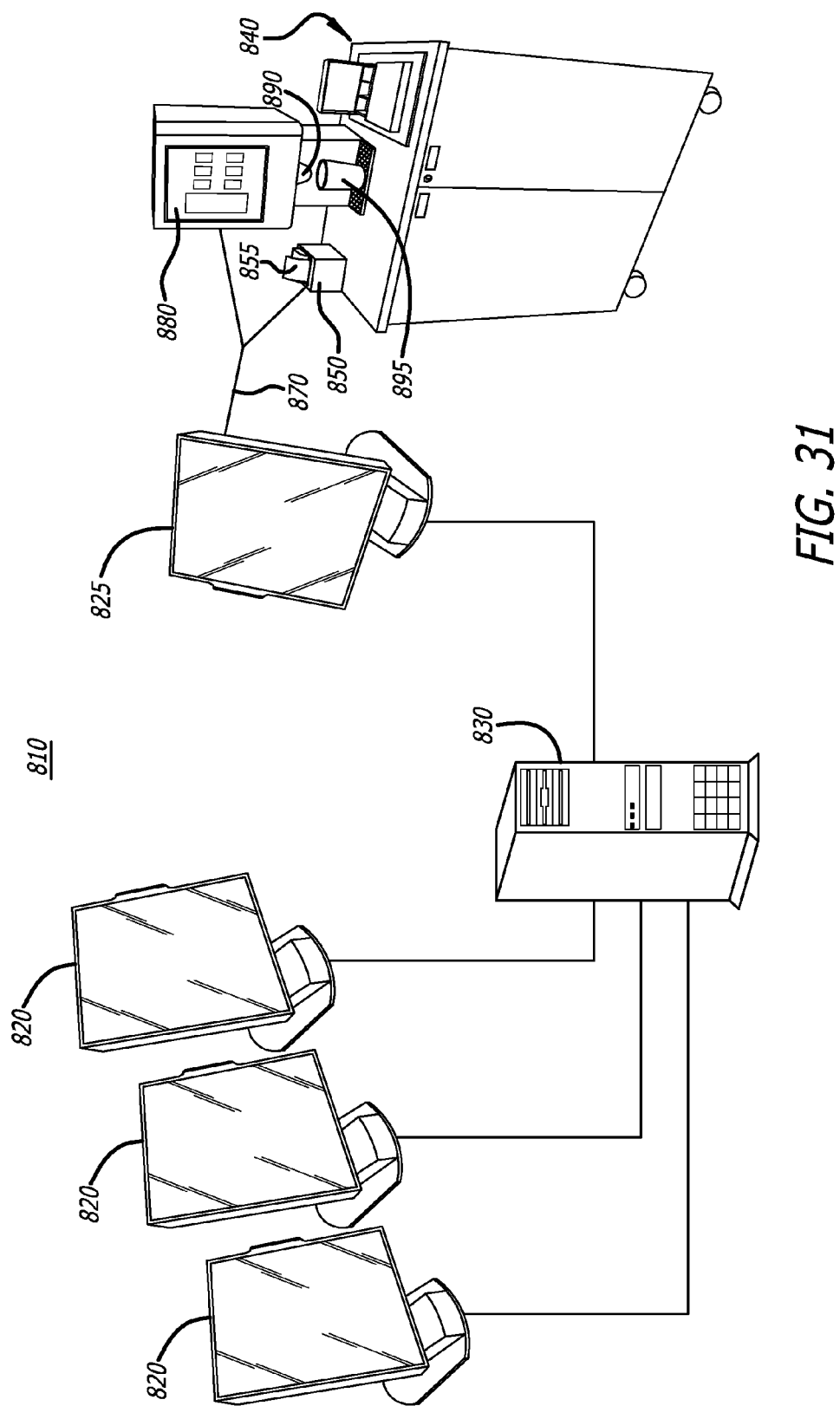
FIG. 31 is a front perspective view of a POS interface system according to one embodiment; and, FIG. 32 is a front perspective view of a POS interface solution according to another embodiment.

Referring to FIG. 31, a system 810 is illustrated having several order entry terminals 820 connected to or in communication with a computer server 830, a bar tending system 840 that automatically mixes drink orders, and an order display 850. The POS interface solution may reside on the computer server 830, on a POS terminal having communication port 825 (e.g., RS232, Ethernet, parallel, USB, wireless, and the like), or a combination of both. For example, in FIG. 31 a Y-cable 870 connects the POS terminal with the communication port 825 to both the bar tending system 840 and the order display 850, allowing the same electronic signals or data to be sent from the POS terminal with the communication port 825 to both the bar tending system 840 and the order display 850. Alternatively, the drink order signal may be sent from the computer server 830 through the POS terminal with the communication port 825 to both the bar tending system 840 and the order display 850. In addition, the POS terminal with the communication port 825 may communicate with either or both of the bar tending system 840 and the order display 850 via wireless communications (e.g., Wi-Fi, LTE, WLAN, Bluetooth, and the like).

For example, a drink order for a mixed alcoholic drink may be entered by a food/drink server (e.g., waiter, waitress, bartender) at any of the order entry POS terminals 820 or at the POS terminal with the communication port 825. The drink order may be sent electronically through the POS terminal with the communication port 825 and received by both the bar tending system 840 and the order display 850. The bar tending system 840 displays the drink order in a user interface 880 of the bar tending system 840 so that all the food/drink server has to do is place the appropriate drink glass under a pour spout 890 and select the drink order on the user interface 890 (e.g., touch screen). For example, the bar tending system 840 may be configured to simultaneously provide beverage selection data and a drink order queue that is populated following each selection of a beverage by a user, where the drink order queue is configured to be modifiable by a user.

The drink(s) are then automatically mixed and poured into an appropriate drink glass 895 by the bar tending system 840. In addition, the order display 850 visually provides or presents a drink order. The order display 850 may be a video display configured to visually present the drink order on the video display, such as for a server or a food preparer in the kitchen. The order display 850 may also be a printer configured to print out a drink order ticket 855, which may be used for tracking purposes or as a bill to present to a customer. An electronic copy of the drink order may be stored on the computer server 830 and/or the bar tending system 840 as well.

Figure 32:
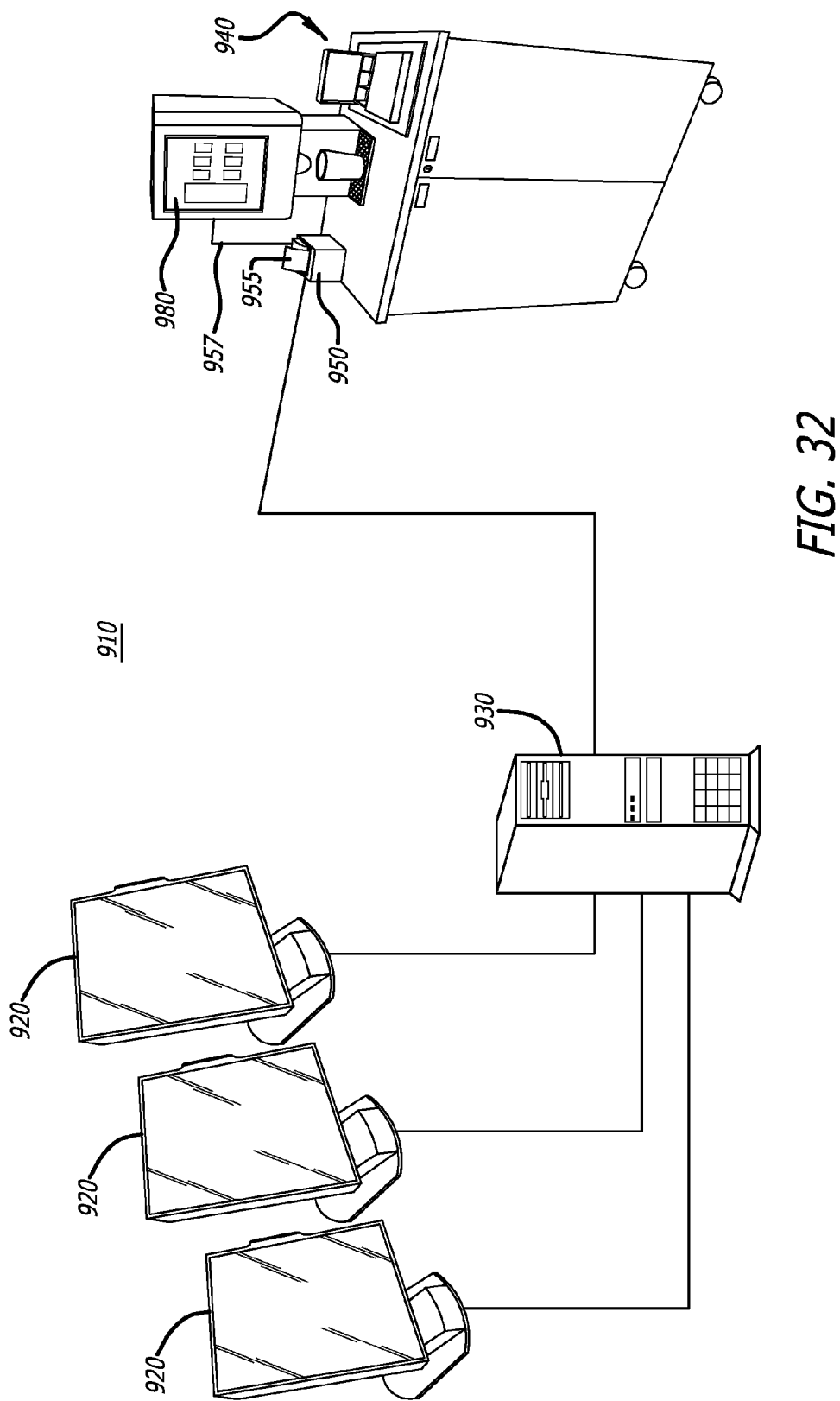

As shown in FIG. 32, a system 910 is illustrated having several order entry terminals 920 connected to or in communication with a computer server 930, a bar tending system 940 that automatically mixes drink orders, and an order display 950. Here, the computer server 930 communicates the drink order received from any of the POS terminals 920 directly to the order display 950. The order display 950 has a communication interface (not shown) allowing the order display 950 to be connected by a cable 957 (e.g., RS232, Ethernet, parallel, USB, and the like) to the bar tending system 940. The order display 950 may be a video display, a printer and the like.

Alternatively, the order display 950 and the bar tending system 940 may be connected by any type of wireless communications. Thus, the drink order may be printed out on paper 955 (e.g., a ticket) by the order display 950 (e.g., printer) and passed through the order display 950 to the bar tending system 940, where it is displayed on a user interface 980 of the bar tending system 940. In another example, the drink order is displayed on the order display 950 (e.g., video display) and passed through the order display 950 to the bar tending system 940, where it is also displayed on a user interface 980 of the bar tending system 940. The order display 850, 950 may be placed at any point in the system 810, 910, such as in the kitchen, at a server station, as part of the bar tending system 840, 940, and the like. In yet another example, the computer server 930 may be connected directly to either or both of the order display 950 and the bar tending system 940 by a cable (e.g., RS232, Ethernet, parallel, USB, and the like) or by a wireless connection (e.g., Wi-Fi, LTE, WLAN, Bluetooth, and the like).

The POS interface solution allows the bar tending system 840, 940 to receive orders electronically from any POS system without requiring a connection to a business secure network and software by using print data listening. The POS interface solution eliminates network security issues and the need for custom programming by the POS system vendor to integrate with the bar tending system 840, 940.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. A system for processing drink orders, comprising:
a server computer;
one or more point of sale (POS) terminals in communication with the server computer and configured to generate a drink order signal based on a received input;

a communication port POS terminal in communication with the server computer;

a bar tending system configured to automatically populate a drink order queue based on receiving the drink order signal, the bar tending system comprising:

a housing having a plurality of valves for controlling the flows of a plurality of first liquids, a plurality of second liquids, and a water supply, wherein the plurality of first liquids comprise liquors and the plurality of second liquids comprise mixer syrups;

a beverage dispensing spout fluidly connected to the plurality of first liquids, the plurality of second liquids and the water; and a controller for controlling the plurality of valves to dispense one or more of the plurality of first liquids, the plurality of second liquids and the water based on the drink order signal; and an order display configured to provide a visual representation of the drink order signal, the order display comprising one of a video display and a printer, wherein the system is configured to provide the drink order signal from one of the one or more POS terminals to the server computer, from the server computer to the communication port POS terminal, and from the communication port POS terminal to both the bar tending system and the order display based on the received input to the one or more POS terminals.

2. The system of claim 1, further comprising a cable connecting both the bar tending system and the order display to the communication port POS terminal.

3. The system of claim 1, wherein the system is configured to generate the drink order signal from the communication port POS terminal.

4. The system of claim 1, wherein the system is configured to generate the drink order signal from one of the POS terminals and pass the drink order signal through the server computer to the communication port POS terminal.

5. The system of claim 1, further comprising a user interface, wherein the system is configured to display a drink order on the user interface based on the drink order signal provided to the bar tending system.

6. The system of claim 1, wherein the system is configured to visually provide a drink order on the order display based on the drink order signal provided to the order display.

7. The system of claim 5, wherein the system is configured to display the drink order on the user interface and to visually provide the drink order on the order display based on the drink order signal provided from the communication port POS terminal.

8. The system of claim 1, wherein the order display is connected to the bar tending system via a cable.

9. The system of claim 8, wherein the system is configured to receive the drink order signal at the order display and pass the drink order signal through to the bar tending system.

10. The system of claim 9, wherein the bar tending system comprises a user interface and the system is configured to visually provide a drink order on the order display and display the drink order on the user interface based on the drink order signal.

11. A system for processing a drink order, the system comprising:

a beverage dispenser for mixing and dispensing liquids, comprising:

a mounting bracket;

a first set of fittings connected to the mounting bracket for receiving a first set of liquids and for dispensing the first set of liquids; and a second set of fittings connected to the mounting bracket for receiving a second set of liquids and for dispensing the second set of liquids;

one or more processors; and a memory containing processor-executable instructions that, when executed by the one or more processors, cause the system to:

provide a drink order signal from a point of sale (POS) terminal;

receive the drink order signal at a printer;

pass the drink order signal through the printer to a bar tending system over a cable directly connected between the printer and the bar tending system;

print the drink order at the printer based on the drink order signal; and automatically populate and display the drink order in a drink order queue on a user interface of the bar tending system based on the drink order signal passed through the printer.

12. The system of claim 11, wherein the system is further caused to provide the drink order signal from the POS terminal to a server, wherein the server provides the drink order signal to the printer.

13. The system of claim 11, wherein the system further comprises a Y-cable connecting the POS terminal to both the printer and the bar tending system.

14. A non-transitory machine-readable storage medium storing machine-executable instructions for causing a processor to perform a method for processing a drink order, the method comprising:

receiving one or more pouring schema, wherein each of the one or more pouring schema is a drink recipe;

receiving a drink order signal generated by a point of sale (POS) terminal;

providing the drink order signal to an order display;

passing the drink order signal through the order display to a bar tending system over a cable directly connected between the order display and the bar tending system;

displaying the drink order automatically in a drink order queue on a user interface of the bar tending system based on the drink order signal passed through the order display; and displaying instructions for dispensing the drink order based on the corresponding drink recipe.

15. The non-transitory machine-readable storage medium of claim 14, the method further comprising:

providing the drink order signal to the order display directly from a communication port of the POS terminal.

16. The non-transitory machine-readable storage medium of claim 14, the method further comprising:

providing the drink order signal from the POS terminal through a server to the order display.

* * * * *